United States Patent
Otsuka et al.

(10) Patent No.: US 8,682,966 B2
(45) Date of Patent: *Mar. 25, 2014

(54) COMPOSITE SERVICE PROVIDING SYSTEM

(75) Inventors: Naoki Otsuka, Kounan (JP); Masaaki Hibino, Yotsukaichi (JP); Koshi Fukazawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 136 days.

This patent is subject to a terminal disclaimer.

(21) Appl. No.: 13/408,622

(22) Filed: Feb. 29, 2012

(65) Prior Publication Data

US 2012/0154869 A1   Jun. 21, 2012

Related U.S. Application Data

(63) Continuation of application No. 10/854,415, filed on May 27, 2004, now Pat. No. 8,150,907.

(30) Foreign Application Priority Data

May 29, 2003 (JP) .................................. 2003-153266
May 29, 2003 (JP) .................................. 2003-153267

(51) Int. Cl.
*G06F 15/16* (2006.01)

(52) U.S. Cl.
USPC .......................................... 709/203; 709/228

(58) Field of Classification Search
USPC ....................................................... 709/203
See application file for complete search history.

(56) References Cited

U.S. PATENT DOCUMENTS

| | | | |
|---|---|---|---|
| 5,669,040 A * | 9/1997 | Hisatake | 399/83 |
| 5,726,984 A | 3/1998 | Kubler et al. | |
| 6,236,815 B1 * | 5/2001 | Kaneko et al. | 399/45 |
| 6,609,162 B1 | 8/2003 | Shimizu et al. | |
| 6,633,757 B1 | 10/2003 | Hermann et al. | |
| 6,763,336 B1 | 7/2004 | Kolls | |
| 6,947,995 B2 | 9/2005 | Chang et al. | |
| 6,972,855 B2 * | 12/2005 | Kashiwagi | 358/1.1 |
| 7,130,066 B1 * | 10/2006 | Kanematu | 358/1.15 |
| 7,256,905 B2 * | 8/2007 | Uchikawa | 358/1.15 |
| 7,330,280 B2 * | 2/2008 | Kanazawa | 358/1.13 |
| 7,389,329 B2 * | 6/2008 | Naito et al. | 709/219 |
| 2001/0046065 A1 | 11/2001 | Furukawa et al. | |

(Continued)

FOREIGN PATENT DOCUMENTS

EP   0 952 514 A3   10/1999
JP   A-10-224534   8/1998

(Continued)

*Primary Examiner* — Gerald Smarth
(74) *Attorney, Agent, or Firm* — Oliff PLC

(57) ABSTRACT

A composite service providing system including a plurality of network electronic devices communicatively connected with each other. The plurality of network electronic devices includes electronic devices, each of which is capable of providing at least one service. A plurality of services provided by a plurality of electronic devices are combined to constitute a composite service. The composite service providing system further includes a composite service designating system that designates a composite service to be provided, an electronic device determining system that determines an electronic device that provides each of a plurality of services necessary for providing the composite service designated with the composite service designating system, and a controlling system that control the electronic devices determined by the electronic device determining system to provide the services so that the composite service designated by the designating system is provided.

22 Claims, 54 Drawing Sheets

(56) References Cited

U.S. PATENT DOCUMENTS

| | | |
|---|---|---|
| 2002/0002611 A1 | 1/2002 | Vange |
| 2002/0015160 A1* | 2/2002 | Kashiwagi ................. 358/1.1 |
| 2002/0024686 A1 | 2/2002 | Uchiyama et al. |
| 2002/0069239 A1 | 6/2002 | Katada et al. |
| 2002/0077980 A1 | 6/2002 | Chang et al. |
| 2002/0078149 A1 | 6/2002 | Chang et al. |
| 2002/0080398 A1* | 6/2002 | Matsushima ............. 358/1.15 |
| 2002/0083121 A1 | 6/2002 | Chang et al. |
| 2003/0037287 A1* | 2/2003 | Nakamura et al. ............ 714/30 |
| 2003/0123074 A1* | 7/2003 | Imai et al. .................... 358/1.9 |
| 2003/0204558 A1 | 10/2003 | Schneider et al. |
| 2003/0208644 A1 | 11/2003 | Shimizu et al. |
| 2003/0231343 A1* | 12/2003 | Kobayashi et al. ......... 358/1.16 |
| 2004/0153530 A1* | 8/2004 | Machida ...................... 709/220 |
| 2004/0153532 A1* | 8/2004 | Hosotani et al. ............. 709/222 |
| 2004/0160623 A1 | 8/2004 | Strittmatter et al. |
| 2004/0176944 A1 | 9/2004 | Noda et al. |
| 2004/0205780 A1* | 10/2004 | Hara et al. ................... 719/321 |
| 2004/0243697 A1 | 12/2004 | Otsuka et al. |
| 2004/0268096 A1* | 12/2004 | Master et al. ................. 712/227 |
| 2007/0192429 A1* | 8/2007 | Kanuma et al. .............. 709/208 |
| 2007/0229515 A1* | 10/2007 | Tsukamoto .................. 345/471 |
| 2008/0086564 A1 | 4/2008 | Putman et al. |

FOREIGN PATENT DOCUMENTS

| | | |
|---|---|---|
| JP | A-11-122417 | 4/1999 |
| JP | A-11-305966 | 11/1999 |
| JP | A-2000-059560 | 2/2000 |
| JP | A-2000-090208 | 3/2000 |
| JP | A-2000-183926 | 6/2000 |
| JP | A-2000-187573 | 7/2000 |
| JP | A-2000-295658 | 10/2000 |
| JP | A-2001-177599 | 6/2001 |
| JP | A-2001-238238 | 8/2001 |
| JP | A-2001-282488 | 10/2001 |
| JP | A-2002-073462 | 3/2002 |
| JP | A-2002-157102 | 5/2002 |

* cited by examiner

FIG.17

| COMPOSITE SERVICE | SERVICE 1 | SERVICE 2 | SERVICE 3 |
|---|---|---|---|
| COPY (copy) | SCAN SERVICE START INSTRUCTION REQUIRED /PUSH SERTVICE 2 | PRINT (print) | |
| REMOTE FAX (remotefax) | SCAN SERVICE START INSTRUCTION REQUIRED /PUSH SERTVICE 2 | FAX (fax) | |
| IMAGE STORING (imagekeep) | SCAN SERVICE START INSTRUCTION REQUIRED /PUSH SERTVICE 2 | IMAGE STORAGE (storage) | |
| FAX IMAGE STORING (imagefax keep) | SCAN SERVICE START INSTRUCTION REQUIRED /PUSH SERTVICE 2 | FAX (fax) /PUSH SERNCE 3 | IMAGE STORAGE (storage) |

FIG. 18

DEVICE INFORMATION SERVICE FOR SCAN SERVICE

| Index | USAGE FLAG | INVALID FLAG | DEVICE ID | GID | DataSink URL | Src. URL | Location | Capability |
|---|---|---|---|---|---|---|---|---|
| 1 | | | Scanner1 | MYMFC1 | 192.1.1.1 | | http://***/scan | 112° 11' 10"<br>100° 50' 10" | Mono/600dpi/A4 |
| 2 | | | Scanner2 | MYMFC2 | 192.1.1.2 | | http://***/scan | 112° 11' 10"<br>100° 70' 10" | Color/600dpi/A4 |

DEVICE INFORMATION SERVICE FOR PRINT SERVICE

| Index | USAGE FLAG | INVALID FLAG | DEVICE ID | GID | DataSink URL | Src. URL | Location | Capability |
|---|---|---|---|---|---|---|---|---|
| 1 | | | Printer1 | MYMFC1 | 192.1.1.3 | http://***/ipp | | 112° 11' 10"<br>100° 65' 10" | Color/1200dpi/A4 |
| 2 | | | Printer2 | MYMFC2 | 192.1.1.4 | http://***/ipp | | 112° 11' 10"<br>100° 60' 10" | Mono/600dpi/A4 |

DEVICE INFORMATION SERVICE FOR FAX SERVICE

| Index | USAGE FLAG | INVALID FLAG | DEVICE ID | GID | DataSink URL | Src. URL | Location | Capability |
|---|---|---|---|---|---|---|---|---|
| 1 | | | fax1 | MYMFC1 | 192.1.1.5 | http://***/ipp | | 112° 11' 10"<br>100° 65' 10" | Color/1200dpi/A4 |
| 2 | | | fax2 | MYMFC2 | 192.1.1.6 | http://***/ipp | | 112° 11' 10"<br>100° 60' 10" | Mono/600dpi/A4 |

DEVICE INFORMATION SERVICE FOR IMAGE STORING SERVICE

| Index | USAGE FLAG | INVALID FLAG | DEVICE ID | GID | DataSink URL | Src. URL | Location | Capability |
|---|---|---|---|---|---|---|---|---|
| 1 | | | disk1 | MYMFC1 | 192.1.1.7 | http://***/ipp | | 112° 11' 10"<br>100° 80' 10" | |
| 2 | | | disk2 | MYMFC2 | 192.1.1.8 | http://***/ipp | | 112° 11' 10"<br>100° 90' 10" | |

DEVICE ID

FIG.19

| DEVICE ID | GID | ADDRESS | DataSink URL | Src. URL | Service |
|---|---|---|---|---|---|
| Scanner1 | MYMFC1 | 192.1.1.1 | | http:://···/scn | Scan |
| Scanner2 | MYMFC1 | 192.1.1.2 | | http:://···/scn | Scan |

| DEVICE ID | GID | ADDRESS | DataSink URL | Src. URL | Service |
|---|---|---|---|---|---|
| Printer1 | MYMFC1 | 192.1.1.3 | http://···/ipp | | Print |
| Printer2 | MYMFC2 | 192.1.1.4 | http://···/ipp | | Print |

| DEVICE ID | GID | ADDRESS | DataSink URL | Src. URL | Service |
|---|---|---|---|---|---|
| fax1 | MYMFC1 | 192.1.1.5 | http://···/ipp | | Fax |
| fax2 | MYMFC2 | 192.1.1.6 | http://···/ipp | | Fax |

| DEVICE ID | GID | ADDRESS | DataSink URL | Src. URL | Service |
|---|---|---|---|---|---|
| disk1 | MYMFC1 | 192.1.1.7 | http://···/ipp | | Storage |
| disk2 | MYMFC2 | 192.1.1.8 | http://···/ipp | | Storage |

FIG.20

| DEVICE ID | ADDRESS | DataSink URL | Src. URL | Service | Location | Capability |
|---|---|---|---|---|---|---|
| Scanner1 | 192.1.1.1 | | http://•••/scn | Scan | 112° 11′ 10″<br>100° 50′ 10″ | Mono/600dpi/A4 |
| Scanner2 | 192.1.1.2 | | http://•••/scn | Scan | 112° 11′ 10″<br>100° 70′ 10″ | Color/600dpi/A4 |

| DEVICE ID | ADDRESS | DataSink URL | Src. URL | Service | Location | Capability |
|---|---|---|---|---|---|---|
| Printer1 | 192.1.1.3 | http://•••/ipp | | Print | 112° 11′ 10″<br>100° 65′ 10″ | Color/1200dpi/A4 |
| Printer2 | 192.1.1.4 | http://•••/ipp | | Print | 112° 11′ 10″<br>100° 60′ 10″ | Mono/600dpi/A4 |

| DEVICE ID | ADDRESS | DataSink URL | Src. URL | Service | Location | Capability |
|---|---|---|---|---|---|---|
| fax1 | 192.1.1.5 | http://•••/ipp | | Fax | 112° 11′ 10″<br>100° 65′ 10″ | Color/1200dpi/A4 |
| fax2 | 192.1.1.6 | http://•••/ipp | | Fax | 112° 11′ 10″<br>100° 60′ 10″ | Mono/600dpi/A4 |

| DEVICE ID | ADDRESS | DataSink URL | Src. URL | Service | Location | Capability |
|---|---|---|---|---|---|---|
| disk1 | 192.1.1.7 | http://•••/ipp | | Storage | 112° 11′ 10″<br>100° 80′ 10″ | |
| disk2 | 192.1.1.8 | http://•••/ipp | | Storage | 112° 11′ 10″<br>100° 90′ 10″ | |

FIG.21A

| | |
|---|---|
| function=confirm. copy<br>(function=copy) | FOR CONFIRMATION: COMPOSITE SERVICE=COPY SERVICE<br>(FOR EXECUTION: COMPOSITE SERVICE=COPY SERVICE) |
| reciperelay=yes<br>recipesendmail=no<br>reciperevererelay=no | RECIPE RECEPTION/TRANSMISSION BETWEEN DEVICES BY FORWARD RELAYING TYPE=NECESSARY<br>TRANSMIT RECIPE TO ALL DETERMINED DEVICES=UNNECESSARY<br>RECIPE RECEPTION/TRANSMISSION BETWEEN DEVICES BY REVERSE RELAYING TYPE=UNNECESSARY |
| replyID=no. | USER ID REPLY=UNNECESSARY |
| copy. device. panel=panel 1<br>copy. device. scan=scanner 1<br>copy. device. print=printer 1 | PANEL RECEIVING PROGRESS REPORT=PANEL 1<br>DEVICE OF SERVICE 1 (SCAN SERVICE )=SCANNER 1<br>DEVICE OF SERVICE 2 (PRINTER SERVICE)=PRINTER 1 |
| copy. address. panel=*****<br>copy. address. scan=192. 1. 1. 1<br>copy. address. print=192. 1. 1. 3 | IP ADDRESS OF PANEL= *****<br>IP ADDRESS OF DEVICE FOR SERVICE 1=192. 1. 1. 1<br>IP ADDRESS OF DEVICE FOR SERVICE 2=192. 1. 1. 3 |
| pannel. progress=yes | PROGRESS REPORT FROM PANEL=NECESSARY |

FIG.21B scan. resolution=600 × 2400
scan. color=yes
scan. format=image/jpeg
scan. guide. sound=yes
scan. progress=yes
scan. userstart=yes
scan. pushdata=prin print. media. type=stationary
print. media. size=iso_a4_210 × 297mm
print. inputformat=image/jpeg
print. color=yes
print. orientation=portrait
print. copies=1
print. quality=normal
print. guide. sound=yes
print. progress=yes
print. userstart=no
print. pulldata=no (OPERATION CONDITIONS OF SCANNING)
RESOLUTION=600 * 2400
COLOR=YES
TYPE OF OUTPUT DOCUMENT=IMAGE/jpeg
SOUND/VOICE GUIDANCE=NECESSARY
PROGRESS REPORT FROM SCANNER=NECESSARY
START INSTRUCTION FOR SCANNING BY USER=NECESSARY
DESTINATION OF SCANNED DATA=PRINT (OPERATION CONDITIONS OF PRINTING)
SHEET TYPE=STATIONARY
SHEET SIZE=ISO_A4_210 * 297mm
TYPE OF INPUT DOCUMENT=IMAGE/jpeg
COLOR=YES
SHEET ORIENTATION=PORTRAIT
NUMBER OF COPIES=1
PRINT QUALITY=NORMAL
SOUND/VOICE GUIDANCE=NECESSARY
PROGRESS REPORT FROM PRINTER=NECESSARY
START INSTRUCTION FOR PRINTING BY USER=UNNECESSARY
SOURCE OF PRINT DATA=NO DESIGNATION

FIG.22A

| | |
|---|---|
| function=confirm. remotefax | FOR CONFIRMATION: COMPOSITE SERVICE=REMOTE FAX SERVICE |
| (function=remotefax) | (FOR EXECUTION: COMPOSITE SERVICE=REMOTE FAX SERVICE) |
| | |
| reciperelay=yes | RECIPE RECEPTION/TRANSMISSION BETWEEN DEVICES BY FORWARD RELAYING TYPE=NECESSARY |
| recipesendall=no | TRANSMIT RECIPE TO ALL DETERMINED DEVICES=UNNECESSARY |
| recipereverserelay=no | RECIPE RECEPTION/TRANSMISSION BETWEEN DEVICES BY REVERSE RELAYING TYPE=UNNECESSARY |
| | |
| replyID=no | USER ID REPLY=UNNECESSARY |
| | |
| copy. device. panel=panel 1 | PANEL RECEIVING PROGRESS REPORT=PANEL 1 |
| copy. device. scan=scanner 1 | DEVICE OF SERVICE 1 (SCAN SERVICE )=SCANNER 1 |
| copy. device. fax=fax 1 | DEVICE OF SERVICE 2 (FAX SERVICE)=FAX 1 |
| | |
| remotefax. address. panel=***** | IP ADDRESS OF PANEL=***** |
| remotefax. address. scan=192.1.1.1 | IP ADDRESS OF DEVICE FOR SERVICE 1=192.1.1.1 |
| remotefax. address. fax=192.1.1.5 | IP ADDRESS OF DEVICE FOR SERVICE 2=192.1.1.5 |
| | |
| pannel. progress=yes | PROGRESS REPORT FROM PANEL=NECESSARY |

FIG.22B scan. resolution=600 × 2400
scan. color=yes
scan. format=image/jpeg
scan. guide. sound=yes
scan. progress=yes
scan. userstart=yes
scan. pushdata=fax fax. media. size=iso_a4_210 × 297mm
fax. inputoformat=image/jpeg
fax. color=yes
fax. guide. sound=yes
fax. progress=yes
fax. userstart=no
fax. pulldata=no (OPERATION CONDITIONS OF SCANNING)
RESOLUTION=600 * 2400
COLOR=YES
TYPE OF OUTPUT DOCUMENT=IMAGE/jpeg
SOUND/VOICE GUIDANCE=NECESSARY
PROGRESS REPORT FROM SCANNER=NECESSARY
START INSTRUCTION FOR SCANNING BY USER=NECESSARY
DESTINATION OF SCANNED DATA=FAX (OPERATION CONDITIONS OF FAX SERVICE)
TRANSMISSION SIZE=ISO_A4 210 * 297mm
TYPE OF INPUT DOCUMENT=IMAGE/jpeg
COLOR=YES
SOUND/VOICE GUIDANCE=NECESSARY
PROGRESS REPORT FROM FAX=NECESSARY
START INSTRUCTION FOR FAX SERVICE BY USER=UNNECESSARY
SOURCE OF DATA=NO DESIGNATION

FIG.23A

| | |
|---|---|
| function=confirm, imagekeep (function=imagekeep) | FOR CONFIRMATION: COMPOSITE SERVICE=IMAGE STORING SERVICE (FOR EXECUTION: COMPOSITE SERVICE=IMAGE STORING SERVICE) |
| reciperelay=yes | RECIPE RECEPTION/TRANSMISSION BETWEEN DEVICES BY FORWARD RELAYING TYPE=NECESSARY |
| recipesendall=no | TRANSMIT RECIPE TO ALL DETERMINED DEVICES=UNNECESSARY |
| reciperevercerelay=no | RECIPE RECEPTION/TRANSMISSION BETWEEN DEVICES BY REVERSE RELAYING TYPE=UNNECESSARY |
| replyID=no | REPLY USER ID=UNNECESSARY |
| Imagekeep. device. panel=panel 1 | PANEL RECEIVING PROGRESS REPORT=PANEL 1 |
| imagekeep. device. scan=scanner 1 | DEVICE OF SERVICE 1 (SCAN SERVICE)=SCANNER 1 |
| imagekeep. device. storage=disk 1 | DEVICE OF SERVICE 2 (IMAGE STORING SERVICE)=DISK 1 |
| imagekeep. address. panel=***** | IP ADDRESS OF PANEL= ***** |
| imagekeep. address. scan=192.1.1.1 | IP ADDRESS OF DEVICE FOR SERVICE 1=192.1.1.1 |
| imagekeep. address. storage=192.1.1.7 | IP ADDRESS OF DEVICE FOR SERVICE 2=192.1.1.7 |
| pannel. progress=yes | PROGRESS REPORT FROM PANEL=NECESSARY |

FIG.23B function=confirm. imagekeep
(function=imagekeep)

reciperelay=yes           (OPERATION CONDITIONS OF SCANNING)
recipesendall=no          RESOLUTION=600 * 2400
reciperevercerelay=no     COLOR=YES
                          TYPE OF OUTPUT DOCUMENT=IMAGE/jpeg
replyID=no                SOUND/VOICE GUIDANCE=NECESSARY
                          PROGRESS REPORT FROM SCANNER=NECESSARY
imagekeep. device. panel=panel 1       START INSTRUCTION FOR SCANNING BY USER=NECESSARY
imagekeep. device. scan=scanner 1      DESTINATION OF SCANNED DATA=STORAGE
imagekeep. device. storage=disk 1
                                       (OPERATION CONDITIONS OF IMAGE STORING SERVICE)
imagekeep. address. panel=・・・         COMPRESSED DATA=NECESSARY
imagekeep. address. scan=192. 1. 1. 1  SOUND/VOICE GUIDANCE=NECESSARY
imagekeep. address. storage=192. 1. 1. 1. 7  PROGRESS REPORT FROM STORAGE=NECESSARY
                                       START INSTRUCTION FOR STORAGE SERVICE BY USER=UNNECESSARY
pannel. progress=yes                   SOURCE OF DATA TO BE STORED=NO DESIGNATION

FIG.24

| JOB LIST | | | | |
|---|---|---|---|---|
| Index | JOBD | Owner(UserID) | Status | Other Informations |
| 1 | JOB1 | MARK | Processing | |
| 2 | JOB2 | KATO | Standby | jpeg |
| 3 | JOB3 | none | Creating | |

FIG.29A

| | |
|---|---|
| function=confirm. copy<br>(function=copy) | FOR CONFIRMATION: COMPOSITE SERVICE=COPY SERVICE<br>(FOR EXECUTION: COMPOSITE SERVICE=COPY SERVICE) |
| reciperelay=no<br>recipesendall=no<br>reciperevercerelay=no | RECIPE RECEPTION/TRANSMISSION BETWEEN DEVICES BY FORWARD RELAYING TYPE=UNNECESSARY<br>TRANSMIT RECIPE TO ALL DETERMINED DEVICES=UNNECESSARY<br>RECIPE RECEPTION/TRANSMISSION BETWEEN DEVICES BY REVERSE RELAYING TYPE=UNNECESSARY |
| replyID=no | REPLY USER ID=UNNECESSARY |
| copy. device. panel=panel 1<br>copy. device. scan=scanner 1<br>copy. device. print=no | PANEL RECEIVING PROGRESS REPORT=PANEL 1<br>DEVICE OF SERVICE 1 (SCAN SERVICE)=SCANNER 1<br>DEVICE OF SERVICE 2 (PRINTER SERVICE)=NO DESIGNATION |
| copy. address. panel=***<br>copy. address. scan=192.1.1.1<br>copy. address. print=no | IP ADDRESS OF PANEL=***<br>IP ADDRESS OF DEVICE FOR SERVICE 1=192.1.1.1<br>IP ADDRESS OF DEVICE FOR SERVICE 2=NO DESIGNATION |
| pannel. progress=yes | PROGRESS REPORT FROM PANEL=NECESSARY |

FIG. 29B scan.resolution=600 × 2400
scan.color=yes
scan.format=image/jpeg
scan.guide.sound=yes
scan.progress=yes
scan.userstart=yes
scan.pushdata=print print.media.type=stationary
print.media.size=iso_a4 210 × 297mm
print.inputformat=image/jpeg
print.color=yes
print.orientation=portrait
print.copies=1
print.quality=normal
print.guide.sound=yes
print.progress=yes
print.userstart=no
print.pulldata=no (OPERATION CONDITIONS OF SCANNING)
RESOLUTION=600 * 2400
COLOR=YES
TYPE OF OUTPUT DOCUMENT=IMAGE/jpeg
SOUND/VOICE GUIDANCE=NECESSARY
PROGRESS REPORT FROM SCANNER=NECESSARY
START INSTRUCTION FOR SCANNING BY USER=NECESSARY
DESTINATION OF SCANNED DATA=PRINT (OPERATION CONDITIONS OF PRINTING)
SHEET TYPE=STATIONARY
SHEET SIZE=ISO_A4 210 * 297mm
TYPE OF INPUT DOCUMENT=IMAGE/jpeg
COLOR=YES
SHEET ORIENTATION=PORTRAIT
NUMBER OF COPIES=1
PRINT QUALITY=NORMAL
SOUND/VOICE GUIDANCE=NECESSARY
PROGRESS REPORT FROM PRINTER=NECESSARY
START INSTRUCTION FOR PRINTING BY USER=UNNECESSARY
SOURCE OF PRINT DATA=NO DESIGNATION

FIG.38

| COMPOSITE SERVICE | SERVICE 1 | SERVICE 2 | SERVICE 3 |
|---|---|---|---|
| COPY | SCAN START INSTRUCTION REQUIRED | PRINT /PULL SERVICE 1 | |
| REMOTE FAX | SCAN START INSTRUCTION REQUIRED | FAX /PULL SERVICE 1 | |
| IMAGE STORING | SCAN START INSTRUCTION REQUIRED | IMAGE /PULL SERVICE 1 | |
| FAX IMAGE STORING | SCAN START INSTRUCTION REQUIRED | FAX /PULL SERVICE 1 | IMAGE STORAGE /PULL SERTVICE 2 |

FIG.39A

| | |
|---|---|
| function=confirm. copy (function=copy) | FOR CONFIRMATION: COMPOSITE SERVICE=COPY SERVICE (FOR EXECUTION: COMPOSITE SERVICE=COPY SERVICE) |
| reciperelay=no | RECIPE RECEPTION/TRANSMISSION BETWEEN DEVICES BY FORWARD RELAYING TYPE=UNNECESSARY |
| recipesendall=no | TRANSMIT RECIPE TO ALL DETERMINED DEVICES=UNNECESSARY |
| recipereverserelay=no | RECIPE RECEPTION/TRANSMISSION BETWEEN DEVICES BY REVERSE RELAYING TYPE=UNNECESSARY |
| replyID=yes | REPLY USER ID=NECESSARY |
| copy. device. panel=panel 1 | PANEL RECEIVING PROGRESS REPORT=PANEL 1 |
| copy. device. scan=scanner 1 | DEVICE OF SERVICE 1 (SCAN SERVICE)=SCANNER 1 |
| copy. device. print=no | DEVICE OF SERVICE 2 (PRINTER SERVICE)=NO DESIGNATION |
| copy. address. panel=***** | IP ADDRESS OF PANEL=***** |
| copy. address. scan=192.1.1.1 | IP ADDRESS OF DEVICE FOR SERVICE 1=192.1.1.1 |
| copy. address. print=no | IP ADDRESS OF DEVICE FOR SERVICE 2=NO DESIGNATION |
| pannel. progress=yes | PROGRESS REPORT FROM PANEL=NECESSARY |

FIG.39B scan.resolution=600 × 2400
scan.color=yes
scan.format=image/jpeg
scan.guide.sound=yes
scan.progress=yes
scan.userstart=yes
scan.pushdata=print print.media.type=stationary
print.media.size=iso_a4_210 × 297mm
print.inputformat=image/jpeg
print.color=yes
print.orientation=portrait
print.copies=1
print.quality=normal
print.guide.sound=yes
print.progress=yes
print.userstart=no
print.pulldata=scan (OPERATION CONDITIONS OF SCANNING)
RESOLUTION=600 * 2400
COLOR=YES
TYPE OF OUTPUT DOCUMENT=IMAGE/jpeg
SOUND/VOICE GUIDANCE=NECESSARY
PROGRESS REPORT FROM SCANNER=NECESSARY
START INSTRUCTION FOR SCANNING BY USER=NECESSARY
DESTINATION OF SCANNED DATA=NO DESIGATION (OPERATION CONDITIONS OF PRINTING)
SHEET TYPE=STATIONARY
SHEET SIZE=ISO_A4 210 * 297mm
TYPE OF INPUT DOCUMENT=IMAGE/jpeg
COLOR=YES
SHEET ORIENTATION=PORTRAIT
NUMBER OF COPIES=1
PRINT QUALITY=NORMAL
SOUND/VOICE GUIDANCE=NECESSARY
PROGRESS REPORT FROM PRINTER=NECESSARY
START INSTRUCTION FOR PRINTING BY USER=UNNECESSARY
SOURCE OF PRINT DATA=SCANNER

FIG.41A

| | |
|---|---|
| function=confirm. copy<br>(function=copy) | FOR CONFIRMATION: COMPOSITE SERVICE=COPY SERVICE<br>(FOR EXECUTION: COMPOSITE SERVICE=COPY SERVICE) |
| reciperelay=no<br>recipesendall=yes<br>recipereverserelay=no | RECIPE RECEPTION/TRANSMISSION BETWEEN DEVICES BY FORWARD RELAYING TYPE=UNNECESSARY<br>TRANSMIT RECIPE TO ALL DETERMINED DEVICES=UNNECESSARY<br>RECIPE RECEPTION/TRANSMISSION BETWEEN DEVICES BY REVERSE RELAYING TYPE=UNNECESSARY |
| replyID=no | REPLY USER ID=NECESSARY |
| copy. device. panel=panel 1<br>copy. device. scan=scanner 1<br>copy. device. print=printer 1 | PANEL RECEIVING PROGRESS REPORT=PANEL 1<br>DEVICE OF SERVICE 1 (SCAN SERVICE )=SCANNER 1<br>DEVICE OF SERVICE 2 (PRINTER SERVICE)=PRINTER 1 |
| copy. address. panel=*****<br>copy. address. scan=192. 1. 1. 1<br>copy. address. print=192. 1. 1. 3 | IP ADDRESS OF PANEL= *****<br>IP ADDRESS OF DEVICE FOR SERVICE 1=192. 1. 1. 1<br>IP ADDRESS OF DEVICE FOR SERVICE 2=192. 1. 1. 3 |
| pannel. progress=yes | PROGRESS REPORT FROM PANEL=NECESSARY |

FIG.41B scan.resolution=600 × 2400　(OPERATION CONDITIONS OF SCANNING)
scan.color=yes　　　　　　　RESOLUTION=600 * 2400
scan.format=image/jpeg　　　COLOR=YES
scan.guide.sound=yes　　　　TYPE OF OUTPUT DOCUMENT=IMAGE/jpeg
scan.progress=yes　　　　　 SOUND/VOICE GUIDANCE=NECESSARY
scan.userstart=yes　　　　　PROGRESS REPORT FROM SCANNER=NECESSARY
scan.pushdata=prin　　　　　START INSTRUCTION FOR SCANNING BY USER=NECESSARY
　　　　　　　　　　　　　　DESTINATION OF SCANNED DATA=PRINT print.media.type=stationary　　　　(OPERATION CONDITIONS OF PRINTING)
print.media.size=iso_a4_210 × 297mm　SHEET TYPE=STATIONARY
print.inputofformat=image/jpeg　　　SHEET SIZE=ISO_A4 210 * 297mm
print.color=yes　　　　　　　　　　 TYPE OF INPUT DOCUMENT=IMAGE/jpeg
print.orientation=portrait　　　　　COLOR=YES
print.copies=1　　　　　　　　　　　SHEET ORIENTATION=PORTRAIT
print.quality=normal　　　　　　　　NUMBER OF COPIES=1
print.guide.sound=yes　　　　　　　 PRINT QUALITY=NORMAL
print.progress=yes　　　　　　　　　SOUND/VOICE GUIDANCE=NECESSARY
print.userstart=no　　　　　　　　　PROGRESS REPORT FROM PRINTER=NECESSARY
print.pulldata=no　　　　　　　　　 START INSTRUCTION FOR PRINTING BY USER=UNNECESSARY
　　　　　　　　　　　　　　　　　　SOURCE OF PRINT DATA=NO DESIGNATION

FIG.43A

| | |
|---|---|
| function=confirm, copy | FOR CONFIRMATION: COMPOSITE SERVICE=COPY SERVICE |
| (function=copy) | (FOR EXECUTION: COMPOSITE SERVICE=COPY SERVICE) |
| | |
| reciperelay=no | RECIPE RECEPTION/TRANSMISSION BETWEEN DEVICES BY FORWARD RELAYING TYPE=UNNECESSARY |
| recipesendall=no | TRANSMIT RECIPE TO ALL DETERMINED DEVICES=UNNECESSARY |
| reciperevercerelay=yes | RECIPE RECEPTION/TRANSMISSION BETWEEN DEVICES BY REVERSE RELAYING TYPE=NECESSARY |
| | |
| replyID=no | REPLY USER ID=UNNECESSARY |
| | |
| copy.device.panel=panel 1 | PANEL RECEIVING PROGRESS REPORT=PANEL 1 |
| copy.device.scan=scanner 1 | DEVICE OF SERVICE 1 (SCAN SERVICE)=SCANNER 1 |
| copy.device.print=printer 1 | DEVICE OF SERVICE 2 (PRINTER SERVICE)=PRINTER 1 |
| | |
| copy.address.panel=*****  | IP ADDRESS OF PANEL=***** |
| copy.address.scan=192.1.1.1 | IP ADDRESS OF DEVICE FOR SERVICE 1=192.1.1.1 |
| copy.address.print=192.1.1.3 | IP ADDRESS OF DEVICE FOR SERVICE 2=192.1.1.3 |
| | |
| pannel.progress=yes | PROGRESS REPORT FROM PANEL=NECESSARY |

FIG.43B scan.resolution=600 × 2400
scan.color=yes
scan.format=image/jpeg
scan.guide.sound=yes
scan.progress=yes
scan.userstart=yes
scan.pushdata=no print.media.type=stationary
print.media.size=iso_a4_210 × 297mm
print.inputformat=image/jpeg
print.color=yes
print.orientation=portrait
print.copies=1
print.quality=normal
print.guide.sound=yes
print.progress=yes
print.userstart=no
print.pulldata=scan (OPERATION CONDITIONS OF SCANNING)
RESOLUTION=600 * 2400
COLOR=YES
TYPE OF OUTPUT DOCUMENT=IMAGE/jpeg
SOUND/VOICE GUIDANCE=NECESSARY
PROGRESS REPORT FROM SCANNER=NECESSARY
START INSTRUCTION FOR SCANNING BY USER=NECESSARY
DESTINATION OF SCANNED DATA=NO DESIGNATION (OPERATION CONDITIONS OF PRINTING)
SHEET TYPE=STATIONARY
SHEET SIZE=ISO_A4_210 * 297mm
TYPE OF INPUT DOCUMENT=IMAGE/jpeg
COLOR=YES
SHEET ORIENTATION=PORTRAIT
NUMBER OF COPIES=1
PRINT QUALITY=NORMAL
SOUND/VOICE GUIDANCE=NECESSARY
PROGRESS REPORT FROM PRINTER=NECESSARY
START INSTRUCTION FOR PRINTING BY USER=UNNECESSARY
SOURCE OF PRINT DATA=SCANNER

COMPOSITE SERVICE PROVIDING SYSTEM

This is a Continuation of application Ser. No. 10/854,415 filed May 27, 2004, which claims the benefit of Japanese Application No. 2003-153266 filed May 29, 2003 and Japanese Application No. 2003-153267 filed May 29, 2003. The disclosures of the prior applications are hereby incorporated by reference herein in their entirety.

BACKGROUND

The present invention relates to a composite service providing system, which is configured to have a communicatively connected plurality of electronic devices, each of which provides at least one service, the composite service providing system providing a composite service which is realized by combining a plurality of services respectively provided by the electronic devices.

Conventionally, an MFP (multifunction peripheral) has been known. The MFP is implemented with a plurality of functions such as printer, scanner and facsimile functions in one apparatus. In contrast to the MFP, there has also been known a composite service providing system which typically includes a plurality of electronic devices such as printer, scanner and fax modem individually connected to a network and functions as a single MFP as a whole.

By use of the composite service providing system, for example, by scanning an image with a scanner connected to a network and by printing the scanned image with a printer connected to the same network, the system can be used as copier. In another example, when the scanned image is sent to a fax modem, the system functions as a facsimile device.

Japanese patent provisional publication No. P2000-90208A discloses a system in which various services can be provided by combining a plurality of cards having various functions.

Japanese patent provisional publication No. P2001-282488A discloses a system in which printers having similar functions are detected and incorporated in the same multicast address. By transmitting print data to the multicast address, printing is executed in parallel using the plurality of printers.

Japanese patent provisional publication No. HEI 11-305966 discloses a system in which printing is done by a plurality of printers in accordance with multicast transmission of print data. Further, according to this publication, by incorporating IDs in the print data, different instructions can be sent to the plurality of the printers, respectively.

Japanese patent provisional publication No. P2002-73462A discloses a system in which, by designating a content ID and/or an output destination ID when printing is instructed, print data and/or print output destination are automatically determined.

Japanese patent provisional publication No. P2000-295658A discloses a method of limiting a communication area by decreasing the radio transmission power, and exchanging authentication information with devices within the limited area.

Japanese patent provisional publication No. P2001-177599A discloses a system in which, by use of a USB (Universal Serial Bus) cable, authentication information is exchanged only with a device connected through the USB cable before starting a wireless communication therebetween.

Japanese patent provisional publication No. P2001-238238A discloses a method of grouping a plurality of devices by use of IDs assigned thereto.

The conventional systems as exemplified above are, however, less operative in comparison with the MFP with which a plurality of functions are provided, and a plurality of services can be realized with a single apparatus.

SUMMARY

The present invention is advantageous in that an improved composite service providing system can be achieved, in which a user of the system can easily recognize which device is to be used, how to operate the device, and progression of a currently provided service.

The present invention is further advantageous in that an improved composite service providing system can be realized, with which the user can receive the services as if the system is an MFP apparatus which does not require complicated operations.

According to an aspect of the invention, there is provided a composite service providing system including a plurality of network electronic devices communicatively connected with each other, the plurality of network electronic devices including electronic devices each of which is capable of providing at least one service, a plurality of services provided by a plurality of electronic devices being combined to constitute a composite service. The composite service providing system further includes a composite service designating system that designates a composite service to be provided, an electronic device determining system that determines an electronic device that provides each of a plurality of services necessary for providing the composite service designated with the composite service designating system, and a controlling system that control the electronic devices determined by the electronic device determining system to provide the services so that the composite service designated by the designating system is provided.

With this configuration, the user is not required to perform troublesome operations, and can use the entire composite service system as an all-in-one MFP (multifunction peripheral).

Optionally, the composite service providing system may further include an electronic device notifying system that notifies each of the electronic devices determined by the electronic device determining system.

With this configuration, the user can recognize the device to be operated easily.

Further optionally, the composite service providing system may include a progress notifying system that notifies a progress of the composite service.

With this configuration, the user can recognize the progress of the composite service easily.

Optionally, the composite service may be provided as the plurality of services necessary for providing the composite service are executed in a predetermined order, and the composite service providing system may further include a usage order notifying system that notifies the predetermined order in which the plurality of services necessary for providing the composite service are executed.

In a particular case, the composite service providing system may further include an order storing system that stores the predetermined order of the plurality of services in relation with the composite service, and the usage order notifying system may be configured to notify the order of the plurality of services in accordance with contents of the order storing system.

Optionally, the composite service providing system may further include a location information notifying system that notifies a location of each of the plurality of electronic devices necessary for providing the composite service.

Particularly, composite service providing system may further include a location obtaining system that obtains location information of the plurality of electronic devices necessary for providing the composite service, and the location information notifying system may be configured to notify the locations of the plurality of electronic devices necessary for providing the composite service in accordance with obtained results of the location obtaining system.

Optionally, the electronic device may include a service execution notifying system that notifies that the electronic itself executes a service when the electronic device executes the service.

Further optionally, the composite service providing system may further include a progress notifying system that notifies a progress of the composite service.

In particular, the composite service designating system and the progress notifying system may be implemented in the same electronic device.

In this case, each of the electronic devices may be configured to notify, when it executes a service, a start of execution of the service to the electronic device that is implemented with the composite service designating system and the progress notifying system, and the progress notifying system may be configured to notify the progress of the composite service in accordance with the notifications by the electronic devices.

In this case, each of the electronic devices may be configured to notify, when a service is finished, an end of execution of the service to the electronic device that is implemented with the composite service designating system and the progress notifying system, and the progress notifying system may be configured to notify the progress of the composite service in accordance with the notifications by the electronic devices.

Still optionally, the composite service providing system may further include a composite service completion notifying system that notifies a completion of the composite service when all the services necessary for providing the composite service are completed.

In a particular case, the composite service providing system may further include an error notifying system that notifies that the composite service cannot be completed within a given time period if the services necessary for providing the composite service are not completed within a predetermined time period.

Optionally, the composite service providing system may further include a service type obtaining system that obtains, from the electronic devices, a type of a service each of the electronic device is capable of providing, and the electronic device determining system may be configured to determine the electronic devices based on obtained results of the service type obtaining system.

Optionally, predetermined ones of the electronic devices used for providing the composite service may be assigned with a same identifier, and the electronic device determining system may be configured to determine the electronic devices that respectively execute the plurality of services from among the electronic devices having the same identifier.

In particular, the composite service providing system may further include a service type obtaining system that obtains, from the electronic devices having the same identifier as the electronic device having the composite service designating system has, a type of a service each of the electronic device is capable of providing, and the electronic device determining system may be configured to determine the electronic devices based on obtained results of the service type obtaining system.

Further, each electronic device may be configured to memorize an assigned identifier, and the service type obtaining system may be configured to transmit an inquiry including the identifier assigned to the electronic device implemented with the composite service designating system to the plurality of electronic devices, the service type obtaining system receives a reply from each of the electronic devices having the identifier same as that included in the inquiry, the reply including a type of a service the electronic device provides, the service type obtaining system obtaining the service type of each electronic device based on the reply therefrom.

Optionally, the electronic device determining system may determine the electronic devices in accordance with locations of the electronic devices.

Further, the composite service providing system may include a location obtaining system that obtains locations of the electronic devices, and the electronic device determining system may be configured to determine the electronic devices in accordance with the obtained results of the location obtaining system.

Still optionally, the composite service providing system may include a usage condition designating system that designates usage conditions regarding the composite service, and the electronic device determining system may determine devices that operate under the usage conditions designated by the usage condition designating system as the electronic devices executing the services.

In a particular case, the composite service providing system may include a capability obtaining system that obtains from electronic devices capability information thereof, and an operation determining system that determines whether each electronic device is capable of operating under a designated usage condition designated by the usage condition designating system in accordance with the capability information obtained by the capability obtaining system. In this case, the electronic device determining system may determine an electronic device in accordance with results of determination by the operation determining system.

Optionally, the composite service providing system may further include a user recognition system that recognizes a user, and the electronic device determining system determines the electronic devices in accordance with the user recognized by the user recognition system.

Further optionally, the composite service providing system may further include an electronic device designating system, which is used to designate one of a plurality of electronic devices that are determined by the electronic device determining system to provide a certain service.

Furthermore optionally, the composite service providing system may further include a notifying system that notifies that at least one electronic device that provides at least one of the plurality of services cannot be determined by the electronic device determining system.

Optionally, a plurality of electronic devices respectively providing the plurality of services are determined by an electronic device determining system provided to a single electronic device.

In particular, the electronic devices provided with the electronic device determining systems may include service providing systems, respectively, and the electronic devices respectively providing the plurality of services may be determined such that the electronic devices provided with the electronic device determining systems are selected prior to the other electronic devices.

Optionally, the controlling system may include an execution information creating system that creates service execution information in which each of the plurality of services is related to an electronic device determined by the electronic device determining system, an execution information transmitting system that transmits the service execution information created by the execution information creating system to the electronic device determined by the electronic device determining system, and the electronic device that receives the service execution information transmitted by the execution information transmitting system executes the service.

Optionally, the execution information transmitting system may be implemented in each electronic device that provides a service, and the service execution information may be transferred to an electronic device providing a first service of the composite service, and then forwardly relayed among the electronic devices providing succeeding services one after another.

Alternatively, the execution information transmitting system may be configured to transmit the service execution information to all the electronic devices providing the services constituting the composite service simultaneously.

Further alternatively, the execution information transmitting system may be implemented in each electronic device that provides a service, and the service execution information may be transferred to an electronic device providing a last service of the composite service, and then reversely relayed among the electronic devices providing preceding services one after another.

Optionally, the composite service may be provided as a plurality of services necessary for providing the composite service in accordance with a predetermined order, and the electronic device providing the service may be configured to determine by the electronic device determining system implemented with an electronic device executing a service to be executed immediately before the service.

In particular, the controlling system may include an execution information creating system that creates service execution information including services for which electronic devices have not been determined, and services to be executed, and an execution information transmitting system that transmits the service execution information created by the execution information creating system to the electronic device determined by the electronic device determining system. Further, the electronic device that receives the service execution information transmitted by the execution information transmitting system may execute the service.

Still optionally, at least one of the plurality of electronic devices may be configured to provide a scan service, at least one of the plurality of electronic devices may be configured to provide a print service, and the composite service includes a copy service.

Alternatively, at least one of the plurality of electronic devices may be configured to provide a scan service, at least one of the plurality of electronic devices may be configured to provide a fax modem service, and the composite service includes a fax transmission service.

Further alternatively, at least one of the plurality of electronic devices may be configured to provide a scan service, at least one of the plurality of electronic devices provides a storage service, and the composite service includes an image storing service.

According to another aspect of the invention, there is provided an electronic device for a composite service providing system including a plurality of network electronic devices communicatively connected with each other, the plurality of network electronic devices including electronic devices each of which is capable of providing at least one service, a plurality of services provided by a plurality of electronic devices being combined to constitute a composite service. The electronic device may include a composite service designating system that designates a composite service to be provided, an electronic device determining system that determines an electronic device that provides each of a plurality of services necessary for providing the composite service designated with the composite service designating system, and a controlling system that control the electronic devices determined by the electronic device determining system to provide the services so that the composite service designated by the designating system is provided.

Optionally, the electronic device may include an electronic device notifying system that notifies each of the electronic devices determined by the electronic device determining system.

According to a further aspect of the invention, there is provided a computer program product for a computer, the computer program product containing computer accessible instructions which cause the computer to function as an electronic device for a composite service providing system including a plurality of network electronic devices communicatively connected with each other, the plurality of network electronic devices including electronic devices each of which is capable of providing at least one service, a plurality of services provided by a plurality of electronic devices being combined to constitute a composite service. In this case, the electronic device realized by the computer may be configured to include a composite service designating system that designates a composite service to be provided, an electronic device determining system that determines an electronic device that provides each of a plurality of services necessary for providing the composite service designated with the composite service designating system, and a controlling system that control the electronic devices determined by the electronic device determining system to provide the services so that the composite service designated by the designating system is provided.

Optionally, the instructions may further cause the computer to include an electronic device notifying system that notifies each of the electronic devices determined by the electronic device determining system.

BRIEF DESCRIPTION OF THE DRAWINGS

FIG. 17 shows a service table which is provided in each of the remote terminal and designated device according to the first, second and fourth embodiments;

FIG. 18 shows device information tables according to the first, second, fourth and fifth embodiments;

FIG. 19 shows examples of contents of reply packet in response to a service discovery from the device, according to the first, second, fourth and fifth embodiments;

FIG. 20 shows examples of device descriptions provided by the devices, according to the first through fifth embodiments;

FIGS. 21A and 21B show an example of a recipe according to the first embodiment when the composite service is copying;

FIGS. 22A and 22B show an example of a recipe according to the first embodiment when the composite service is remote FAX;

FIGS. 23A and 23B show an example of a recipe according to the first embodiment when the composite service is image capture;

FIG. 24 is an example of a job list provided in the scanner, according to the first through fifth embodiments;

FIGS. 29A and 29B show an example of the recipe according to the second embodiment;

FIG. 38 shows an example of a service table provided in the remote terminal and device according to the third embodiment;

FIGS. 39A and 29B show an example of the recipe according to the third embodiment;

FIGS. 41A and 41B show a recipe according to the fourth embodiment;

FIGS. 43A and 43B show an example of a recipe according to the fifth embodiment;

DETAILED DESCRIPTION OF EMBODIMENTS

Referring to the accompanying drawings, composite service providing systems according to first through fifth embodiments of the invention will be described.

Figure 1:
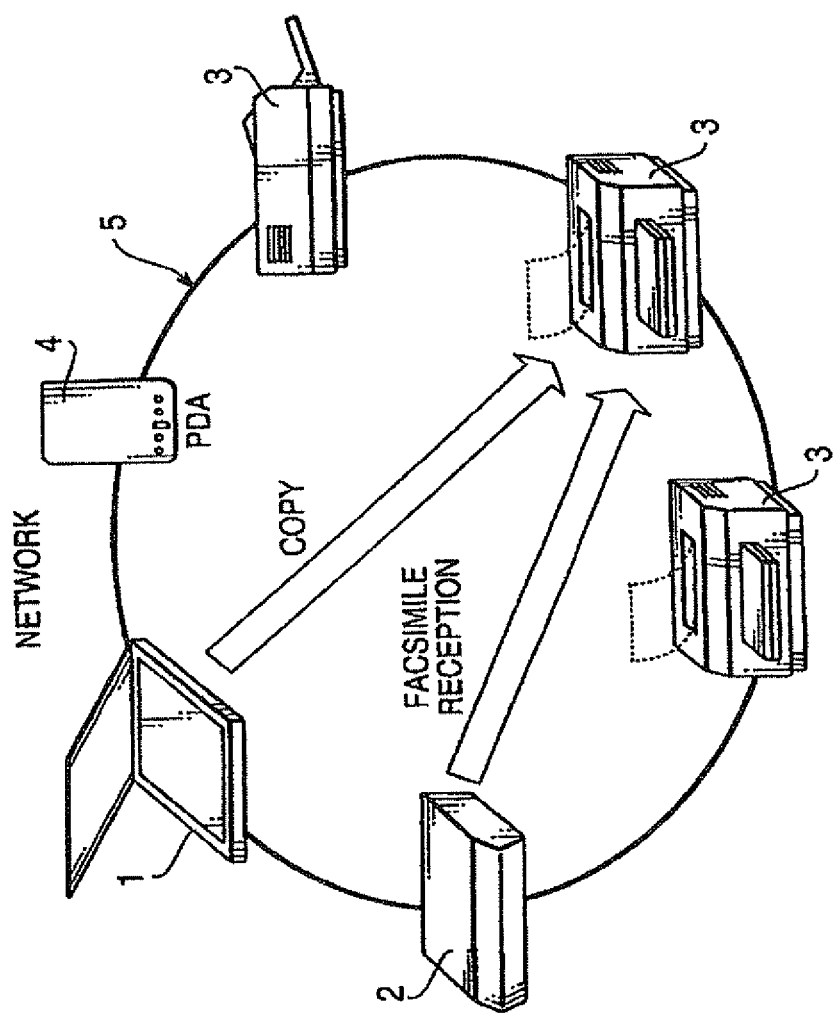
FIG. 1 schematically shows a configuration of a network system to which the invention is applicable.

FIG. 1 schematically shows an exemplary configuration of a network system to which the composite service providing systems according to the embodiments of the invention are applicable.

The network system shown in FIG. 1 includes a plurality of electronic devices 1, 2, 3, 4 and 5, which are communicatively interconnected through a network such as a LAN (Local Area Network). In this example, some of the electronic devices (i.e., the devices 1, 2 and 3) are configured such that each device is capable of providing at least one service. The electronic device 4 is a remote terminal 4, which is used to remotely control the electronic devices 1, 2 and 3. The network system may further include a device, which will be described later, that is used for displaying a progress of the composite service.

The remote terminal 4 is an independent device in this example. However, the system is not limited to the configuration shown in FIG. 1, and the remote terminal 4 may be implemented in the electronic devices 1, 2 and/or 3.

Figure 4:
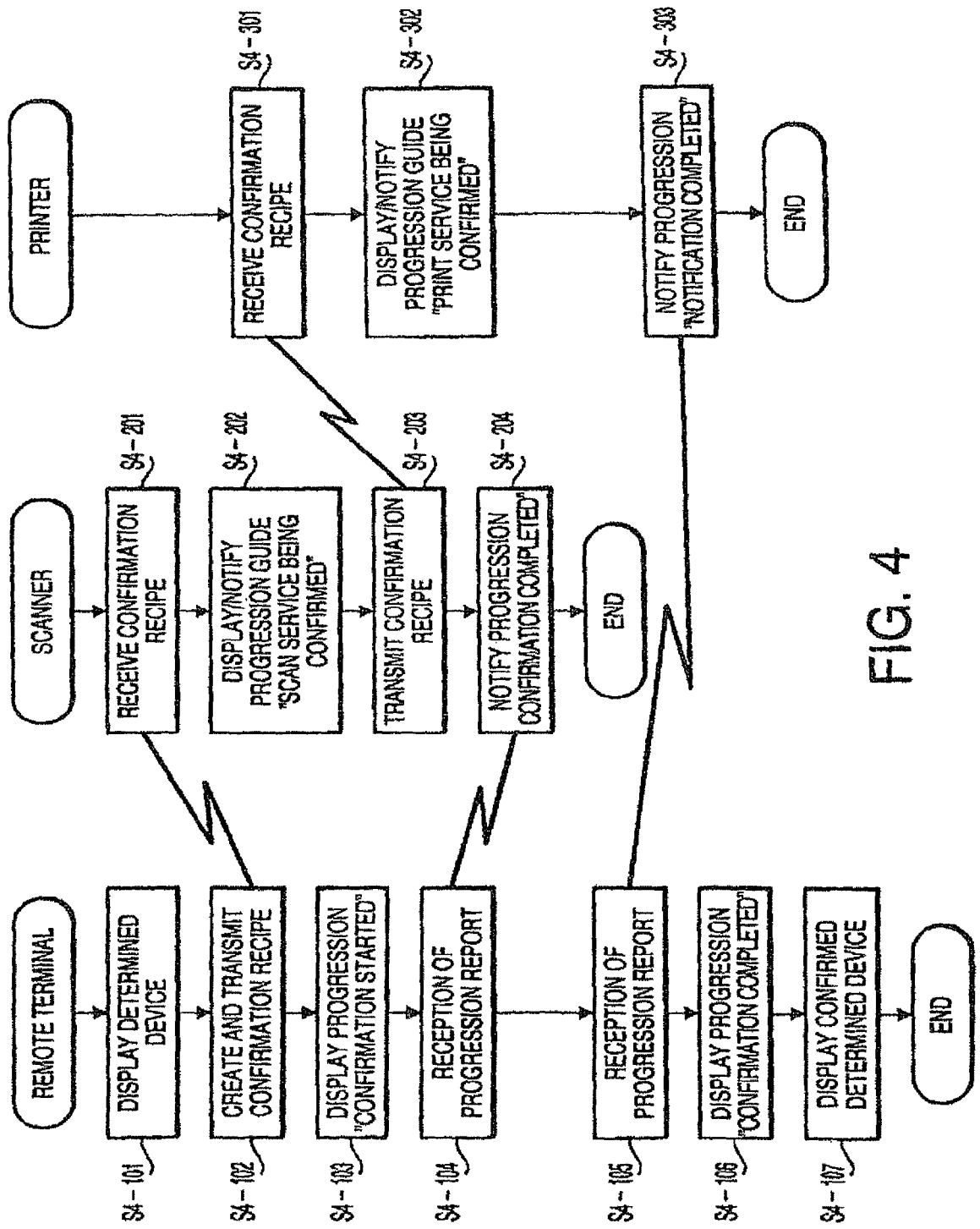
FIG. 4 shows schematic flowcharts illustrating confirming procedures of the remote terminal, scanner and printer of a composite service providing system according to the first embodiment of the invention.

Specifically, in the example shown in FIG. 4, the electronic device 1 is a scanner 1 which provides a scanning service, the electronic device 2 is a fax modem 2 which provides a data transmission/reception service, and the electronic devices 3 are printers 3 which provide a printing service. As the remote terminal 3, a PDA (Personal Digital Assistant), a PC (personal computer) and/or an electronic device implemented with a function of the remote terminal as well as a service providing function may be used. In the example shown in FIG. 4, the FDA 4 is employed.

Figure 2:
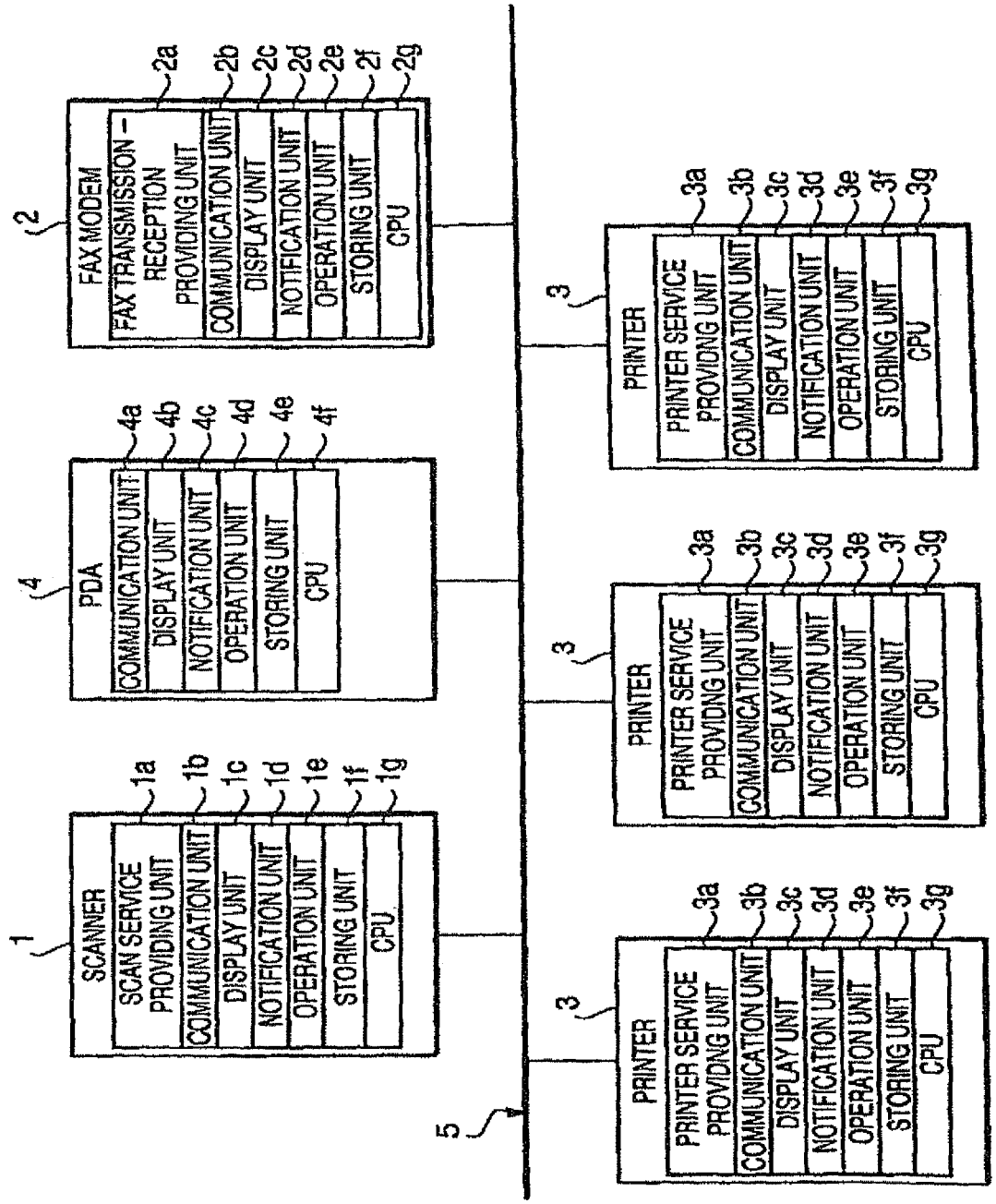
FIG. 2 is a block diagram illustrating a functional structure of each device included in the network system shown in FIG. 1.

FIG. 2 is a block diagram illustrating a functional structure of each device included in the network system shown in FIG. 1. As shown in FIG. 2, the electronic devices 1, 2 and 3 include service providing units 1a, 2a and 3a, communication units 1b, 2b and 3b that operate to communicate with other devices with wired and/or wireless communication, display units 1c, 2c and 3c that display input/output information, operational guidance and/or progression information, notifying units 1d, 2d and 3d that provide operational guidance and/or notify progression, operation input units 1e, 2e and 3e, storing units 1f, 2f and 3f and CPUs (central processing units) 1g, 2g and 3g, respectively.

The storing units 1f, 2f and 3f include input data areas that temporarily store data input through the operation input units 1e, 2e and 3e and/or communication units 1b, 2b and 3b, respectively, storing areas that store data and programs that enable the electronic devices 1, 2 and 3 to function, work areas that are used as work areas when the electronic devices 1, 2 and 3 operate in accordance with the data and programs temporarily stored in the input data areas and the storing areas, and output data areas that store output data that has been processed, respectively.

Specifically, the storing unit 1f, 2f, and 3f include memories such as ROMs (Read Only Memories) and/or storage devices such as RAMs (Random Access Memories), NVRAMs (Non-Volatile RAMs), flexible disk drives, hard disk drives and MO (Magneto-Optical Disk) drives.

Each of the notifying units 1d, 2d and 3d notifies a user of a position of the electronic device and progress of the service (e.g., start/end of the service) with an LED and/or buzzer, and/or notifies a user of the operation guidance and/or progress of the service with voice messages.

The remote terminal 4 includes a communication unit 4a that executes data communication in accordance with at least one of wired and wireless communication methods, a display unit 4b that displays the input/output information, operational guidance and/or progress of the service, a notifying unit 4c that notifies the operational guidance and/or progress of the service with the LED and/or voice messages, the external operation input unit 4d, a storing unit 4e and a CPU 4f.

The storing unit 4e includes an input data area that temporarily stores data input through the external operation input unit 4d and/or data received by the communication unit 4a, a storing area that stores data and programs that enable the remote terminal 4 to function, a work area that is used as work area when the remote terminal 4 operates in accordance with the data and programs temporarily stored in the input data area and the storing area, and an output data area that stores output data that has been processed The notifying unit 4c notifies the user of the progress of the service (e.g., start/end of the service) with the LED and/or buzzer, and/or notifies the user of the operation guidance and/or progress of the service with voice messages.

Various programs are provided to respective electronic devices so that the network system functions as a composite service providing system. The programs include various program modules having instructions that cause respective devices to function appropriately.

Hereinafter, the composite service providing systems according to first through fifth embodiments of the invention will be described individually.

First Embodiment

Figure 3:
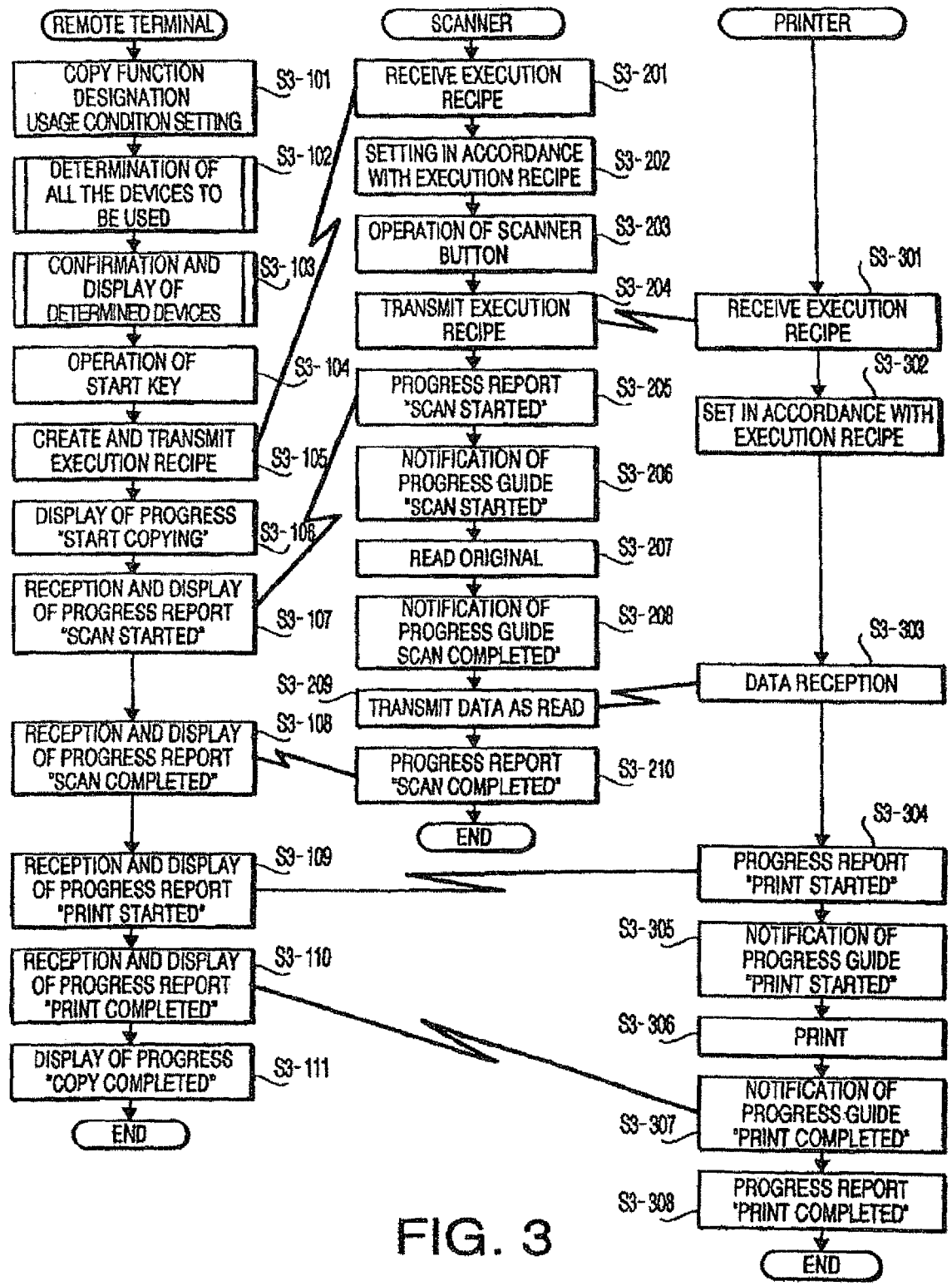
FIG. 3 shows schematic flowcharts illustrating operations of remote terminal, scanner and printer of a composite service providing system according to a first embodiment of the invention.

FIG. 3 shows flowcharts illustrating operations of the remote terminal 4, scanner 1 and printers 3 of the composite service providing system according to a first embodiment of the invention.

In S3-101, the remote terminal 4 requests the user to designate a desired composite service (which will also be referred to as a "designated composite service" hereinafter) and to set usage conditions related to the desired composite service. In the example shown in FIG. 3, the user designates the copy service as the desired composite service.

In S3-102, the remote terminal 4 automatically determines all the electronic devices necessary for providing the designated composite service. Such devices will occasionally be referred to as "determined devices" hereinafter. It should be noted that each of the determined devices provide certain services, combination of which provides the designated composite service.

In S3-103, the remote terminal 4 examines a status of the determined devices, and displays the desired composite service and the determined electronic devices on the display unit 4b so that the user can view the information.

In S3-104, the remote terminal 4 requests the user to confirm the information displayed on the display unit 4b, and to input an instruction to start the desired composite service.

In S3-105, the remote terminal 4 creates an execution information table (hereinafter referred to as an execution recipe) which is a data table containing data necessary for carrying out the desired composite service (e.g., names of the determined devices, usage conditions and the like) and is to be exchanged among the devices carrying out the individual services. Thus created execution recipe is transmitted to a first device of the determined devices carrying out the desired composite service. In the example of the first embodiment, the execution recipe is firstly transmitted to the scanner 1.

Thereafter, the remote terminal 4 receives progress reports from the determined devices in S3-106 through S3-111, and notifies the user of the progress with the display unit 4b and/or the notifying unit 4e.

In S3-201, the scanner 1, which is one of the determined devices, receives the execution recipe. In S3-202, the scanner 1 sets operational conditions for executing the scan service, based on the received execution recipe.

In S3-203, upon operation of a scan button by the user, the scanner 1 starts a scanning operation. In S3-204, the scanner 1 transmits the execution recipe to a device providing the next service (in this example, to the printer 3).

In S3-205, the scanner 1 informs the remote terminal 4 of the start of the scanning operation. In S3-206, the scanner 1 notifies that the scanning operation is started by displaying a notification "scanning started" on the display unit 1c and/or the notifying unit 1d.

In S3-207, the scanner 1 scans an original. In S3-208, the scanner 1 notifies that the scanning operation is finished with the display unit 1c and/or the notifying unit 1d. In S3-209, the scanner transmits the scanned data to the next device (i.e., the printer 3). Then, in S3-210, the scanner 1 reports that the scanning operation is finished to the remote terminal 4.

In S3-110, the scanner 1 informs the remote terminal 4 of the completion of the scanning, and terminates the operation. It should be noted that the transmission of the scanned data may be performed simultaneously with the scanning operation.

It should be noted that the operations in S3-202, S3-204 and S3-205 are executed in accordance with the scripts of the execution recipe.

The printer 3, which is also one of the determined devices, receives the execution recipe in S3-301 from the scanner 1.

In S3-302, the printer 3 set operational conditions thereof for providing the print service based on the scripts of the operation recipe.

In S3-303, the printer 3 receives the scanned data from the scanner 1. In S3-304, the printer 3 informs the remote terminal 4 of the start of printing.

In S3-305, the printer 3 notifies the start of printing by displaying a progress status on the display unit 3c and/or notifying unit 3d. Then, in S3-306, the printer 3 starts printing an image corresponding to the received data.

In S3-307, the printer 3 notifies the completion of printing by displaying a progress status on the display unit 3c and/or the notifying unit 3d. In S3-308, the printer 3 informs the remote terminal 4 of the completion of the printing operation.

FIG. 4 shows flowcharts illustrating confirming procedures of the remote terminal 4, scanner 1 and printer 3 of the composite service providing system according to the first embodiment.

In S4-101, the remote terminal 4 displays the determined devices on a display unit thereof. In S4-102, the remote terminal 4 creates a confirmation recipe. The confirmation recipe is a data table, which contains information (e.g., determined device names, usage conditions and the like) and is exchanged among the devices in order to confirm that the determined devices can provide the service.

Then, the confirmation recipe is transmitted to a device providing the first service of the composite service (in this example, the scanner 1).

In S4-103, the remote terminal notifies the display of the progress of the composite service is started with the displaying unit 4b and/or the notifying unit 4c. Then, the remote terminal 4 receives reports of progress from the determined devices in S4-104 and S4-105.

In S4-201, the device providing the first service (i.e., the scanner 1) receives the confirmation recipe. In S4-202, the scanner 1 notifies a progress guidance such as a display of "scan service is being confirmed" with the display unit 1c and/or notifying unit 1d.

In S4-203, the scanner 1 transmits the confirmation recipe to a device providing a second service of the composite service (in this example, the printer 3).

In S4-204, the scanner 1 notifies the end of confirmation with the display unit 1c and/or notifying unit 1d. The scanner 1 also transmits the report indicating the end of confirmation to the remote terminal 4, and completes the procedure.

It should be noted that the operations in S4-202 and S4-203 (i.e., notification by use of the display unit 1c and/or notifying unit 1d, and transfer of the confirmation recipe to the printer 3) are executed in accordance with the scripts of the confirmation recipe.

In S4-301, the printer 3 receives the confirmation recipe from the scanner 1. Then, in S4-302, the printer 3 notifies a progress indicating that the print service is confirmed by use of the display unit 3c and/or notifying unit 3d.

In S4-303, the printer 3 notifies the completion of confirmation by use of the display unit 3c and/or notifying unit 3d, transmits the report of completion of confirmation to the remote terminal 4, and completes the procedure.

In S4-105, the remote terminal 4 receives the completion of confirmation from the printer 3. At this stage, the printer 3 has already received the report of completion of the confirmation from the scanner 1.

In S4-106, upon receipt of the reports of completion of the confirmation from all the determined devices, the remote terminal 4 notifies that the confirmation is completed in all the determined devices by use of the display unit 4b and/or notifying unit 4d.

In S4-107, the remote terminal 4 displays the confirmed determined devices on the display unit 4b, and terminates the procedure shown in FIG. 4. When the determined devices are displayed on the display unit 4b, they are displayed in the order of usage in order to notify the order of individual services constituting the composite service. It is preferable that the locations of the determined devices are also displayed.

Operations of the composite service providing system, in particular, operations of the remote terminal 4 and operations of the electronic devices of the first embodiment will be described in detail.

Figure 5:
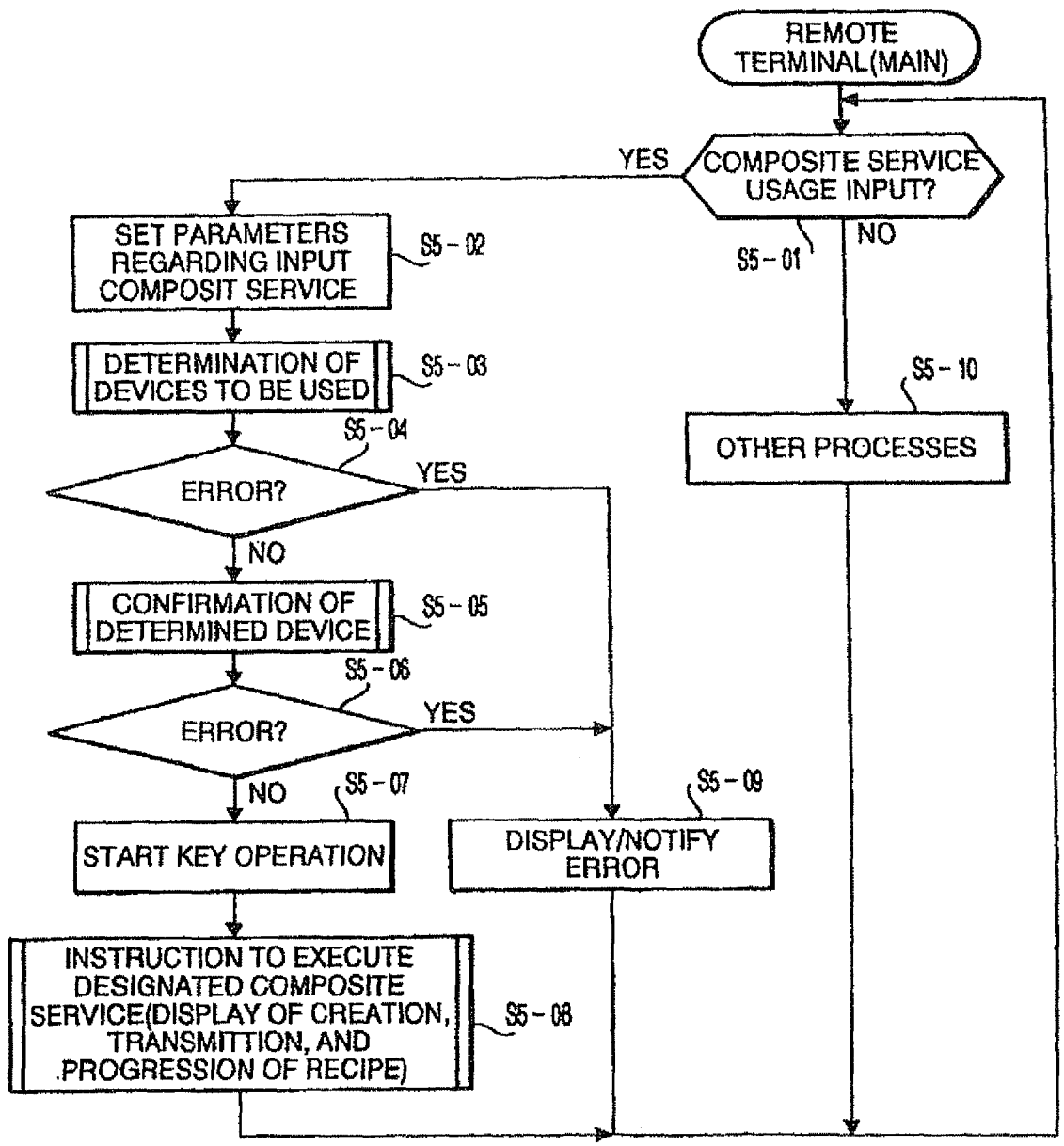
FIG. 5 shows a flowchart illustrating a main procedure of the remote terminal according to the first, second, fourth and fifth embodiments.

FIG. 5 shows a flowchart illustrating a main procedure of the remote terminal 4 according to the first embodiment.

In S5-01, the remote terminal 4 requests the user to determine whether a composite service should be provided. When the user selects "NO", other procedures are executed in S5-10, and control returns to S5-01. When the user selects "YES", process proceeds to S5-02.

In S5-02, process requests the user to designate a composite service the user intends to use, and the usage conditions.

The remote terminal 4 contains a service table (as shown in FIG. 17) having a plurality of records respectively related to composite services. The left side columns of the service table indicate types of the composite services. In each row of the table (i.e., each record), individual services to be provided in order to provide the composite service indicated in the left end of each record are indicated.

In the table shown in FIG. 17, service 1 represents a service firstly executed, service 2 represents the secondly executed service, service 3 represents the service to be executed thirdly.

As above, the order of the individual services when each composite service is executed are stored in relation with the composite services in the service table.

When the user designates one of the composite services, the remote terminal 4 determines the services to provide the designated composite service in accordance with the service table shown in FIG. 17, and further, in accordance with a procedure described later, the devices to be used and the order of usage of the devices.

In FIG. 17, as the composite services, a copy service, a remote fax service, an image storing service, a fax image storing are indicated, as examples. In the composite service indicated in FIG. 17, image data is processed as digital data.

When the copy service is designated as the composite service, for example, it is know from the service table shown in FIG. 17, the services to achieve the composite service include the scan service (service 1) and the copy service (service 2), which are executed in this order. Thus, in order to carry out the copy service as the composite service, an original is scanned with a device which provides a scan service, and then, the scanned image, which is a digitized image, is processed by a device providing a print service.

In the service table shown in FIG. 17, "start instruction required" means that the usage conditions include the user's instruction. That is, a user's instruction is necessary to start the operation (service) in order to carry out each service having such a condition. "Push service n" (n being an integer) indicates a method of exchanging digital data. For example, "Push service 2" represents that the digital data is actively transferred from the device providing the service 1 to the device providing the service 1

In S5-03 (FIG. 5), all the devices to carry out the designated composite service are automatically determined by the remote terminal 4.

When it is failed to determine all the devices (S5-04: NO), process proceeds to S5-09. When all the devices are determined (S5-04: YES), process proceeds to S5-05.

In S5-05, process confirms the operational status (e.g., communication status) of each of the determined devices. When the confirmation is failed (S5-06: YES), process goes to S5-09.

In S5-09, process notifies the error condition with the display unit 4*b* and/or the notifying unit 4*c*, and then process returns to S5-01.

When process successfully confirms the operational status of each of the determined devices (S5-06: NO), process proceeds to S5-07.

In S5-07, process requests the user to input the instruction to start the composite service (e.g., by operating a start key). As the user operates the start key to input the instruction to start the composite service, process initiates the designated composite service (S5-08). When S5-08 is finished, process returns to S5-01.

In S5-08, process instructs execution of the designated composite service. The instructions include procedure of creating an execution recipe, procedure of transmitting the execution recipe to the device which provides the first service for the designated composite service represented by the execution recipe, and procedure of displaying the progress of the composite service.

Next, the procedure for automatically determining the devices necessary for carrying out the designated composite procedure executed in S5-03 of FIG. 5 will be described in detail.

Figure 6:
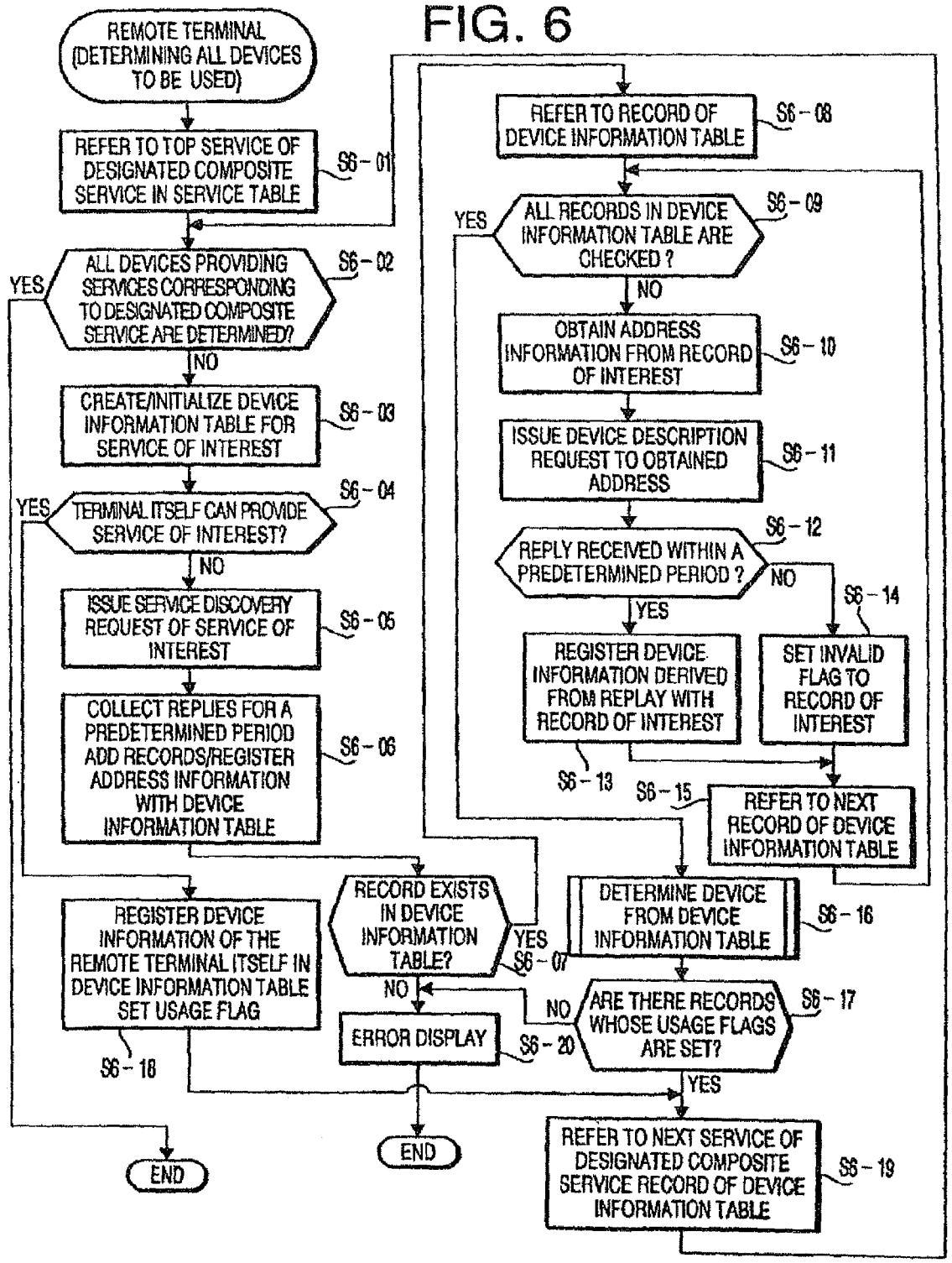
FIG. 6 shows a flowchart illustrating a device determining procedure of the remote terminal according to the first, second, fourth and fifth embodiments.

FIG. 6 shows a flowchart illustrating a device determining procedure of the remote terminal according to the first embodiments.

In S6-01, the remote terminal 4 refers to the service 1 of the service table in the record (row) corresponding to the designated composite service. For example, when the designate composite service is the copy service, the service 1 is the scan service (see FIG. 17).

In S6-02, process determines whether all the devices for providing the individual services to achieve the designated composite service have been determined. When all the devices for individual services have been determined (S6-02: YES), process terminates the procedure since it is unnecessary to determine further devices. When all the devices have not been determined (S6-02: NO), process proceeds to S6-03.

In S6-03, process creates a device information table for a composite service of interest or initializes the table. That is, in S6-03, the remote terminal 4 creates and stores a device information table with respect to the composite service of interest as shown in FIG. 18. Alternatively, when the remote terminal 4 already has the device information table as shown in FIG. 18, the table is initialized. As a result, a device information table whose cells are all blanked is prepared.

FIG. 18 show examples of the device information tables. The device information table has items of index, usage flag, invalid flag, device ID, GID (group ID), address, information regarding input/output interface (i.e., Data Sink URL and Src.URl), location and capability. As location data, longitude and latitude obtained by use of GPS may be stored. Optionally, information of a location in a building (e.g., a floor information) may also be stored as location data.

In cells of usage flag and invalid flag, results of the determination procedure of all the devices are stored.

In the example of FIG. 18, the information tables for services of interest with respect the composite services of the scan service, print service, fax service and image storing service are indicated, respectively.

In S6-04, the remote terminal 4 determines whether the remote terminal 4 itself can provide the target service. It should be noted that each of the serviced respectively executed by individual devices will also be referred to as a "target service". Thus, in S6-04, the target service may be the print service, scan service, copy service and the like, depending on the procedure.

When the remote terminal 4 can provide the target service (S6-04: YES), process proceeds to S6-18. Process makes this decision when the device which can provide the service (e.g., print service, scan service, etc.) is implemented with the remote terminal 4.

When the remote terminal 4 cannot provide the target service (S6-04: NO), process proceeds to S6-05. This decision is made when the remote teiininal function is not implemented in the device, or although the remote terminal function is implemented in a device, the device itself cannot provide the target service.

In S6-05, the remote terminal 4 issues a service discovery request by broadcasting or multicasting in order to find a device capable of providing the target service. If a device among a grouped devices is to be selected, GDI is also multicast together with the service discovery request.

In S6-06, the remote terminal 4 collects the replies from the devices for a predetermined time period, and the collected data is registered with the device information table. When the device is to be selected from among the grouped devices, only replies from the devices having the same GID are collected.

FIG. 19 shows examples of contents of reply packets transmitted from the device, in response to the service discovery request. As shown in FIG. 19, the reply includes the items of the device ID, GID, address and data related to the input/output interface (DataSink URL and Src.URl) and the service the device can provide.

From the thus obtained replies, the remote terminal 4 obtains the type of the service each device provides, the address of the device which provides the target service and data related to the I/O interface (Data Sink URL, Src.URL) of digital data necessary for providing the target service.

In S6-07, the remote terminal 4 determines whether the data contained in the reply from each device has been registered with the device information table.

When the data has not been registered with the device information table (S6-07: NO), the device information could not be collected. In such a case, process proceeds to S6-20 and notifies the error using the display unit 4*b* and/or notifying unit 4*c*, and terminates the procedure (error termination). When the data has been registered with the device information table (S6-07: YES), process proceeds to S6-08.

As described above, steps from S6-03 through S6-07, data of the devices capable of providing the target service is collected from the devices belonging to the same group as the remote terminal 4 belongs, or from all the devices.

In S6-08, process refers to the first record of the device table related to the target service. When the designated composite service is the copy service, the record of the scanner 1, which is indicated at the item of "device ID" in the device information table for the record of the scan service (Index 1), is referred to.

In S6-09, process determines whether device description request has been made for all the devices indicated in the device information table related to the composite service of interest.

When the device description request has been made for all the devices (S6-09: YES), process proceeds to S6-16. When the device description request has not been made for all the devices (S6-09: NO), process proceeds to S6-10.

In S6-10, process obtains an address from the record for the first device in the device information table related to the target service. When the designated composite service is the copy service, process obtains the address of the scanner 1 in the record of Index 1 in the device information table for the scan service shown in FIG. 18.

In S6-11, process transmits a request for the device description to the obtained address. The request for the device description is a request transmitted from the remote terminal 4 to a device for reply including information of the device as indicated in FIG. 20.

As shown in FIG. 20, the device description includes device ID (i.e., device ID number), address, data related to the I/O interface (i.e., DataSink URL, Src.URL), Service (i.e., provided service), Location and Capability.

By receiving the device description, the remote terminal 4 obtains the information representing characteristics of respective devices, based on which the device to be used to carry out the target service can be determined. When the GID is set, the device description includes the GID.

S6-12, process determines whether a reply is received within a predetermined period.

When the reply has not been received within the predetermined period (S6-12: NO), process proceeds to S6-14. In S6-14, process sets an invalid flag to the record of interest in the device information table related to the target service, in the above example, the first record in the device information table. When the designated composite service is the copy, the invalid flag is set to the scanner 1 in the record of index 1 in the device information table for scan service shown in FIG. 18. Then, process proceeds to S6-15.

When the reply has been received within the predetermined period (S6-12: YES), process proceeds to S6-13.

In S6-13, the device description transmitted as the reply is stored as the record of interest, that is, the first record of the device information table. Then, process proceeds to S6-15.

In S6-15, process refers to the next record of the device information table related to the target service. When the designated composite service is the copy service, the scanner 1 in the record of index 2 in the device information table for scan service in FIG. 18 is referred to. Then, process returns to S6-09.

Steps S6-09 through S6-15 are executed for all the devices indicated in the device information table related to the target service. When the designated composite service is the copy service, the steps are executed for the scanner 1 indicated in the record of index 1, and for the scanner 1 indicated in the record of index 2.

When the device description requests have been made for all the devices indicated in the device information table related to the target service (S6-09: YES), process proceeds to S6-16.

As above, in steps S6-10 through S6-15, for the devices whose addresses are obtained in steps S6-03 through S6-07, which devices are capable of providing the target service, the information representing the characteristics of the devices is obtained.

In S6-16, process determines an appropriate device for carrying out the target service from among the devices indicated in the device information table for the target service and the invalid flag is not set, with taking the usage conditions into account. Then, process set a usage flag to the device information table of the determined device.

When the designated composite service is the copy, the usage flag is set to one of the devices of indexes 1 and 2 in the device information table for scan service shown in FIG. 18.

In S6-17, process determines whether the usage flag is set to the device information table for the target service.

When the flag is not set (i.e., the device has not been determined) (S6-17: NO), process notifies the error with the display unit 4b and/or notifying unit 4c, and terminates the procedure. When the flag is set (i.e., the device has been determined) (S6-17: YES), process proceeds to S6-19.

In S6-04, process determines whether remote terminal 4 is implemented in a device, and the device is capable of providing the target service. When the device implemented with the remote terminal 4 is capable of providing the target service (S6-04: YES), process proceeds to S6-18.

In S6-18, process records the information indicated in the device description of the device in which the remote terminal 4 is implemented in the device information table for the target service, and sets the usage flag. Then, process proceeds to S6-19.

In S6-19, process refers to a record of the next service in the service table of the designated composite service. When the composite service is the copy service, the print service indicated at the item 2 (service 2) of the table shown in FIG. 17 is referred to. Then, process proceeds to S6-02.

Since S6-04 is executed prior to S6-05 and the following steps, when the device implemented with the remote terminal 4 is capable of providing the target service, the device is selected appropriately. For example, when the scanner 1 is implemented with the remote terminal 4, it is inappropriate to use another scanner, and process determines the device appropriately.

In S6-18 (FIG. 6), process sets the usage flag to the record when the device implemented with the remote terminal 4 is capable of providing the target service. This may be modified such that only registration of the record is executed in S6-18 and S6-05 is executed after S6-18.

When modified as above, if the user instructs a color copy operation using the monochromatic scanner 1 implemented with the remote scanner 4, a scanner having a color image scanning function is selected appropriately.

It should be noted that steps S6-02 through S6-19 are executed for all the services stored in the items of the composite service for all the services stored in the service table. In other words, the steps are repeated until all of the devices that provide individual services which are necessary for carrying out the designated composite service are determined. When all the devices are determined (S6-02: YES), the procedure for determining the devices to be used is terminated.

Next, a procedure for determining the devices from the device information table (S6-16) will be described in detail.

Figure 7:
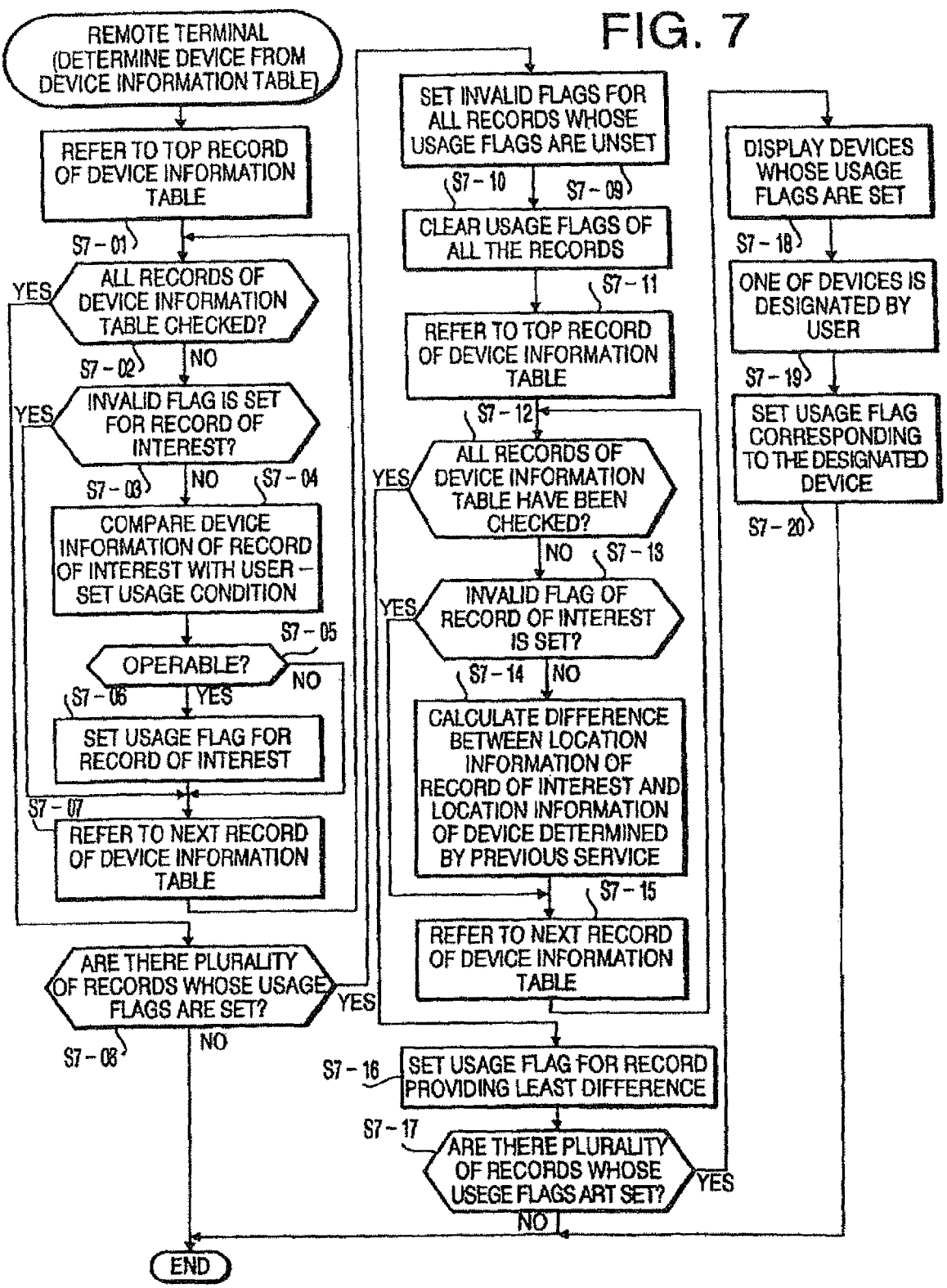
FIG. 7 shows a flowchart illustrating a procedure of the remote terminal for determining the devices in accordance with a device information table, according to the first, second, fourth and fifth embodiments.

FIG. 7 shows a flowchart illustrating the procedure of the remote terminal 4 for determining the devices in accordance with the device information table according to the first embodiment.

In S7-01, process refers to the record related to the first device in the device information table for the target service. For example, when the target service is scanning, process refers to a record of index 1 in the device information table for scan service shown in FIG. 18.

In S7-02, process determines whether the usage conditions set by the user are compared with the device information including the device capability and the like for all the devices indicated in the device information table for the target service, in accordance with a predetermined procedure, which will be described later.

When the comparison has been made for all the devices (S7-02: YES), process proceeds to S7-08. When the comparison has not been finished (S7-02: NO), process proceeds to S7-03.

In S7-03, process determines whether the invalid flag is set with respect to the record of interest. That is, process determines whether information representing the characteristics of the individual devices has been obtained. For example, when the when the target service is scanning, process refers to the invalid flag in the record of Index 1 in FIG. 18.

When the invalid flag is set (S7-02: YES), control proceeds to S07, while when the invalid flag is not set (S7-02: NO), process proceeds to S7-04.

In S7-04, process compares the usage conditions set by the user with the capability information of the target record. Then, in S7-05, process determines, based on the results of the comparison in S7-04, whether the device operates under the conditions set by the user.

When the device does not operate (S7-05: NO), process proceeds to S7-07. When the device operates (S7-05: YES), process proceeds to S7-06.

In S7-06, process sets the usage flag to the recode of interest of the device information table, and proceeds to S7-07.

As described above, in steps S7-03 through S7-06, process selects the devices in accordance with the user's intention.

In S7-07, process refers to the next record of the device information table related to the target service. For example, when the target service is the scanning, process refers to the record of index 2 in the device information table for scan service shown in FIG. 18. Then, process returns to S7-02.

Steps S7-02 through S7-07 are repeated for all the devices indicated in the device information table for the target service among the individual services necessary for carrying out the designated composite service.

When steps S7-02 through S7-07 have been executed for all the device records indicated in the device information table for the target service, determination in S7-02 becomes "YES", and process proceeds to S7-08.

In S7-08, process determines whether the usage flag is set to a plurality of devices. When the usage flag is set to only one device (S7-08: NO), the device has now been determined, and process terminates the procedure.

When the usage flags are set to a plurality of devices (S7-08: YES), there are a plurality of candidates for the device to be used, and process proceeds to S7-09.

In S7-09, process sets invalid flags to all the records for the devices, whose usage flags have not been set, in the device information table for the target service among the individual services necessary for carrying out the designated composite service. In S7-10, the usage flags of all the devices in the device information table are cleared.

In S7-09 and S7-10, the usage flags are reset so that, in the following steps, an appropriate device is selected from a plurality of candidate devices.

In S7-11, process refers to the record of the first device indicated in the device information table for the target service, from among the individual services for carrying out the designated composite service. For example, when the designate composite service is the copy and the scan service is currently referred to, process refries to the record of index 1 in the device information table for scan service.

In S7-12, process determines whether steps S7-12 through S7-15 have been executed with respect to all the devices in the device information table for the target service in S7-12.

When steps S7-12 through S7-15 have been executed for all the devices (S7-12: YES), process proceeds to S7-16, otherwise (S7-12: NO), process proceeds to S7-13.

In S7-13, process determines whether the invalid flag is set to the record of interest. That is, process determines whether the device represented by the record of interest has been selected as the user's intended device.

When the invalid flag is set (S7-13: YES), process proceeds to S7-15. When the invalid flag is not set (S7-13: NO), process proceeds to S7-14.

In S7-14, locations of devices are compared. In S7-04, device information is compared with the usage conditions set by the user, and in S7-05, an appropriate device is selected. In S7-14, the location of the device is compared with the location of the user, and in S7-16, a device close to the user is selected.

In S7-14, for example, a difference between the location information of the device indicated in the record of interest and the location information of the user is obtained and stored. As the location of the user, location information of the remote terminal 4 that has the display panel for displaying the information of progress of the procedure or the location of a predetermined device is used. It should be noted that the user can set, in advance, the display panel of which one of the remote terminal 4 and a plurality of devices is used to display the progress of the procedure.

Alternatively, process may obtain a difference between the location information of the device indicated in the record of interest and the location of the device selected in the service before the target service is selected, and store the difference. For example, when the designated composite service is the copy, the target service is the print service, and scanner 1 has been selected as the device providing the previous service (scan service), process compares the location information of the scanner 1 and the location information of the record related to the device referred to in the device information table for print service, and store the difference.

In S7-15, process refers to a record related to a next device in the device information table for the target service. Then, process returns to S7-12.

In S7-12, when steps S7-12 and S7-15 are executed for all the devices indicated in the device information table for the target service, determination in S7-12 becomes "YES", and process proceeds to S7-16.

In S7-16, process set the usage flag to the record having the minimum difference among the results of the comparison.

By executing steps S7-13 through S7-16, a device which is closest to the location where the user receives the progress report, closest to the user when the composite service is being executed, or closest to the position at which the user input the image is selected. Accordingly, when the user need to receive an output of the composite service (e.g., a copy of an image), a distance the user is required to move is lessened.

In S7-17, process determines whether the usage flags of a plurality of devices are set. When there is one device whose usage flag is set (S7-17: NO), the device is the determined device and process terminates the procedure. When there are plurality of devices whose usage flags are set (S7-17: YES), there remain a plurality of candidate devices, and process proceeds to S7-18.

Steps S7-18 through S7-20 are a device designating procedure in which the user is requested to designate a device. It should be noted that steps S7-18 through S7-20 are executed when a device is not determined in the above procedure.

In S7-18, process displays a list of the devices whose usage flags are set on the display unit of the remote terminal 4.

In S7-19, the remote terminal 4 requests the user to designate a device from among the devices listed and displayed on the display unit.

In S7-20, process sets the usage flag to the designated device, and terminates the procedure.

Next, a confirming procedure of the determined device (see S5-05) will be described.

Figure 8:
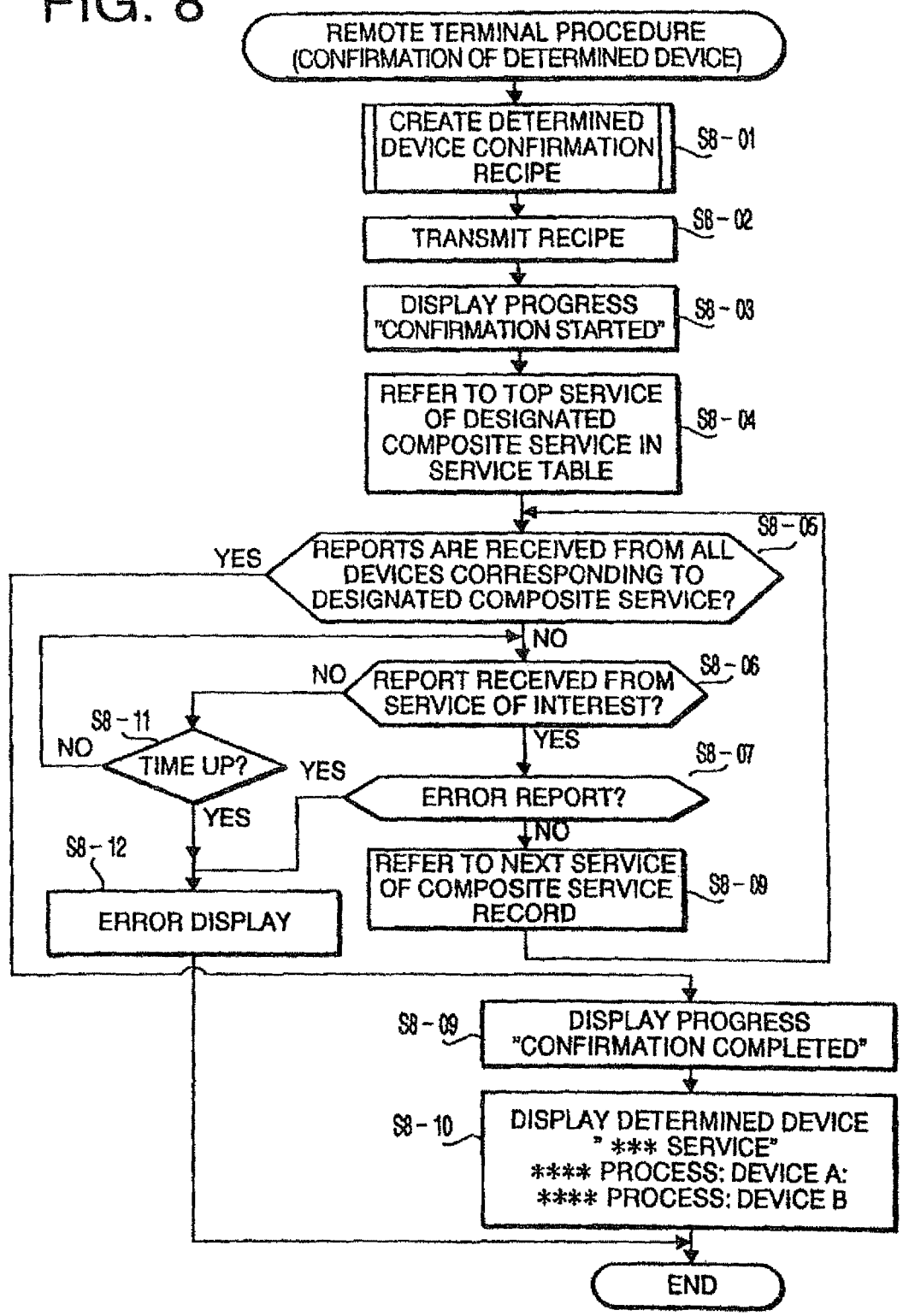
FIG. 8 shows a flowchart illustrating a determined device confirming procedure of the remote terminal according to the first, second, fourth and fifth embodiments.

FIG. 8 shows a flowchart illustrating a determined device confirming procedure of the remote terminal 4 according to the first embodiment.

In S8-01, the remote terminal 4 creates a determined device confirming recipe. Then, in S8-02, the remote terminal 4 transmits the determined device confirming recipe to the device that executes the first service.

In S8-03, the remote terminal 4 notifies the start of confirmation with the display unit 4b and/or notifying unit 4c.

In S8-04, a service 1 in FIG. 17 is referred to.

In S8-05, process determines whether a confirmation has been made for all the devices necessary of providing the individual services to carry out the designated composite service.

When the confirmation has been mad with respect to all the devices (S8-05: YES), process proceeds to S8-09. When there is at least one device for which the confirmation has not been made (S8-05: NO), process proceeds to S8-06.

In S8-06, process determines whether a report is received from the device providing the target service. When the report has not been received (S8-06: NO), process proceeds to S8-11. When the report has been received (S8-06: YES), process proceeds to S8-07.

In S8-07, process determines whether the received report is an error report. When the report is the error report (S8-07: YES), process proceeds to S8-12. When the report is not the error report (S8-07: NO), process proceeds to S8-08.

In S8-08, process refers to the next service of the individual services for carrying out the designated composite service indicated in the service table (see FIG. 17). Then, process returns to S8-05.

The confirming procedure of steps S8-05 through S8-08 is repeated for all the devices indicated in the service table, which provide individual services necessary for carrying out the designated composite service.

When the confirming procedure of steps S8-05 through S8-08 is executed for all the devices that provide the services necessary for achieving the designated composite service, decision in steps S8-05 is "YES", and process proceeds to S8-09.

In S8-09, the remote terminal 4 notifies the completion of the confirmation with display unit 4b and/or notifying unit 4c.

In S8-10, process displays the determined device, which has been confirmed, on the display unit 4b and/or notifying unit 4c, and terminates the procedure shown in FIG. 8. It should be noted that the determined devices are displayed in the determined order to notify the order in which the plurality of services are executed.

With the above-described procedure, process notifies that all the devices necessary for carrying out the composite service are operable states.

When the decision in S8-06 is "NO", that is, when there is no report from the device that provides the target service, process proceeds to S8-11.

In S8-11, process determines whether a period for awaiting the confirmation report expires. When the waiting period has not expired (S8-11: NO), process returns to S8-06. When the waiting period has expired (S8-11: YES), process proceeds to S8-12.

In S8-12, process notifies the error with the display unit 4b and/or notifying unit 4c, and terminates the procedure shown in FIG. 8.

Next, a procedure of instructing execution of the designated composite service will be described.

Figure 9:
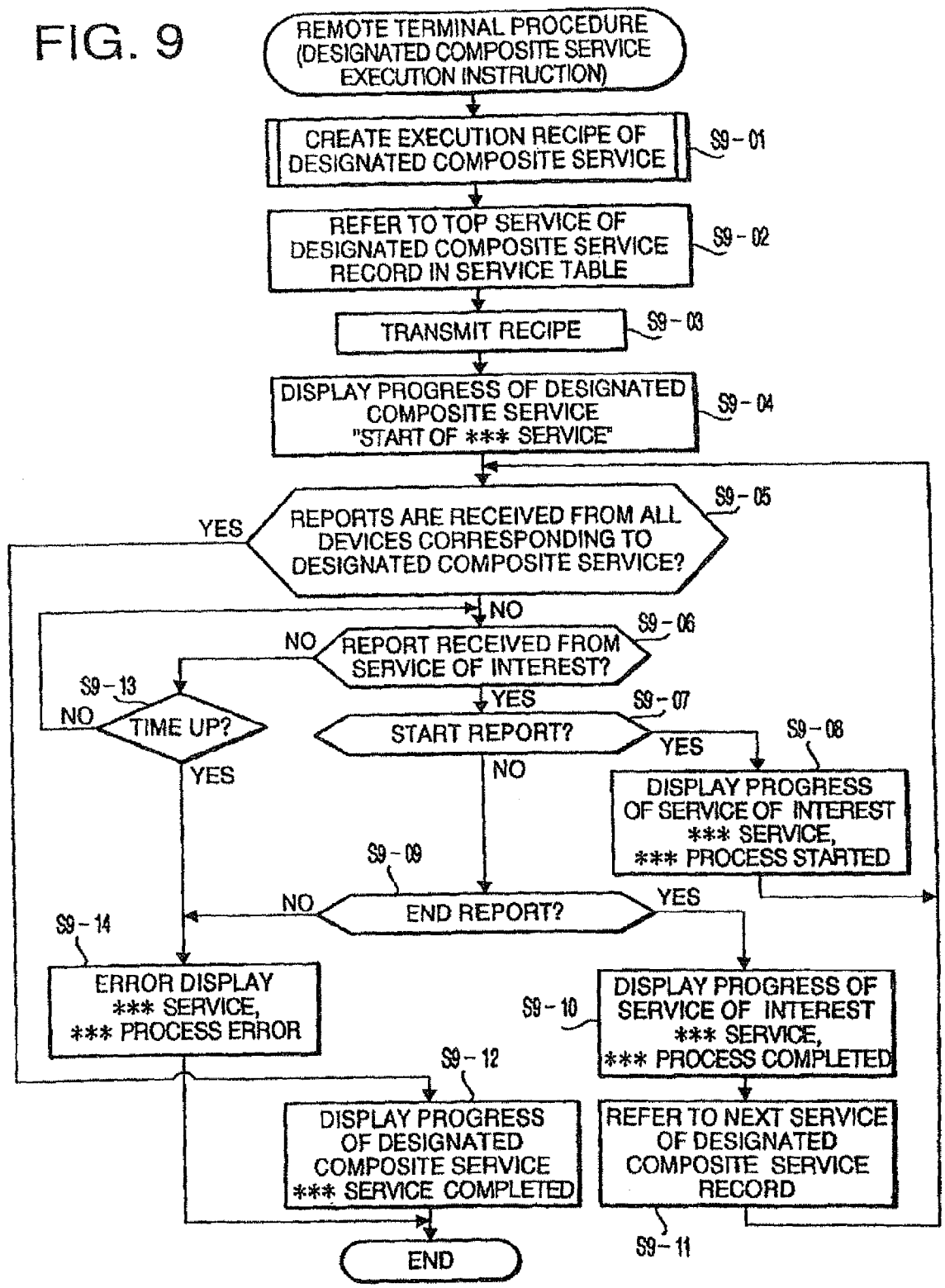
FIG. 9 shows a flowchart illustrating a designated composite service executing procedure of the remote terminal according to the first, second, fourth and fifth embodiments.

FIG. 9 shows a flowchart illustrating a designated composite service executing procedure of the remote terminal according to the first embodiment.

In S9-01, the remote terminal 4 creates the designated composite service execution recipe.

In S9-02, process refers to the service 1 which is to be executed firstly in the record related to the composite service designated in the service table (see FIG. 17).

In S9-03, process transmits the recipe to the device which executes the first service.

In S9-04, process notifies start of the designated composite service with the display unit 4b and/or notifying unit 4c.

In S9-05, process determines whether service completion reports are received from all the devices that provide the individual services which are necessary executed to achieve the designated composite service.

When the service completion reports have been received from all the devices (S9-05: YES), process proceeds to S9-12. When the service completion reports have not been received from all the devices (S9-05: NO), process proceeds to S9-06.

In S9-06, process determines whether a report is received from the device that provides the target service. When the report has not been received (S9-06: NO), process proceeds to S9-13, otherwise process proceeds to S9-07.

In S9-07, process determines whether the received report is a report indicating the start of the target service.

When the received report is the report of starting of the target service (S9-07: YES), process proceeds to S9-08, where process notifies the start of the target service with the display unit 4b and/or notifying unit 4c. Then, process returns to S9-05. When the received report is not the report of staring of the target service (S9-07: NO), process proceeds to S9-09.

In S9-09, process determines whether the report indicates the end of the target service.

When the report is not a report indicating the end of the target service (S9-09: NO), process proceeds to S9-14. When the report is a report indicating the end of the target service (S9-09: YES), process proceeds to S9-10.

In S9-10, process notifies the end of the target service with the display unit 4b and/or the notifying unit 4e. Then, process proceeds to S9-11.

In S9-11, process refers to a service to be executed next, in the service table shown (see FIG. 17), from among the records related to the designated composite service. Then, process returns to S9-05. When the end reports have been received from all the device necessary for performing the services constituting the designated composite service, decision in S9-05 becomes "YES". Thereafter, process proceeds to S9-12.

In S9-12, process notifies the end of the designated composite service with the display unit 4b and/or notifying unit 4c, and terminates the procedure.

The remote terminal 4 instructs the start of the composite service by transmitting the operation recipe, and keeps monitoring the progression of the composite service with reporting the progress to the user until the end of the composite service.

In S9-06, when the process has not received a report from the device providing the target service (S9-06: NO), process proceeds to S9-13.

In S9-13, process determines whether a predetermined time period to await the report has expired. When the predetermined time period has not yet expired (S9-13: NO), process returns to S9-06. When the predetermined time period has expired (S9-06: YES), process proceeds to S9-14.

In 9-09, when the received report is not the report indicating the end of the target service (S9-09: NO), process proceeds to S9-14, where process notifies the error with the display unit 4b and/or notifying unit 4c and terminates the procedure.

Next, a procedure for creating the recipe (see S8-01 and S9-01) will be described in detail.

FIGS. 21A and 21B show an example of a recipe when the composite service is copying, FIGS. 22A and 22B show an example of a recipe when the composite service is remote FAX, and FIGS. 23A and 23B show an example of a recipe when the composite service is image capture.

In each of FIGS. 21A through 23B, a left-hand side lines indicate an example of the recipe, while a right-hand side lines are explanations of the recipe.

In each recipe, the first line indicates whether the designated composite service and the recipe are for confirmation or execution.

In the second line through fourth line, a type of transmission of the recipe is indicated. There are three types of transmission. According to the first type, all the devices that provide respective services are determined in the remote terminal 4, and the recipe is transmitted from the remote terminal 4 to a device providing the first service, from the device providing the first service to a device providing a second service, . . . , and so on. That is, in the first type, the recipe is transmitted sequentially as it is from one device to another.

According to the second type, all the devices that provide respective services are determined in the remote terminal 4, and the recipe is transmitted from the remote terminal 4 to the device providing the last service, then from the device providing the last service to a device providing a second last service, . . . , and so on. That is, in the second type, the recipe is transmitted reverse-sequentially from one device to another.

According to the third type, all the devices that provide respective services are determined in the remote terminal 4, and the recipe is transmitted from the remote terminal 4 to all the devices providing the individual services simultaneously.

When none of the three types is designated in the recipe, the remote terminal 4 determines only a device providing the first service, and the recipe is transmitted to the device providing the first service. Then, the device providing the first service determines a device providing the second service, and transmits the recipe to the device providing the second service. Similar procedure is performed until the recipe is transmitted to a device providing the last service.

In each type of the transmission, by transmitting the recipe to the devices, each device is notified that it is selected as a device providing a service. It should be noted that, by transmitting the recipe, operational settings can be transmitted to respective devices.

The first embodiment will be described, for the explanation purpose, to employ the first transmission type.

In a fifth line of the recipe, whether a user ID is to be replied is indicated.

In a sixth line of the recipe, a panel that receives a progression report from the devices respectively providing the services is designated. For example, the panel may be the remote terminal itself, or respective devices providing the individual services of the designated composite service. Optionally, the panel may be another electronic device having a display function and communicatively connected to the remote terminal 4 and the devices providing the services (e.g., a cell phone).

In lines 7 and 8 of the recipe, names of the devices providing the individual services are indicated.

In line 9 of the recipe, an IP address of the panel designated above is indicated. In lines 10 and 11, IP addresses of the devices providing the individual services.

In line 12, whether a progression report through the panel is necessary is indicated.

In lines 13 onward, operational conditions of the respective devices are indicated.

Specifically, when the composite service is the copy service (see FIGS. 21A and 21B), in lines 13 onward, the operation conditions for scanning and printing are indicated.

The operation conditions of the scanning include resolution, color/monochromatic, type of output document, whether sound/voice guidance is necessary, whether a progression report from the scanner 1 is necessary, whether a start instruction for scanning by a user is necessary and a destination of the scanned data.

The operation conditions of the print service include sheet type, sheet size, input document format, color/monochromatic, sheet orientation, the number of copies, print quality, whether sound/voice guidance is necessary, whether a progression report from the printer 3 is necessary, whether a start instruction by a user is necessary and a source of print data.

When the composite service is a fax service (FIGS. 22A and 22B), lines 13 onward indicate the operation conditions for scan and fax services.

The operation conditions of the scan service are similar to those indicated in FIGS. 21A and 21B.

The operation conditions of the fax service include transmission size, input document format, color/monochromatic, whether sound/voice guidance is necessary, whether a progression report from fax is necessary, whether a start instruction by a user is necessary and a source of data.

When the composite service is an image storing service (see FIGS. 23A and 23B), lines 13 onward of the recipe indicate the operation conditions of the scan service and a storage service.

The operation conditions of the scan service are similar to those indicated in FIG. 21A-21B or 22A-22B.

The operation conditions of the storage service include whether data is compressed, whether sound/voice guidance is necessary, whether progression report from the storage is necessary, whether a start instruction by a user of the storage is required and a source of the data to be stored.

It should be noted that, when the recipe is for confirmation, it is only necessary to confirm the operation statuses of respective devices, and accordingly, the operational conditions are not necessarily be included in the recipe.

Next, a procedure for creating the recipe will be described in detail.

Figure 10:
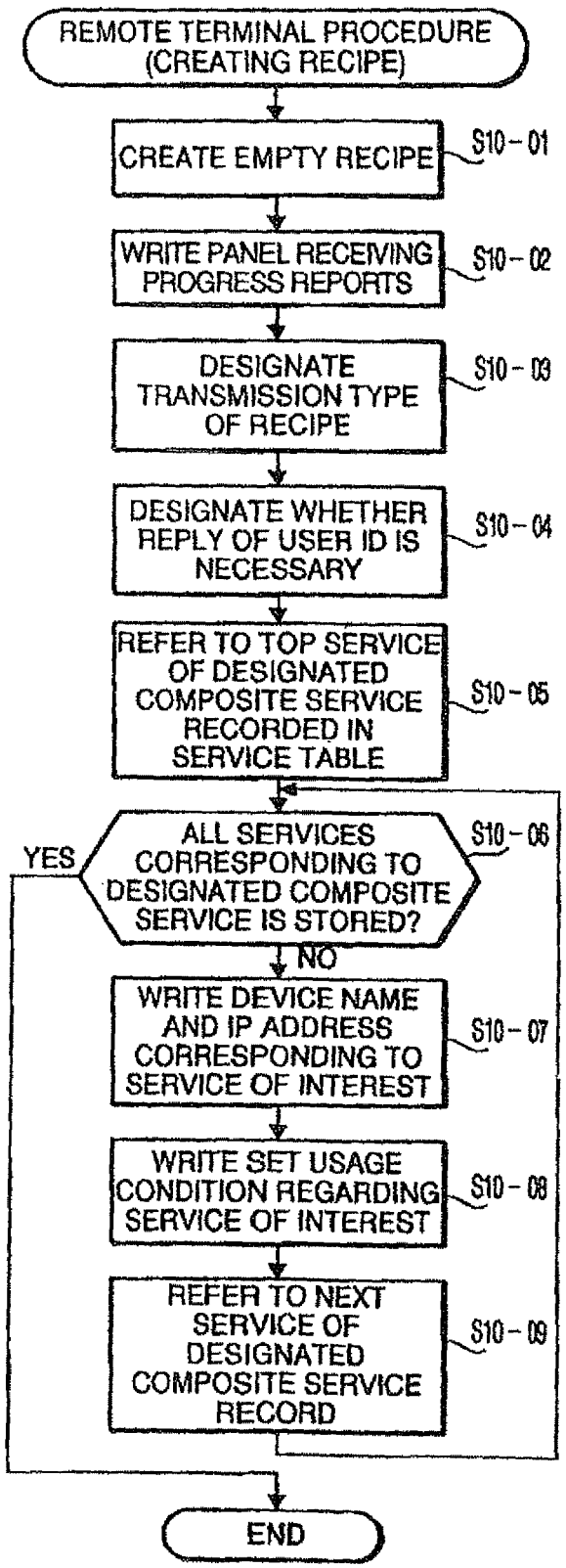
FIG. 10 shows a flowchart illustrating a recipe creating procedure of the remote terminal according to the first through fifth embodiments.

FIG. 10 shows a flowchart illustrating a recipe creating procedure of the remote terminal 4 according to the first embodiment.

In S10-01, the remote terminal 4 creates an empty recipe. The empty recipe only includes information of the designated composite service and information indicating whether the recipe is for confirmation or execution. No further information is included in the empty recipe.

In S10-02, the remote terminal 4 writes in the empty recipe that the remote terminal 4 itself as the panel receiving the progression reports from the devices providing respective services.

In S10-03, the remote terminal 4 designate the transmission type of the recipe. In the first embodiment, the recipe is transmitted (relayed) sequentially.

In S10-04, the remote terminal 4 writes whether a reply of the user ID is necessary. In the first embodiment, the remote terminal 4 writes that the reply of the user ID is unnecessary.

In S10-05, the remote terminal 4 refers to a device providing the service 1 which is executed firstly referring to the record related to the designated composite service indicated in the service table (see FIG. 17).

In S10-06, process determines whether all the device names, IP addresses and operation conditions have been written in the recipe with respect all the devices providing the individual services to achieve the designated composite service.

When all the information has been written in the recipe (S10-06: YES), the recipe creating procedure is terminated. When the writing of the recipe has not been finished (S10-06: NO), process proceeds to S10-07. In S10-07, process writes the device name of a device providing the target service and its IP address in the recipe.

In S10-08, process writes the usage condition regarding the target service in the recipe. Then, in S10-09, process refers to a device providing the next service indicated in the record related to the designated composite service included in the service table (FIG. 17). Then, process returns to S10-06.

The writing procedure in steps S10-06 through S10-09 is repeated for all the devices providing individual services indicated in the record related to the designated composite service. When the writing procedure in steps S10-06 through S10-09 has been finished for all the devices (S10-06: YES), the procedure shown in FIG. 10 is terminated.

It should be noted that, when the recipe is for confirmation, step S10-08 is not necessarily executed.

Next, the operation of a device providing the service will be described in detail.

Figure 11:
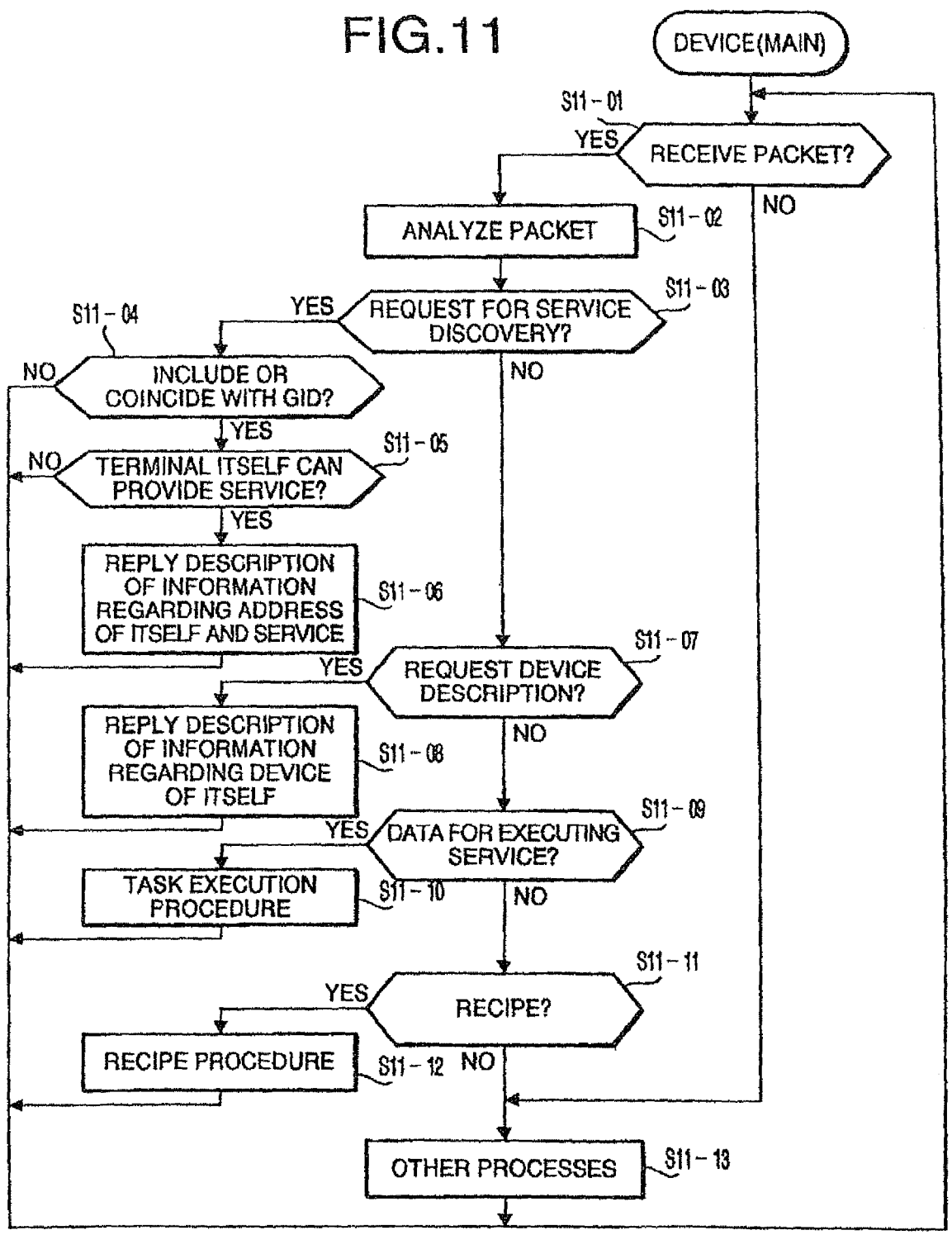
FIG. 11 shows a flowchart illustrating a main procedure of a determined device according to the first, second, fourth and fifth embodiments.

FIG. 11 shows a flowchart illustrating a main procedure of a device according to the first embodiment.

In S11-01, process determines whether a data packet is received. When no data packet is received (S11-01: NO), process proceeds to S11-13, where process performs other operation and returns to S11-01.

When a data packet is received (S11-01: YES), process proceeds to S11-02.

In S11-02, process analyzes the received data packet. In S11-03, process determines, based on the analysis result, whether the received data is the request for the service discovery from the remote terminal 4.

When the data is not the service discovery request (S11-03: NO), process proceeds to S11-07. When the data is the service discovery request (S11-03: YES), process proceeds to S11-04.

In S11-04, process determines whether the data includes the GID, and whether the GID coincides with the GID of the device.

When the data includes the GID but it does not coincide with the GID of the device (S11-04: NO), process returns to S11-01. That is, when the service discovery request is recognized to come from a device outside a group to which the device belongs, the service discovery request is ignored.

When the data does not include the GID or when the GID coincides with the GID of the device (S11-04: YES), process proceeds to S11-05.

In S11-05, process determines whether the device itself can provide the service. When the device cannot provide the service (S11-05: NO), process returns to S11-01. When the device can provide the service (S11-05: YES), process returns information related to the service and its address as shown in FIG. 19 to the remote terminal 4. That is, the device only replies to the service discovery corresponding to the service the device can provide. Thereafter, process returns to S11-01.

When the data is not the request for the service discovery (S11-03: NO), process proceeds to S11-07.

In S11-07, process determines whether the data packet include a device description request from the remote terminal 4.

When the data is not the device description request (S11-07: NO), process proceeds to S11-09. When the data is the device description request (S11-07: YES), process proceeds to S11-08.

In S11-08, process returns the device description describing the device information, as shown in FIG. 20, to the remote terminal 4. Then, process returns to S11-01.

In S11-09, process determines whether the data packet includes data to be used in a task of the device itself. For example, when the device is the printer 3, process determines whether the data is print data to be processed by the print function.

When the data is not for the execution of the service (S11-09: NO), process proceeds to S11-11. When the data is for the execution of the service (S11-09: YES), process proceeds to S11-10, where process sends the data to the task of the device so that the service is executed. Then, process returns to S11-01.

When the data is not for execution of the service (S11-09: NO), process proceeds to S11-11, where process determines whether the data packet is the recipe or not.

When the data is not the recipe (S11-11: NO), process proceeds to S11-13, and executes other procedures. Then, process returns to S11-01. When the data is the recipe (S11-11: YES), process proceeds to S11-12, executes an operation corresponding to the recipe, and returns to S11-01.

The task execution procedure in S11-10 will be described in detail.

Figure 12:
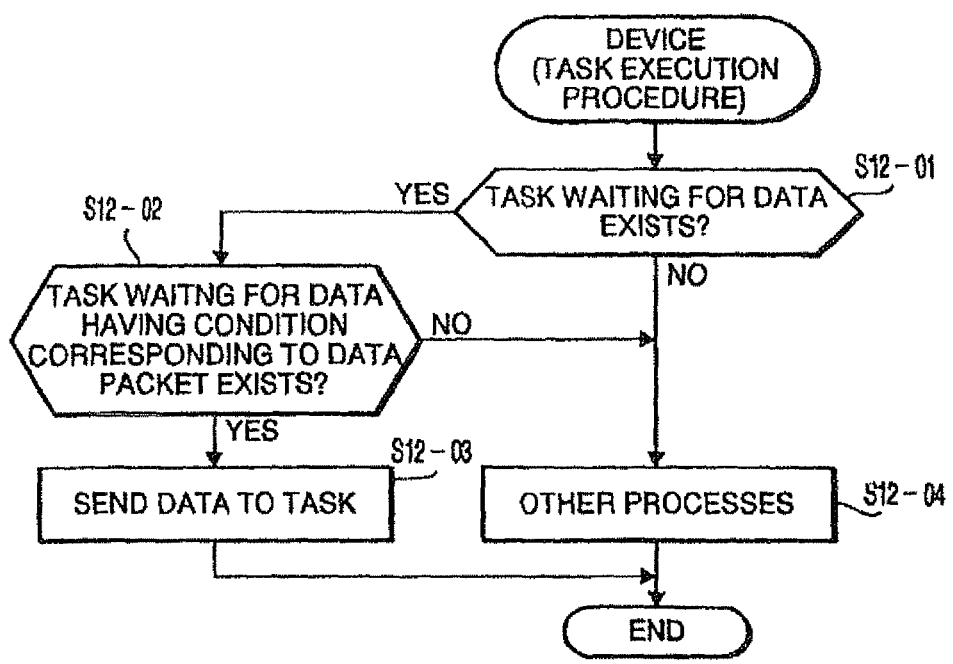
FIG. 12 shows a flowchart illustrating a task executing procedure of the determined device according to the first through fifth embodiments.

FIG. 12 shows a flowchart illustrating a task execution procedure of the determined device according to the first embodiment.

In S12-01, process determines whether a task waiting for data exists. When there is not task that waits for data (S12-01: NO), process proceeds to S12-04 to execute other procedures, and terminates the task execution procedure. When there is a task that waits for data (S12-01: YES), process proceeds to S12-02.

In S12-02, process determines whether there is a task which meets the condition represented by the received data packet. When there is not such a task (S12-02: NO), process proceeds to S12-04 to executed other procedure, and terminates the task execution procedure. When there is such a task (S12-02: YES), process proceeds to S12-03, where the data is sent to the task, and the task is executed.

Figure 13:
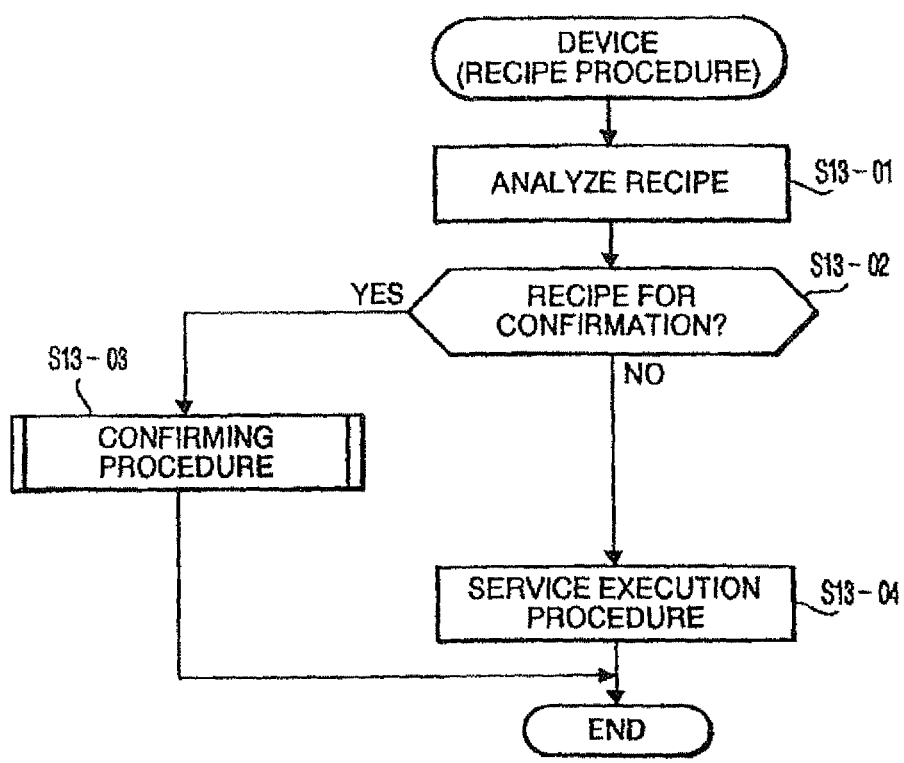
FIG. 13 shows a flowchart illustrating a recipe processing procedure of the determined device according to the first through fifth embodiments.

FIG. 13 shows a flowchart illustrating a recipe processing procedure, which is executed in S11-12 of the task execution procedure, according to the first embodiment.

In S1-01, based on the analysis of the recipe, process determines whether the recipe is for confirmation or execution.

When the recipe is for confirmation (S13-02: YES), process proceeds to S13-03 to execute a confirming procedure. When the recipe is not for confirmation (S13-02: NO), process proceeds to S13-04 and executes a service executing procedure.

Next, the confirming procedure executed in S13-03 will be described.

Figure 14:
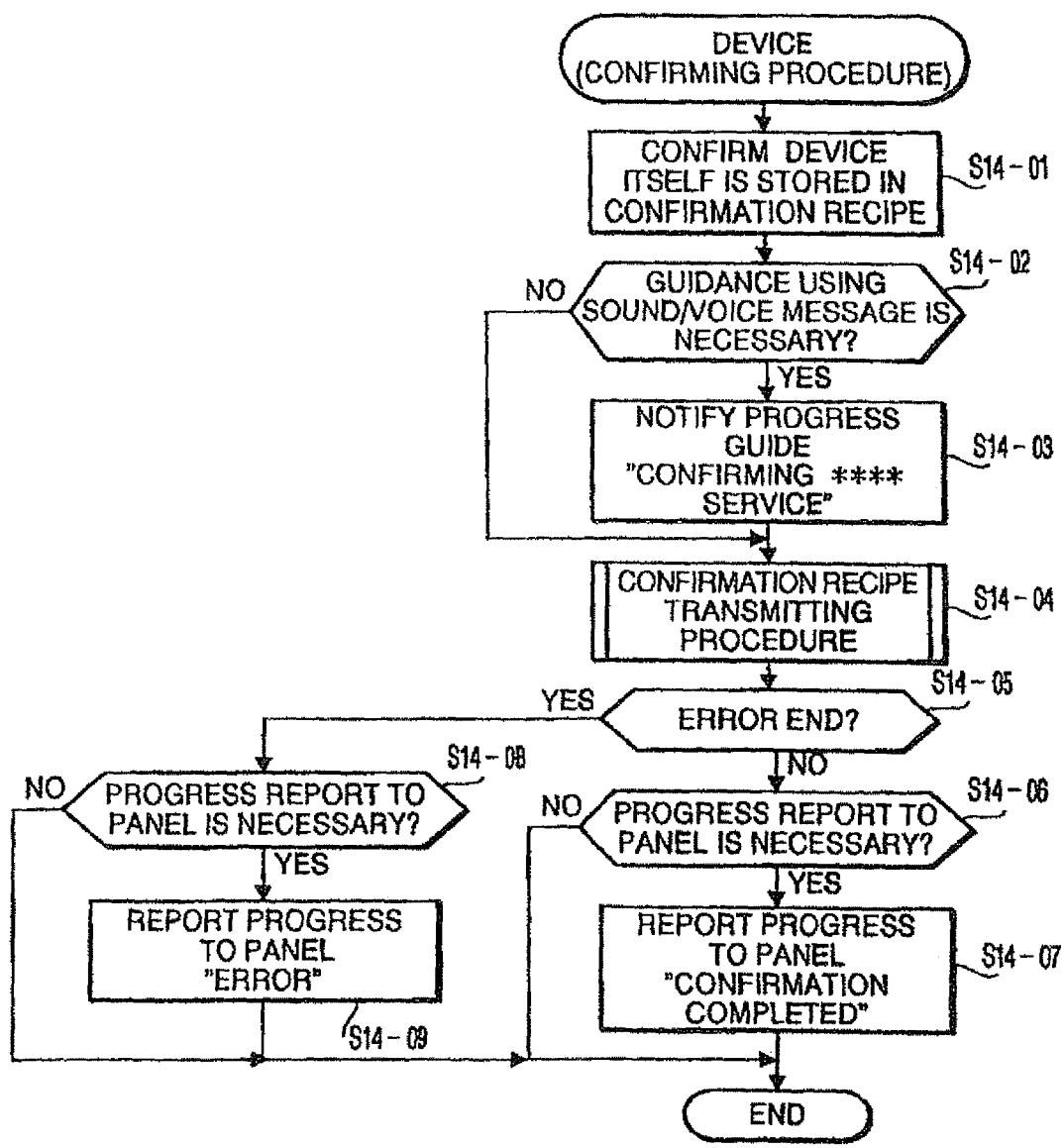
FIG. 14 shows a flowchart illustrating a confirming procedure of the determined device according to the first, second, fourth and fifth embodiments.

FIG. 14 shows a flowchart illustrating the confirming procedure according to the first embodiment.

In S14-01, process confirms that the device itself is written in the recipe for confirmation.

In S14-02, process determines whether a guidance using sound/voice message is necessary.

When the guidance is not necessary (S14-02: NO), process proceeds to S14-04. When the guidance is necessary (S14-02: YES), process proceeds to S14-03.

In S14-03, process notifies a progression guide of "Being Processed" with the display units 1c (2, 3c) and/or notifying unit 1d (2d, 3d).

In S14-04, process transmits the recipe for confirmation to the next device recorded in the recipe.

In S14-05, process determines whether an error has occurred in a transmission procedure. When the error has occurred (S14-05: YES), process proceeds to S14-08. When the error has not occurred (S14-05: NO), process proceeds to S14-06.

In S14-06, process determines whether a progress report should be transmitted to the panel. When the progress report is unnecessary (S14-06: NO), process terminates the procedure shown in FIG. 14. When the progress report is necessary (S14-06: YES), process proceeds to S14-07. In S14-07, process transmits the report of "Confirmation Finished" to the panel, and terminates the procedure.

In S14-05, when the error has occurred (S14-05: YES), process proceeds to S14-08. In S14-08, process determines whether a progression report to the panel is necessary. When the progress report is unnecessary (S14-08: NO), process terminates the procedure. When the progress report is necessary (S14-08: YES), process proceeds to S14-09. Then, in S14-09, process transmits the report of "Error" to the panel, and terminates the procedure.

Transmission of the recipe for confirmation, which is executed in S14-04, will be described.

Figure 15:
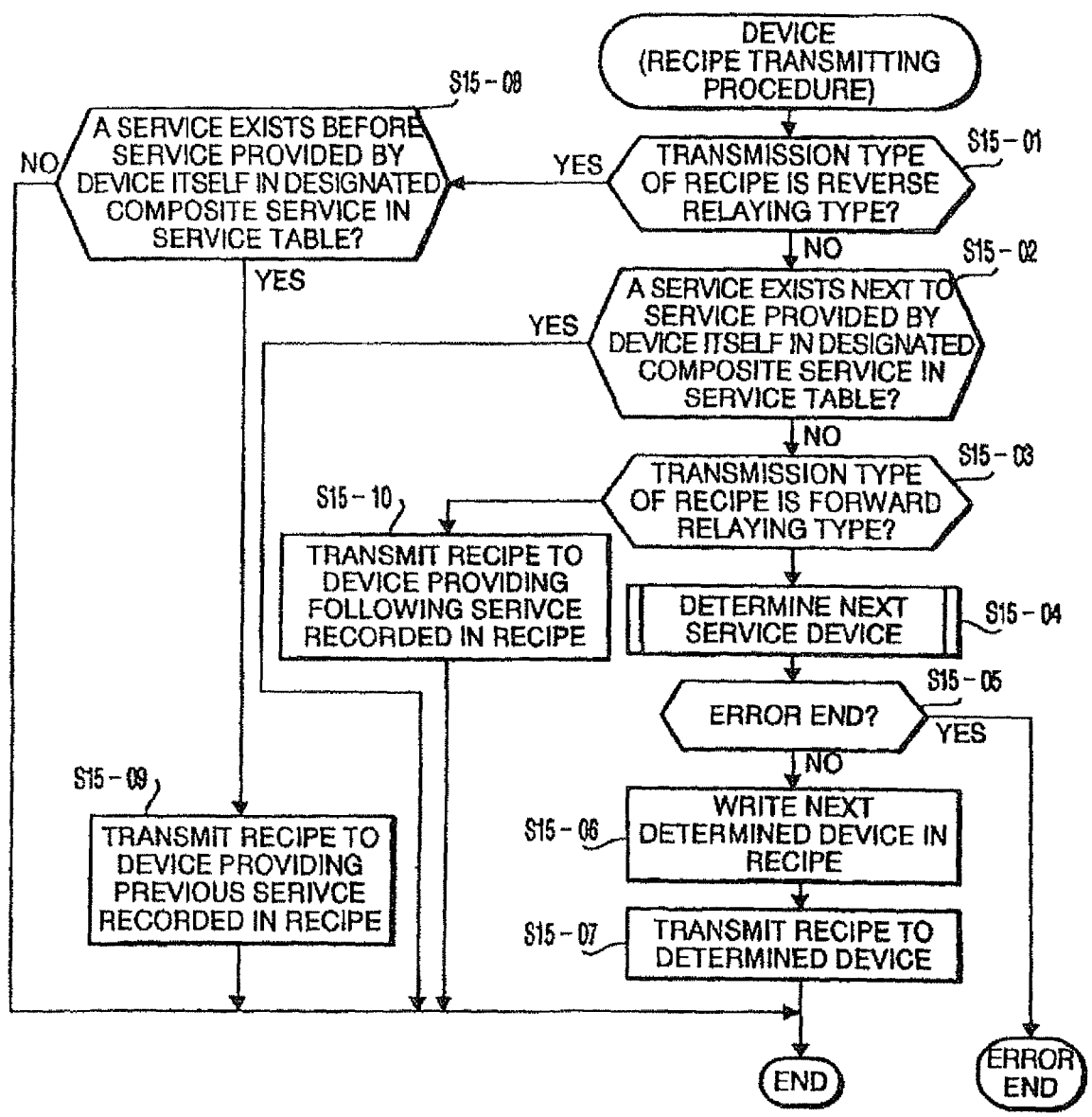
FIG. 15 shows a flowchart illustrating a recipe transferring procedure of the determined device according to the first, second and fifth embodiments.

FIG. 15 shows a flowchart illustrating the recipe transmitting procedure executed by the device according to the first embodiment.

It should be noted that each device has a service table which is the same as the service table the remote terminal 4 has and as the table shown in FIG. 17.

In S15-01, process determines whether the transmission type of the recipe is a reverse relaying type. When the transmission type is the reverse relaying type (S15-01: YES), process proceeds to S15-08. Since steps S15-08 and S15-09 relates to a fifth embodiment, and will be described later. According to the first embodiment, the transmission type is a forward relay type, i.e., not the reverse relay type (S15-01: NO). Accordingly, in the first embodiment, process proceeds to S15-02.

In S15-02, process determines whether there is a service following the service provided by itself in the record related to the designated composite service in the service table. When there is no service following the service provided by the device (S15-02: NO), process terminates the procedure since there is no need to transmit the recipe. When there is a service following the service provided by the device (S15-02: YES), process proceeds to S15-03.

In S15-03, process determines whether the transmission type of the recipe is the forward relay type. When the transmission type is not the forward relay type (S15-03: NO), process proceeds to S15-04. It should be noted that steps S15-04 through S15-07 correspond to the second embodiment, and will be described later. Since the forward relay type transmission is employed in the first embodiment (S15-03: YES), process proceeds from S15-03 to S15-10.

Next, the service executing procedure executed in S13-04 will be describe in detail.

Figure 16:
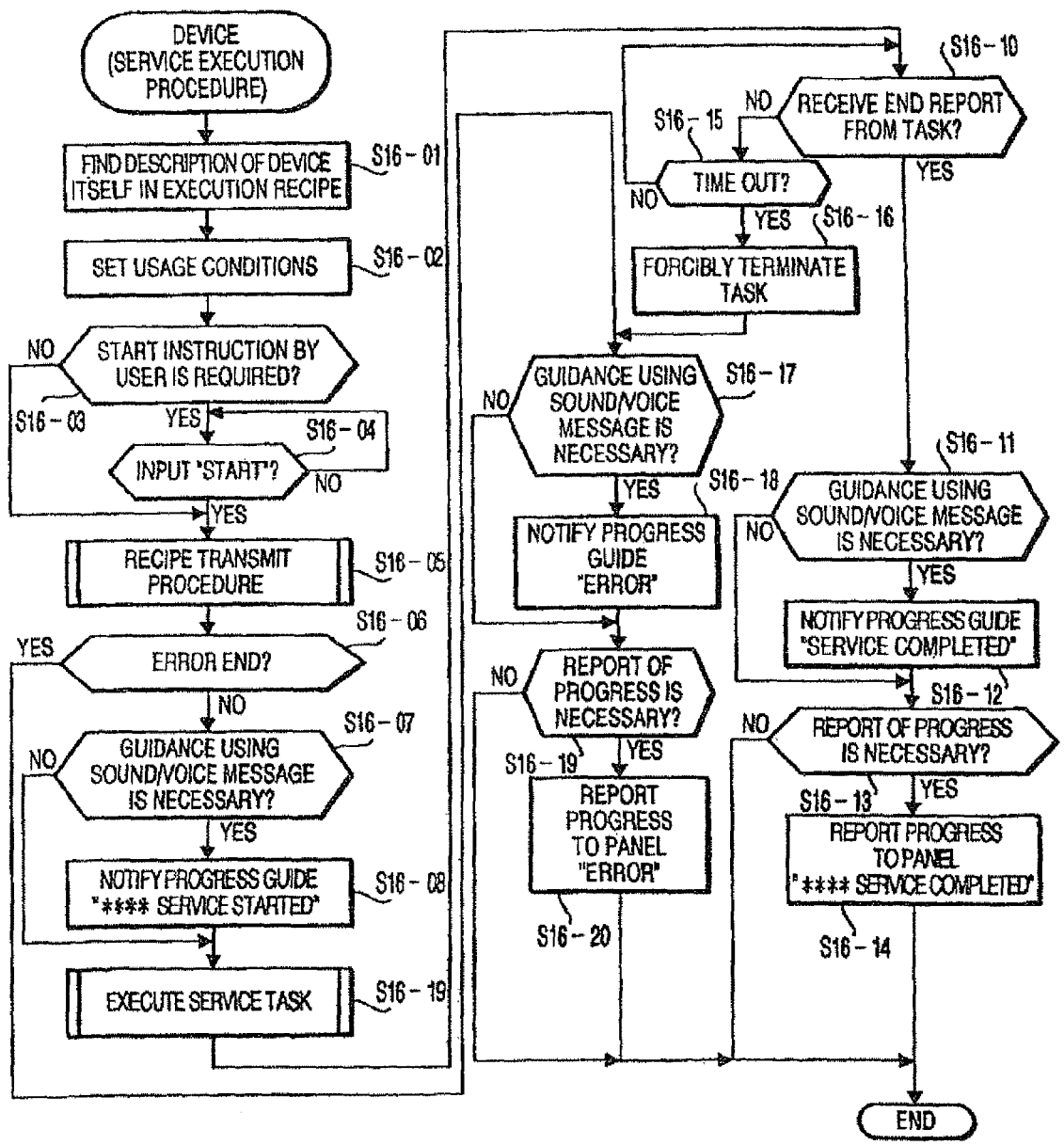
FIG. 16 shows a flowchart illustrating a service executing procedure of the determined device according to the first, second, fourth and fifth embodiments.

FIG. 16 shows a flowchart illustrating the service executing procedure of the determined device according to the first embodiment.

In S16-01, process finds a description of itself in the recipe for execution. In S16-02, process sets the usage conditions related to the service which the device itself provides.

In S16-03, process determines whether an instruction by the user to start executing the service is required.

When the user's instruction is unnecessary (S16-03: NO), process proceeds to S16-05. When the user's instruction is necessary (S16-03: YES), process proceeds to S16-04, when process request the user to input the instruction to start the service.

S16-05, process transmits the recipe for execution to the next device. This procedure is similar to that illustrated in FIG. 15.

In S16-06, process determines whether an error has occurred in the transmitting procedure. When the error has occurred (S16-06: NO), process proceeds to S16-17. When the error has not occurred (S16-06: YES), process proceeds to S16-07.

In S16-07, process determines whether a sound/voice guidance is necessary. When the sound/voice guidance is unnecessary (S16-07: NO), process proceeds to S16-09. When the sound/voice guidance is necessary (S16-07: YES), process proceeds to S16-08.

In S16-08, a progress guidance of "*** service is start" is notified using the display unit 1c (2c or 3c) and/or notifying unit 1d (2d or 3d).

In S16-09, process executes the service by starting the service task of the device itself. When data is necessary (e.g., when the print service is executed), the task stays in a standby state until the data is given in S12-03.

In S16-10, process determines whether a report of the end of the service is received from the service task.

When the end report has not been received (S16-10: NO), process proceeds to S16-15. When the end report has been received (S16-10), process proceeds to S16-11.

In S16-11, process determines whether a sound/voice guidance is necessary. When the sound/voice guidance is unnecessary (S16-11: NO), process proceeds to S16-13. When the sound/voice guidance is necessary (S16-11: YES), process proceeds to S16-12.

In S16-12, a progress guide of "*** service is finished" is notified with the display unit 1c (2c or 3c) and/or notifying unit 1d (2d or 3d).

in S16-13, process determines whether a progress report is necessary. When the progress report is not necessary (S16-13: NO), process terminates the procedure of FIG. 16. when the progress report is necessary (S16-13: YES), process proceeds to S16-14.

In S16-14, process determines whether a predetermined time period regarding the service task procedure has expired. When the predetermined time period has not expired (S16-15: NO), process returns to S16-10. When the predetermined time period has expired (S16-15: YES), process proceeds to S16-16, and forcibly terminates the service task procedure. Then, process proceeds to S16-17.

In S16-17, process determines whether a sound/voice guidance is necessary. When the sound/voice guidance is unnecessary (S16-17: NO), process proceeds to S16-19. When the sound/voice guidance is necessary (S16-17: YES), process proceeds to S16-18.

In S16-18, a progress guide of "Error" is notified with the display unit 1c (2c or 3c) and/or notifying unit 1d (2d or 3d).

In S16-19, process determines whether a progress report is necessary. When the progress report is unnecessary (S16-19: NO), process terminates the procedure of FIG. 16, when the progress report is necessary (S16-19: YES), process proceeds to S16-20.

In S16-20, process transmits the progress report of "Error" to the panel, and terminates the procedure illustrated in FIG. 16.

With the above procedure, the device executes the setting of itself, communication with a device that provides the next service, the service executed by the service task itself and transmission of the progress report to the user. These procedures are all executed based on the description of the recipe for execution.

It should be noted that the service task execution procedure in S16-09 will be described later.

Second Embodiment

Next, a composite service providing system according to a second embodiment will be described. The system configuration of the system according to the second embodiment is similar to that of the first embodiment, and is shown in FIGS. 1 and 2. Further, the composite service providing system according to the second embodiment will be described referring to FIGS. 25 through 29, 5 through 8, 9 through 20 and 24. Among them, FIGS. 7, 8, 9, 11 through 13, 17 through 20 and 24 have been described above, and thus, description thereof will not be repeated in connection with the second embodiment. Rather, only different portions with respect to the first embodiment will be described in detail below.

Figure 25:
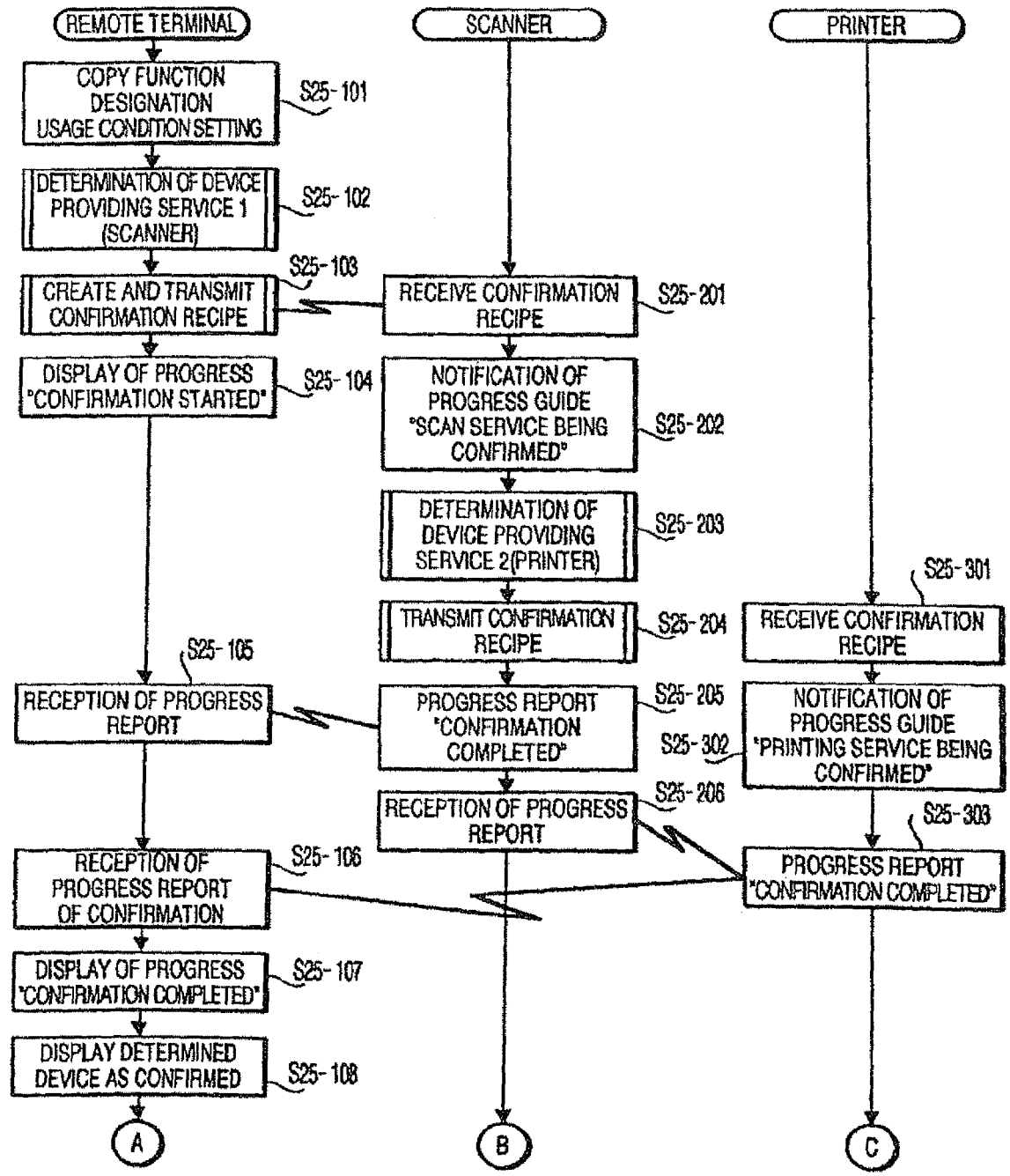
FIG. 25 shows schematic flowcharts illustrating operations of remote terminal, scanner and printer of a composite service providing system according to a second embodiment of the invention.
Figure 26:
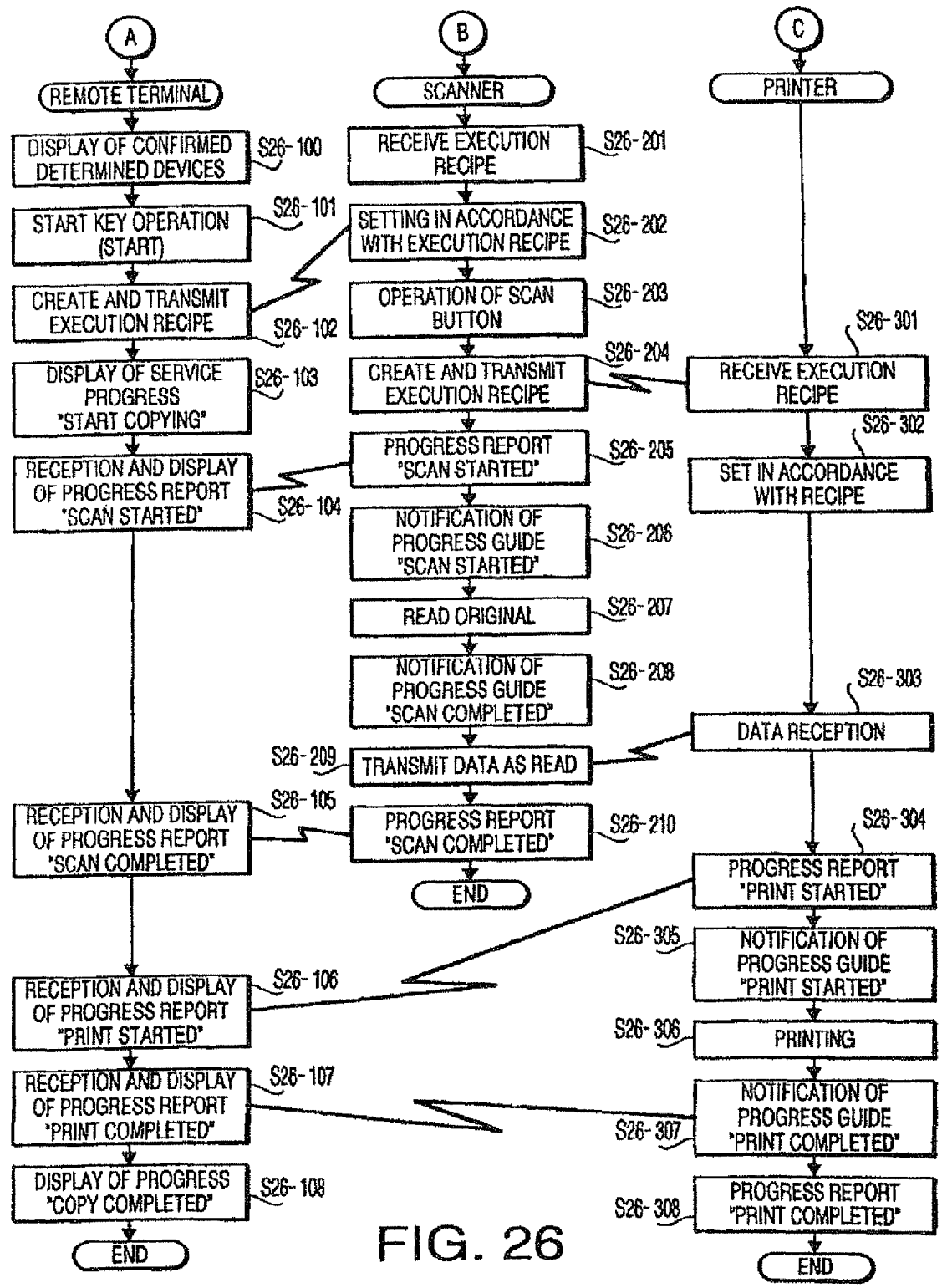
FIG. 26 shows schematic flowcharts illustrating confirming procedures of the remote terminal, scanner and printer of a composite service providing system according to the second embodiment of the invention.

FIG. 25 shows flowcharts illustrating operations of remote terminal, scanner and printer of the composite service providing system according to the second embodiment of the invention. FIG. 26 shows flowcharts illustrating confirming procedures of the remote terminal, scanner and printer of a composite service providing system according to the second embodiment.

In FIGS. 25 and 26, as an example of the composite service, a copy service is designated. It should be noted that the designated composite service is not limited to the copy service, and the copy service is described only for the purpose of explanation.

In S25-101 of FIG. 25, a procedure similar to that executed in S3-101 in the first embodiment is executed.

In S25-102, the remote terminal 4 automatically determines a device that provides the first service among the services necessary for achieving the composite service. That is, the remote terminal 4 determines a device which provides the service 1 in the service table shown in FIG. 17. In the example, the scanner 1 is selected as the device providing the service 1.

In S25-103, the remote terminal creates the recipe for confirmation in order to confirm the operation such as communication status of the scanner 1, and transmits the recipe for confirmation to the scanner 1. The recipe for confirmation is different from that of the first embodiment in that the no printer is designated. In S25-104, the remote terminal 4 notifies "Start confirmation" with the display unit 4b and/or notifying unit 4c.

Then, in S25-105, the remote terminal receives the progress report of the confirmation from the determined device that provides the service 1.

In S25-201, the scanner receives the recipe for confirmation. In S25-202, the scanner 1 notifies a progress guide such as "Scan service being confirmed" on the display unit 1c and/or notifying unit 1d.

In S25-203, the scanner 1 then automatically determines a device that provides a second service among the devices necessary for achieving the composite service, i.e., a device that provides a service corresponding to the service 2 in the service table shown in FIG. 17. In this example, the device that provides the service 2 is the printer 3.

In S25-204 and S25-205, process executes a procedure similar to that executed in S4-203 and S4-204 of the first embodiment. Then, in S25-206, process receives the progress report of the confirmation from the determined device that provides the service 2.

In S25-301, the printer 3 receives the recipe for confirmation. Then, in S25-302, the printer 3 notifies a progress guide of "Confirmation Finished" with the display unit 3c and/or notifying unit 3d.

In S25-303, process notifies that "Confirmation Finished" with the display unit 3c and/or notifying unit 3d, and at the same time, process data indicating that "Confirmation Finished" to the remote terminal 4 and the scanner 1. Then, process terminates the confirming procedure.

In S25-106 through S25-108, the remote terminal 4 executes a procedure similar to one executed in S4-105 through S4-107 of the first embodiment. Then, process proceeds to S26-100, where the determined devices are displayed on the display unit 4b.

In S26-101 of FIG. 26, the remote terminal 4 requests the user to confirm the information displayed on the display unit 4b, and to input an instruction to start the composite service.

In S26-102, the remote terminal 4 creates a recipe for execution, transmits the recipe to a scanner 1 that provides the service 1, and instructs to execute the service. The recipe for execution is also different from that of the first embodiment in that the designation of the printer 3 is not described.

Thereafter, process proceeds to S26-103, where the remote terminal 4 notifies a progress of service, i.e., "Copy Started" with the display unit 4b and/or notifying unit 4c.

In S26-104 through S26-108, the remote terminal 4 executes a procedure similar to that executed in S3-107 through S3-111. In S26-201 through S26-210, the scanner 1 executes a procedure similar to that executed in S3-201 through S3-210 of the first embodiment. It should be noted that, to the recipe for execution transmitted in S26-204, the scanner 1 has added the description on the printer 3, which has been determined in S25-203.

In S26-301 through S26-308, the printer 3 executes a procedure similar to that executed in S3-301 through S3-308 of the first embodiment.

A main procedure of the remote terminal 4 according to the second embodiment is shown in FIG. 5. The difference between the second embodiment and the first embodiment is that, according to the second embodiment, process determines only a device that provides the service 1 of the service table shown in FIG. 17 in S5-03. That is, the procedure shown in FIG. 6 should be modified. Specifically, in FIG. 6, when the decision in S6-17 is "YES", process terminates the procedure according to the second embodiment, without executing a loop of S6-02 and S6-19.

FIGS. 29A and 29B show an example of the recipe according to the second embodiment. In this example, the composite service is the copy service.

According to the second embodiment, each device is to determine a device providing the next service. Therefore, in the confirmation recipe as well as in the execution recipe, information on usage conditions including a resolution and color/monochromatic.

FIGS. 29A and 29B correspond to the recipe of the first embodiment shown in FIGS. 21A and 21B. The recipe shown in FIGS. 29A and 29B is different from the recipe shown in FIGS. 21A and 21B in that the description on the device name providing a service and the IP address of the device is given only for the device providing the first service, and device names and IP addresses of devices providing service 2 and following services are not described. Further, in the recipe shown in FIGS. 29A and 29B, it is indicated that the recipe need not be forwardly relayed among the devices.

When the composite service is a remote fax and when the composite service is the image storing service, the difference of the confirmation recipe and execution recipe according to the second embodiment and those of the first embodiment is the same as the difference between the second and first embodiment when the composite service is the copy service described above.

FIG. 10 shows the flowchart illustrating the recipe creating procedure in the remote terminal 4, which also applies to the second embodiment. The second embodiment is different from the first embodiment by the following point. According to the second embodiment, in S10-03, process writes that the forward relay of the recipe among the devices is not necessary in the recipe. Further, in S10-07, a device name and its IP address are written with respect to a single device.

Since the other operations are similar to those in the first embodiment, description thereof will not be repeated.

Next, operation of the device providing the service will be described. Since the procedures shown in FIGS. 11 through 13 are the same both in the first embodiment and the second embodiment, description thereof is not repeated.

Regarding FIG. 14, the second embodiment is different from the first embodiment in that the progress report of the confirmation in S14-07 and S14-09 is transmitted to both the remote terminal 4 and the device which is the source of the confirmation recipe.

Further, according to the second embodiment, the procedure of transmitting the confirmation recipe (S14-04) is different from that in the first embodiment, which will be described with reference to FIG. 15.

Steps S15-01 and S15-02 according to the second embodiment are the same as those of the first embodiment.

In S15-03, process determines whether the recipe is to be forwardly relayed among the devices. According to the second embodiment, it is written in the recipe that the recipe is not forwardly relayed. Therefore, decision in S15-03 is "NO", and process proceeds to S15-04.

In S15-04, process determines a device that provides the next service. Then, in S15-05, process determines whether the previous operation of determining the device is finished with error.

When step S15-04 is finished with error (S15-05: YES), the procedure is terminated with error. When step S15-04 is successfully finished (i.e., the device is determined without error) (S15-05: NO), process proceeds to S15-06.

In S15-06, process writes the determined device (i.e., the device determined in S15-04) and its IP address in the confirmation recipe. Then, in S15-07, process transmits the confirmation recipe to the determined device.

For example, when the composite service designated in FIGS. 29A and 29B is the copy service, as a device that provides a service (i.e., print service) following the service 1 (i.e., scan service), the printer 3 is determined. Then, the name of the determined device (i.e., printer 3) and its IP address are added to the confirmation recipe, and the confirmation recipe is transmitted to the printer 3 which is the determined device.

When the composite service is the remote fax service, as a device that provides the next service (i.e., fax service) following the service 1 (i.e., scan service), the fax modem 2 is determined, and the name of the fax modem 2 and its IP address are added to the confirmation recipe. Then, the confirmation recipe is transmitted to the fax modem 2.

When the composite service is the image storing service, as a device that provides the next service (i.e., storing service) following the service 1 (i.e., scan service), the storage is determined, and the name of the storage and its IP address are added to the confirmation recipe. Thereafter, the confirmation recipe is transmitted to the determined storage.

Next, a procedure of determining the next device (S15-04) according to the second embodiment will be described.

Figure 27:
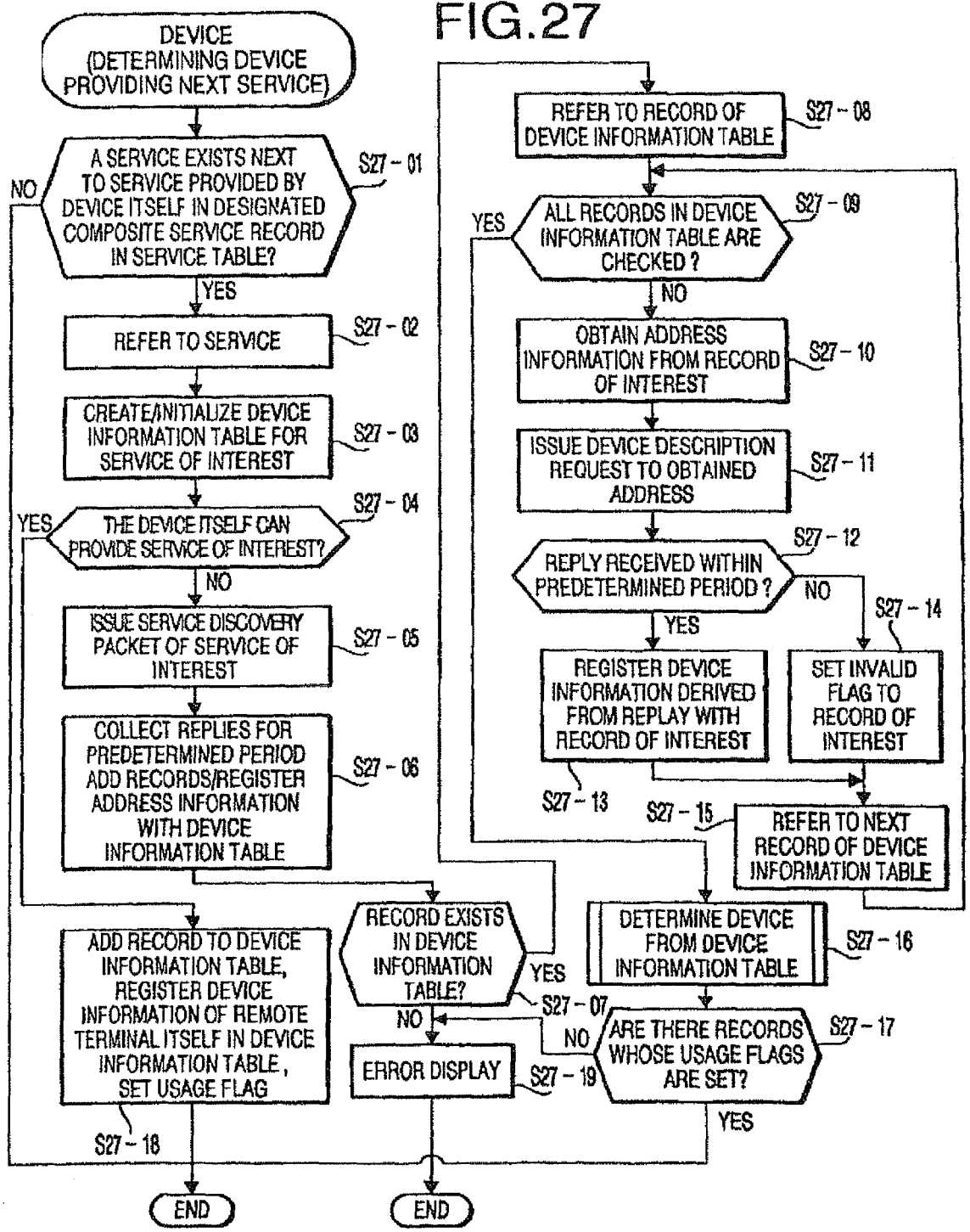
FIG. 27 shows a flowchart illustrating a procedure of the device according to the second embodiment for determining a device providing a next service.

FIG. 27 shows a flowchart illustrating the procedure of determining a device providing the next service according to the second embodiment.

It should be noted that FIG. 27 is similar to FIG. 6, but is different from FIG. 6 in that the procedure illustrated in FIG. 27 is executed by the device (not by the remote terminal 4), and when the decision in S27-27 (which corresponds to S6-17) is "YES", the procedure is terminated (i.e., a loop of S6-02 and S6-19 is not included in FIG. 27).

Next, a procedure of transmitting the execution recipe (S16-05) according to the second embodiment will be described.

Figure 28:
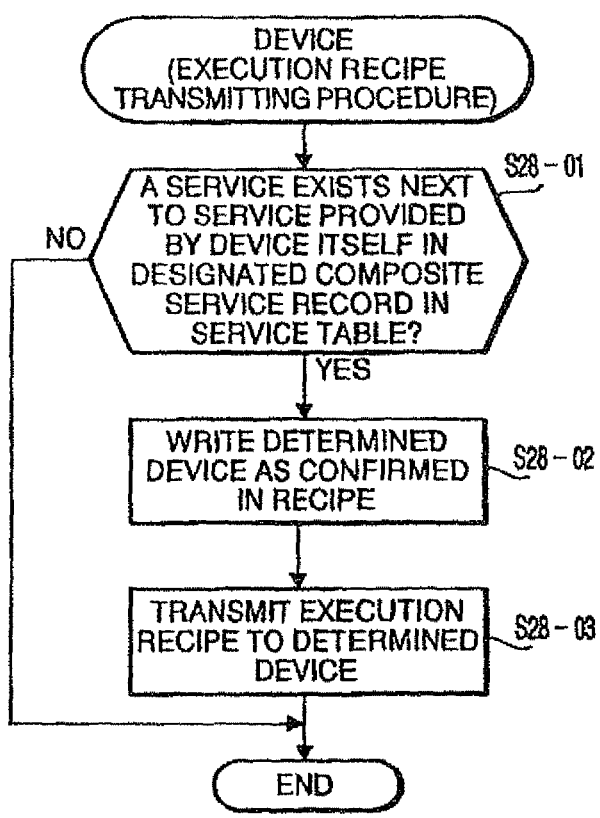
FIG. 28 shows a flowchart illustrating a procedure of the device according to the second embodiment for transferring a recipe for execution.

FIG. 28 shows a flowchart illustrating the procedure of the device for transmitting the execution recipe according to the second embodiment.

In S28-01, process determines whether a service following the service the device itself provides is included in the record related to the designated composite service in the service table. When the next service is not included (S28-01: NO), process terminates the procedure since there in no need to transmit the recipe. When the next service is available (S18-01: YES), process proceeds to S28-02.

In S28-02, process writes the name and IP address of a device which has been determined in S14-04 as the device providing the next service and operation thereof is confirmed in the execution recipe.

In S28-03, process transmits the execution recipe to determined device, and terminates the procedure.

For example, when the composite service is the copy service, as a device providing the next service (i.e., print service) following the service 1 (i.e., scan service), the printer 3 is determined, and the name and IP address of the printer 3 are added to the execution recipe. Then, process transmits the execution recipe to the determined/confirmed printer 3.

When the composite service is the remote fax service, as a device providing the next service (i.e., fax service) following the service 1 (i.e., scan service), the fax modem is determined, and the name and IP address of the determined fax mode 2 are added in the execution recipe. The execution recipe is then transmitted to the determined fax modem 2.

When the composite service is the image storing service, as a device providing the next service (i.e., storage service) following the service 1 (i.e., scan service), the storage is determined, and the name and IP address of the storage are added in the execution recipe. The execution recipe is then transmitted to the storage.

The above procedure is followed by a procedure for starting a service task, which will be described later after other embodiments are described.

Third Embodiment

Next, a composite service providing system according to the third embodiment will be described. According to the third embodiment, when a user approaches a device and inputs a user ID, the device broadcasts the user ID and device description. Thereafter, when a remote terminal 4 or another device having the same user ID transmits an execution recipe, the device executes a service task.

Thus, according to the third embodiment, user can make a selection in front of the device that provides the user-intended service, and can wait the completion of the service in front of the device.

In order for the user to input the user ID to respective devices providing services, an external operation unit 1e, 2e, 3e provided to respective devices. Alternatively or optionally, a transmitter that transmits a signal carrying the user ID may be used. In this case, when the transmitter approaches a device (1, 2 or 3), a communication unit (1b, 2b or 3b) of the device automatically receives the signal carrying the user ID, and stores the received user ID.

The hardware configuration of the third embodiment is similar to that of the first or second embodiment, as shown in FIGS. 1 and 2. In the following description on the third embodiment, FIGS. 30 through 39, 10, 12, 13 and 24 will be referred to. Among them, FIGS. 12, 13 and 24 are referred to in the first embodiment, and the description thereof is omitted, and only different portions with respect to the first embodiment will be described.

Figure 30:
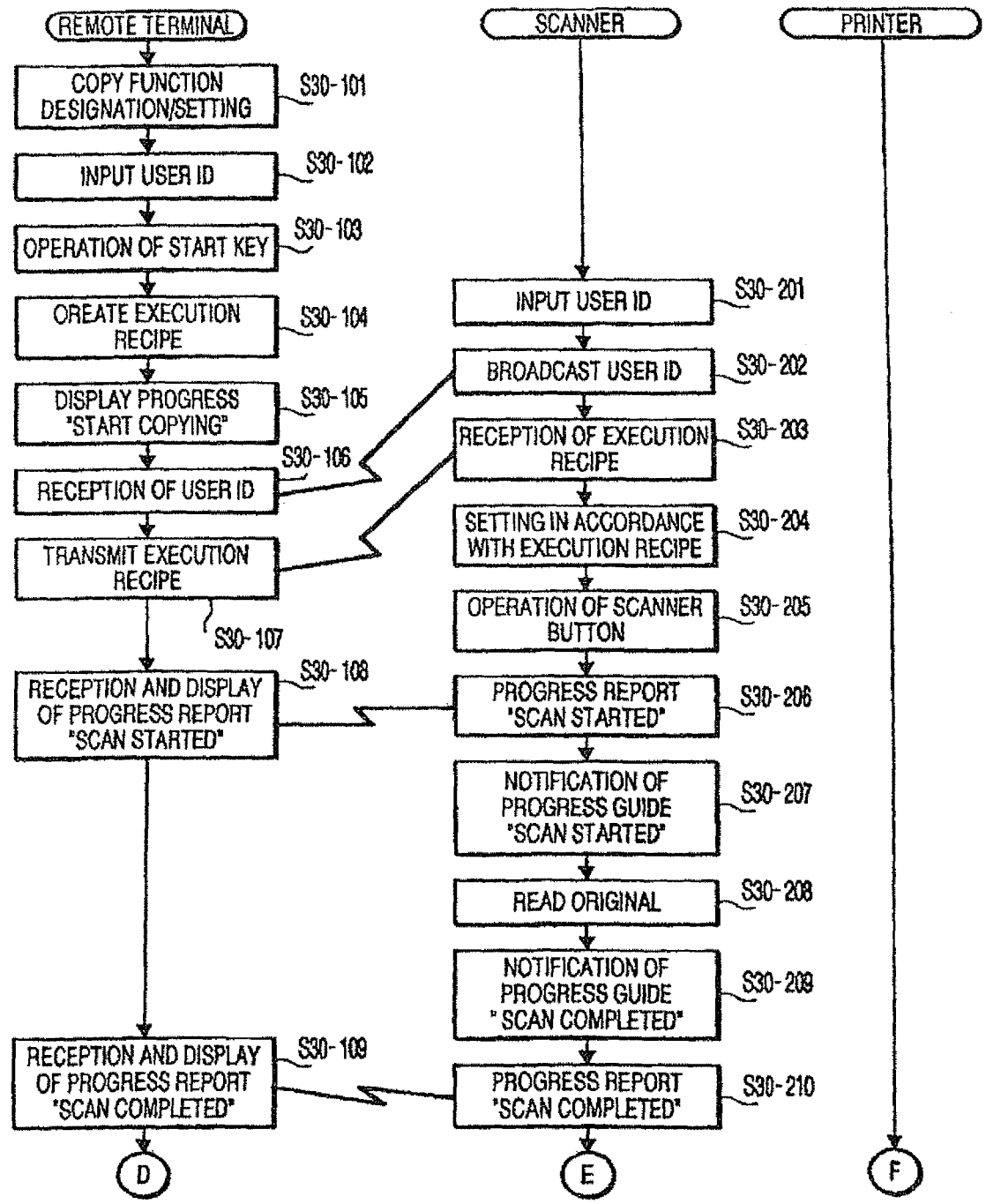
FIGS. 30 and 31 show schematic flowcharts illustrating operations of remote terminal, scanner and printer of a composite service providing system according to the third embodiment of the invention.
Figure 31:
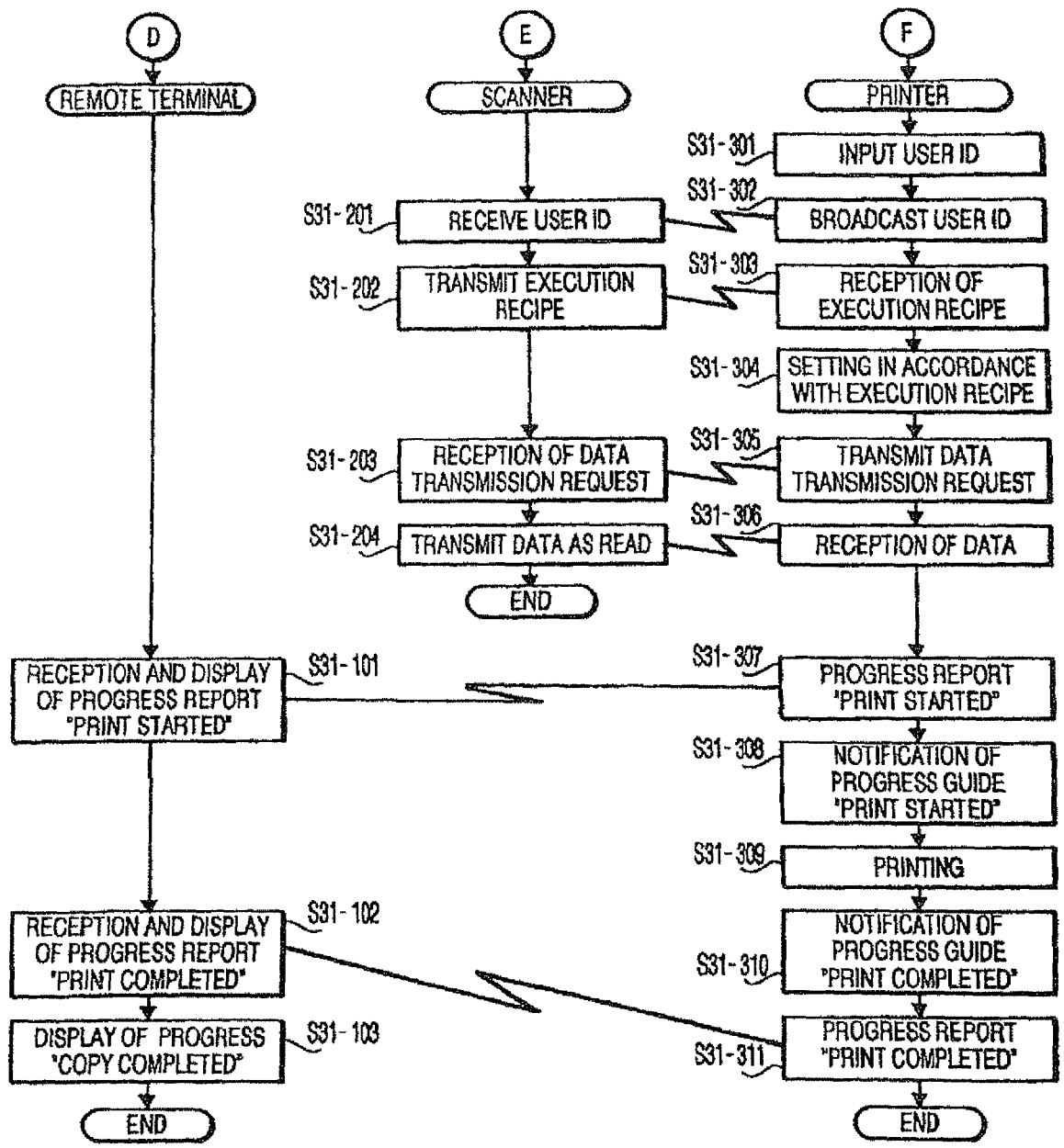

FIGS. 30 and 31 show flowcharts illustrating operations of remote terminal, scanner and printer of a composite service providing system according to the third embodiment of the invention.

In FIGS. 30 and 31, as the composite service, the copy service is designated, and a device that provides the service 1 in the service table is the scanner 1, and a device that provides the service 2 is the printer 3.

In S30-101, an operation same as that in S3-101 (FIG. 1: first embodiment) is executed. In S30-102, process requests the user to input the user ID.

In S30-103, process displays information on the display unit 4b so that the user can confirm the same, and asks the user to input the instruction to start the composite service.

In S30-104, process creates the execution recipe.

In S30-105, the remote terminal 4 notifies an indication of "Copy Service Started" with the display unit 4b and/or notifying unit 4c. Then, the remote terminal 4 waits until the ID same as the user ID input in S30-102 is transmitted from devices capable of providing the scan service and print service, which are necessary for achieving the copy service.

In S30-201, the user who instructs the copy service moves close to the scanner 1, and inputs the user ID in the scanner 1. The user ID is then registered with the scanner 1.

In S30-202, the scanner 1 broadcasts at least the user ID. Then, In S30-106, the remote terminal 4 receives the user ID. In S30-107, the remote terminal 4 determines whether the received user ID is equal to the user ID assigned to the remote terminal 4, and when the IDs are the same, the remote terminal 4 transmits the execution recipe to the scanner 1.

Thereafter, in S30-108 and S30-109, the remote terminal 4 executes the procedure which is the same as the procedure in S3-107 and S3-108 of the first embodiment.

In S30-203 through S30-210, the scanner 1 executes a procedure substantially same as the procedure in S3-201 through S3-210 of the first embodiment except that the scanner 1 does not transmit the execution recipe and scanned data.

Then, the scanner 1 waits until the user ID is transmitted from a device that provides the next service (i.e., the print service).

In S31-301, the user approaches the printer 3, and input the user ID into the printer 3. Then, the printer 3 stores the input user ID. In S31-302, the printer 3 broadcasts at least the user ID.

In S31-201, the scanner 1 receives the user ID. Then, in S31-202, the scanner determines whether the received user ID is the same as the user ID assigned to the scanner 1. When the user IDs are the same, the scanner transmits the execution recipe to the printer 3.

In S31-303, the printer 3 receives the execution recipe. Then, in S31-304, the printer 3 sets various operation conditions in order to provide the print service based on the received execution recipe.

In S31-305, the printer 3 transmits a request to the scanner 1 requesting to send the scanned data to the printer 3. Immediately after the printer 3 received the execution recipe, the printer 3 is not in a state to receive the scanned data. In S31-305, by sending the request, the printer 3 notifies the scanner that the printer 3 can receive the scanned data.

In S31-203, the scanner 1 receives the request for transmission of the scanned data.

In S31-304, the scanner 1 transmits the scanned data to the printer 3, and terminates the procedure.

In S31-306 through S31-311, the printer executes a procedure similar to that in S3-303 through S3-308 according to the first embodiment.

The remote terminal 4 executes a procedure in S31-101 through S31-103, which is the same as the procedure in S3-109 through S3-111.

Figure 32:
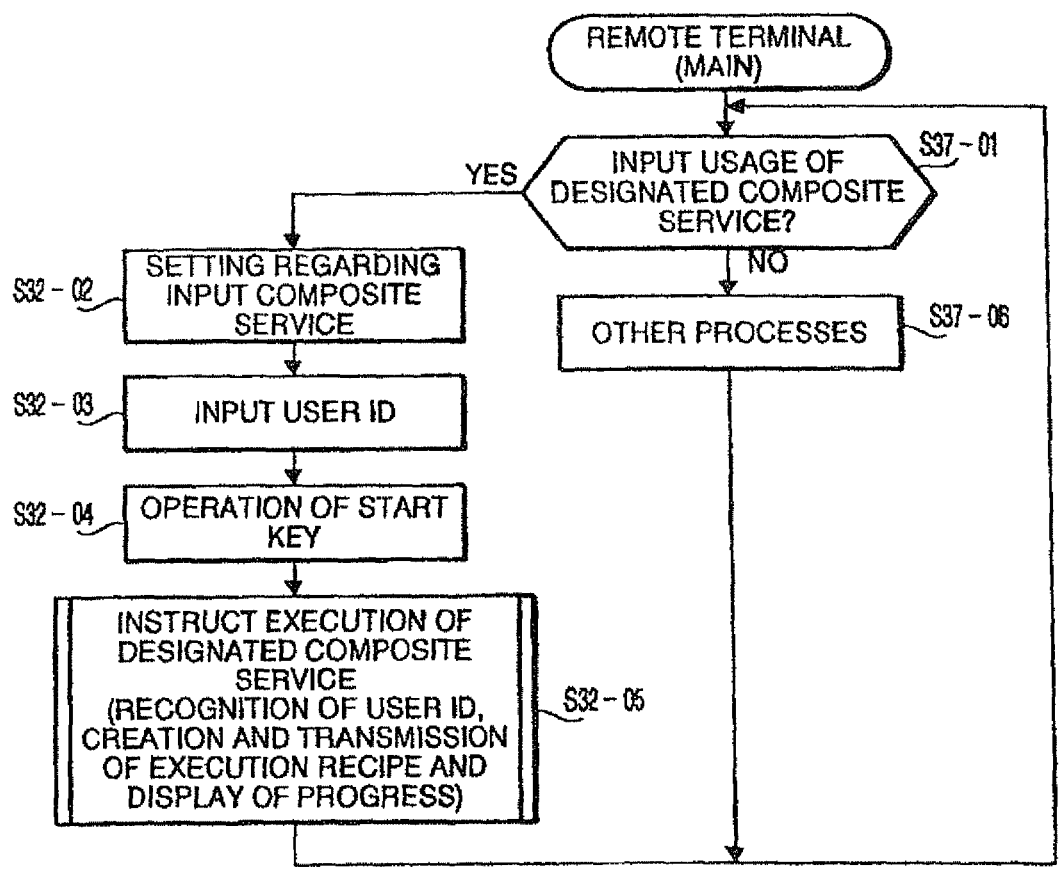
FIG. 32 shows a flowchart illustrating a main procedure of the remote terminal according to the third embodiment.

FIG. 32 shows a flowchart illustrating a main procedure of the remote terminal 4 according to the third embodiment.

In S32-01, the remote terminal 4 requests the user to determine whether the composite service is to be executed. When the user does not use the composite service (S32-01: NO), process proceeds to S32-06 to execute other procedures. When the user uses the composite service (S32-01: YES), process proceeds to S32-02.

In S32-02, process requests the user to designate which composite service is to be used, usage conditions thereof.

The remote terminal 4 has a service table related to the composite services as shown in FIG. 38. In this example, the contents of the service table shown in FIG. 38 is substantially similar to those of the service table shown in FIG. 17 except that the "push service" (ever occurrence) has been changed to "pull service".

In the service table shown in FIG. 38, "Pull service n (n being an integer)" represents a method of exchanging digital data. For example, the Pull service 1 represents a method in which process request the device providing service 1 to transmits the digital data, and receives the digital data as transmitted.

In S32-03, process requests the user to input the user ID. In S32-04, process further request the user to input the instruction to start the designated composite service.

In S32-05, process instructs to execute the designated composite service. The instruction to execute the designated composite service include recognition of the user ID, creation and transmission of the execution recipe and display of progress.

Next, the instruction of the execution of the designated composite service in S32-05 will be described in detail.

Figure 33:
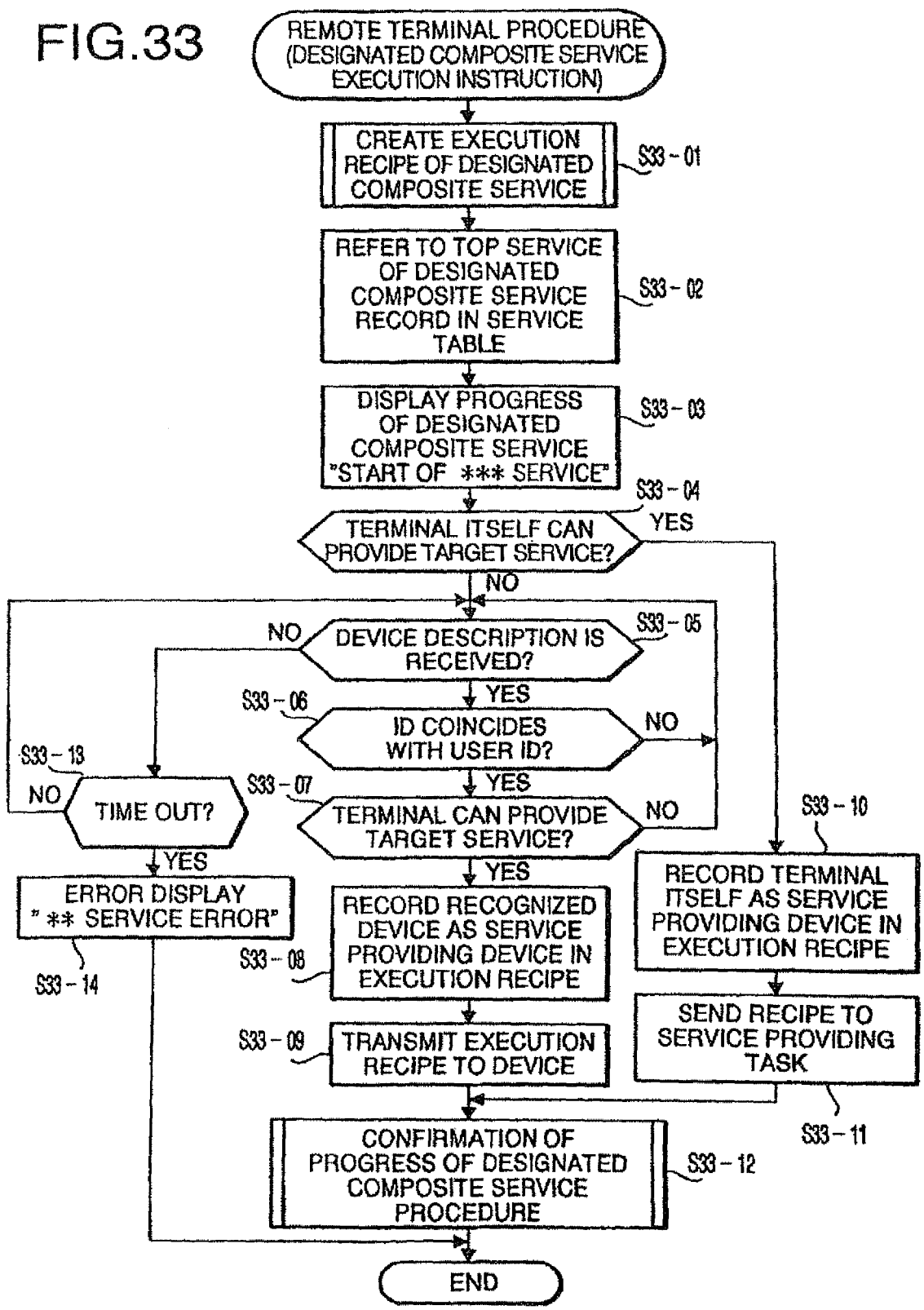
FIG. 33 shows a flowchart illustrating a composite service executing procedure executed by the remote terminal according to the third embodiment.

FIG. 33 shows a flowchart illustrating the composite service execution instructing procedure, which is executed by the remote terminal 4.

In S33-01, the remote terminal 4 creates the execution recipe for the designated composite service. In S33-02, process refers to the first service of a record related to the designated composite service in the service table.

In S33-03, the remote terminal 4 notifies "Designated Composite Service is Started" with the display unit 4b and/or notifying unit 4c.

In S33-04, remote terminal 4 determines whether the remote terminal 4 itself can provide the target service. When the remote terminal 4 can provide the target service (S33-04: YES), process proceeds to S33-10. This corresponds a case where, for example, a device capable of providing the target service (e.g., the scanner 1) is implemented with the function of the remote terminal 4. When the remote terminal 4 cannot provide the target service (S33-04: NO), process proceeds to S33-05. This corresponds to a case where, for example, the remote terminal 4 is not implemented in a device or the remote terminal 4 is implemented in a device which does not provide the target service.

In S33-05, process determines whether the user ID and the device description as shown in FIG. 20 are received from another device providing the service. When the user ID and the device description have not been received (S33-05: NO), process proceeds to S33013. When the user ID and the device description have been received (S33-05: YES), process proceeds to S33-06.

In S33-06, process determines whether the received ID coincides with the user ID assigned to the remote terminal 4. When the user IDs are not the same (S33-06: NO), process proceeds to S33-05. When the IDs are the same (S33-06: YES), process proceeds to S33-07.

In S33-07, process determines whether the device whose user ID has been recognized can provide the target service. When the device cannot provide the target service (S33-07: NO), process returns to S33-05. When the device can provide the target service (S33-07: YES), process proceeds to S33-08.

In S33-08, process records the recognized device as a device that can provide the target service in the execution recipe.

In the procedure of S33-05 through S33-08, the remote terminal 4 determines that the user selects a device by approaching the device that provide the service and input the user ID.

In S33-09, process transmits the execution recipe to the recognized device. Then, process proceeds to S33-12.

In S33-04, when the remote terminal 4 is capable of providing the target service (S33-04: YES), process proceeds to S33-10. In S33-10, the remote terminal 4 records, in the execution recipe, the remote terminal 4 itself as the device that can provide the target service.

In S33-11, the remote terminal 4 executes the target service by sending the execution recipe to the service providing task of the remote terminal 4 itself.

In S33-12, a designated composite service progress confirming procedure is executed.

That is, after the device that provides the first one of the services necessary for achieving the composite service is determined, the remote terminal 4 monitors the progress of the composite service.

When the user ID and the device description have not been received from other device providing the service (S33-05: NO), process proceeds to S33-13. In S33-13, process determines whether a predetermined waiting period for the user ID and device description has expired. When the waiting period has not expired (S33-13: NO), process returns to S33-05. When the waiting period has expired (S33-13: YES), process proceeds to S33-14.

In S33-14, a error message "*** Service Error" is notified with the display unit 4b and/or notifying unit 4c. Then, the procedure shown in FIG. 33 is terminated.

The execution recipe creating procedure executed in S33-01 will be described in detail.

The execution recipe creating procedure according to the third embodiment is similar to the procedure shown in FIG. 10. Portions different from the procedure in the first embodiment will be described.

According to the third embodiment, process writes, in the recipe, that transmission/reception of the recipe is unnecessary in S10-03. In S10-04, process writes that user ID reply is unnecessary in the recipe. Further, according to the third embodiment, S10-07 is skipped. The other steps are the same as those in the first embodiment, and will not described.

FIGS. 39A and 29B show an example of the execution recipe according to the third embodiment.

FIGS. 39A and 29B show a case where the composite service is the copy service. The recipe shown in FIGS. 39A and 39B is different from the execution recipe according to the first embodiment in the following points.

Firstly, according to the third embodiment, the forward or reverse relay of the recipe among the devices is unnecessary, and it is also unnecessary to transmits the recipe to all the determined devices:

It is unnecessary to return the user ID;

In the recipe, device name and IP address of only a device providing the service 1 are described and other devices providing the services are undecided;

No destination is indicated for the data obtained in the service 1 (i.e., scan service); and The source of data for executing the service 2 is designated.

In a case where the composite service is the remote fax service or the image storing service, the above portions are different with respect to the first embodiment.

Next, the designated composite service progress confirming procedure executed in S33-12 will be described.

Figure 34:
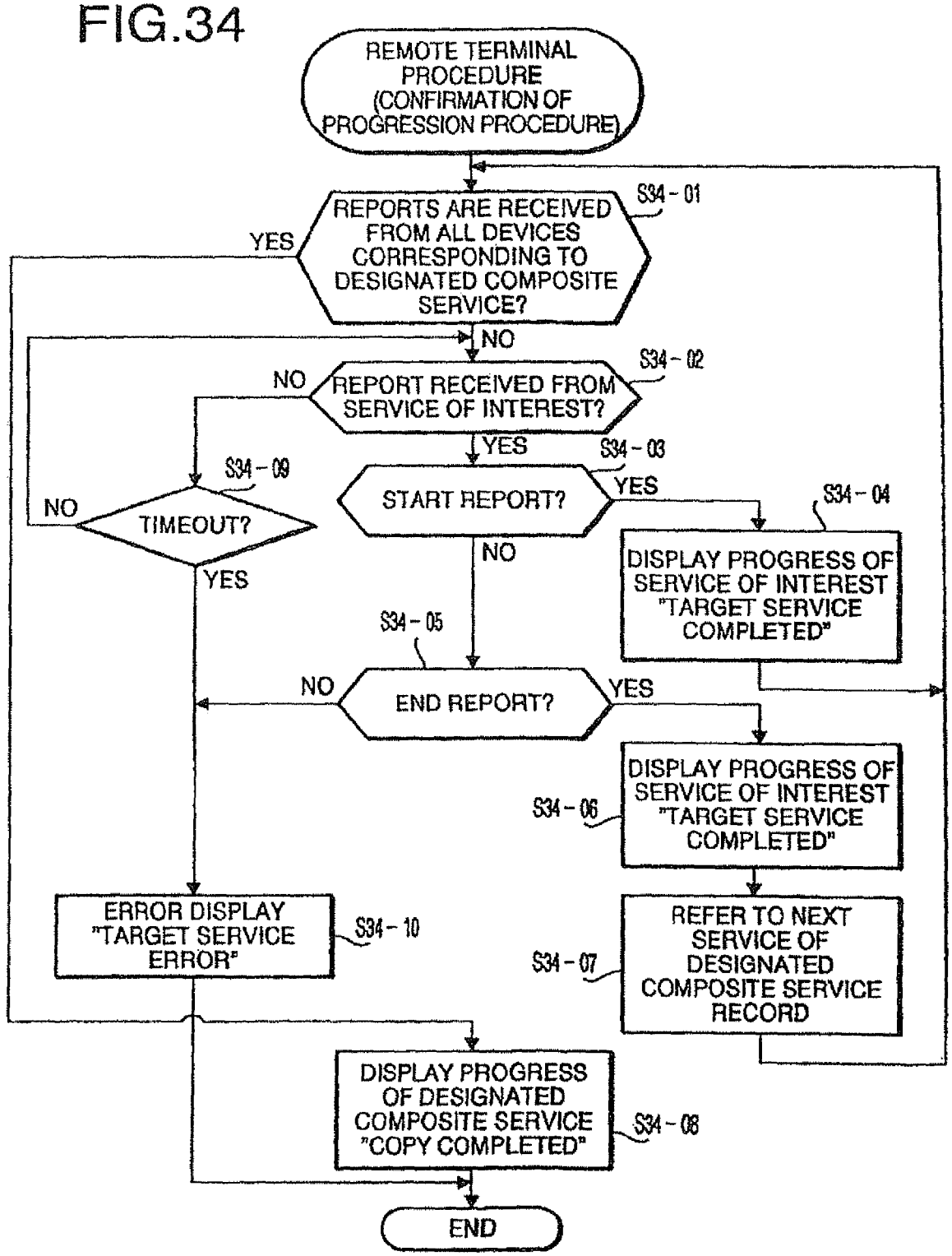
FIG. 34 shows a flowchart illustrating a progress confirming procedure executed by the remote terminal according to the third embodiment.

FIG. 34 shows a flowchart illustrating the designated composite service progress confirming procedure executed by the remote terminal 4 according to the third embodiment.

It should be noted that the procedure shown in FIG. 34 is similar to the procedure from S9-05 to the end of the procedure shown in FIG. 9. Thus, description will be omitted.

An operation of the device will be described below.

Figure 35:
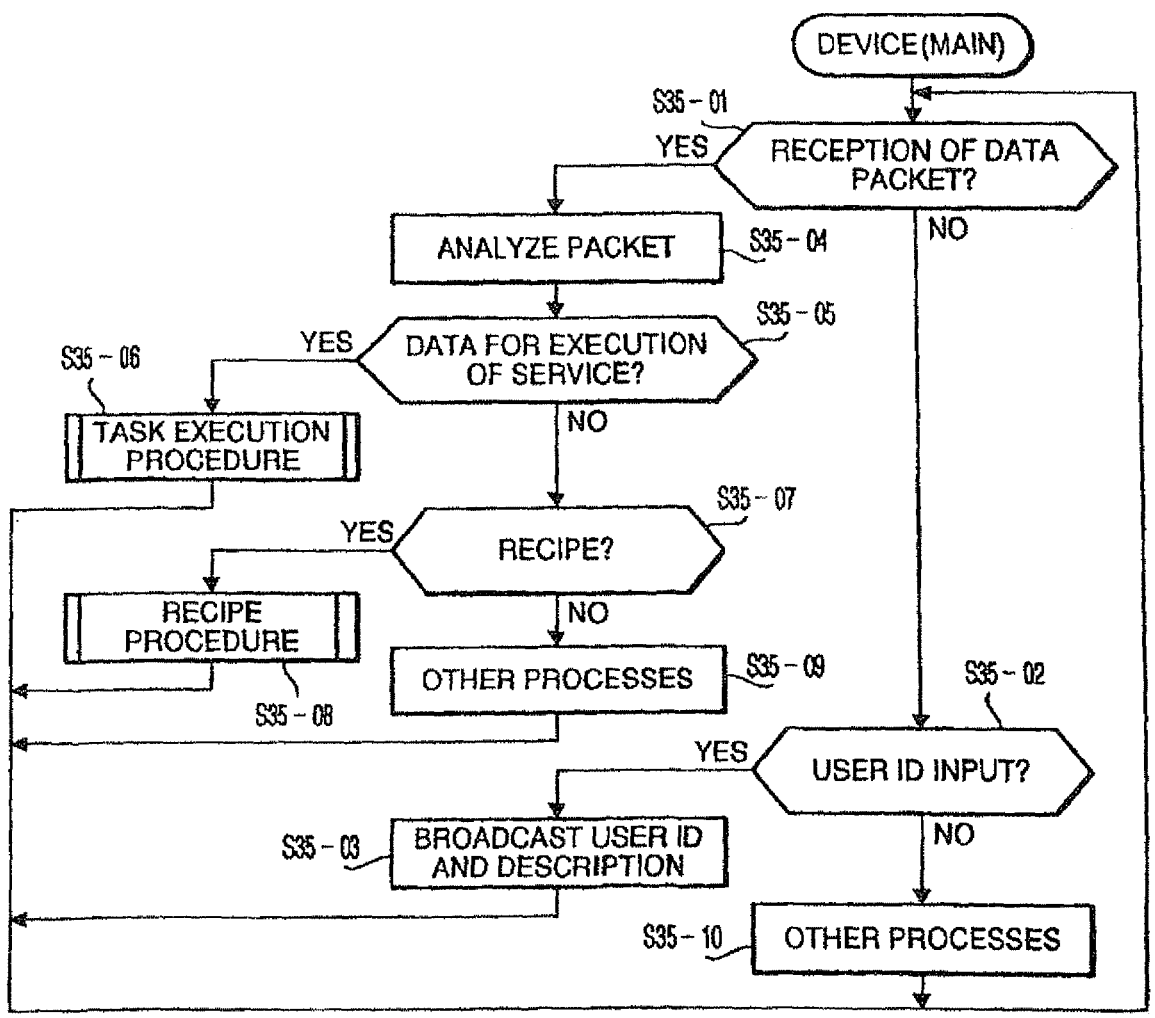
FIG. 35 shows a flowchart illustrating a main procedure of the device according to the third embodiment.

FIG. 35 shows a flowchart illustrating a main procedure of the device according to the third embodiment.

In S35-01, process determines whether a data packet is received. When the data packet has been received (S35-01: YES), process proceeds to S35-04. When the data packet is not received (S35-01: NO), process proceeds to S35-02.

In S35-02, process determines whether the user ID is input. When the user ID has not been input (S35-02: NO), process proceeds to S35-10, where other procedures are executed, and process returns to S35-01. When the user ID has been input (S35-02: YES), process proceeds to S35-03.

In S35-03, process broadcasts the user ID and the device description. Then, process proceeds to S35-01.

When the data packet is received (S35-01: YES), process proceeds to S35-04. In S35-04, process analyzes the data packet.

In S35-05 through S35-09, the procedure similar to that in S11-09 through S11-13 of FIG. 11 is executed.

Next, the service execution procedure executed at S13-04 of the recipe creating procedure will be described.

Figure 36:
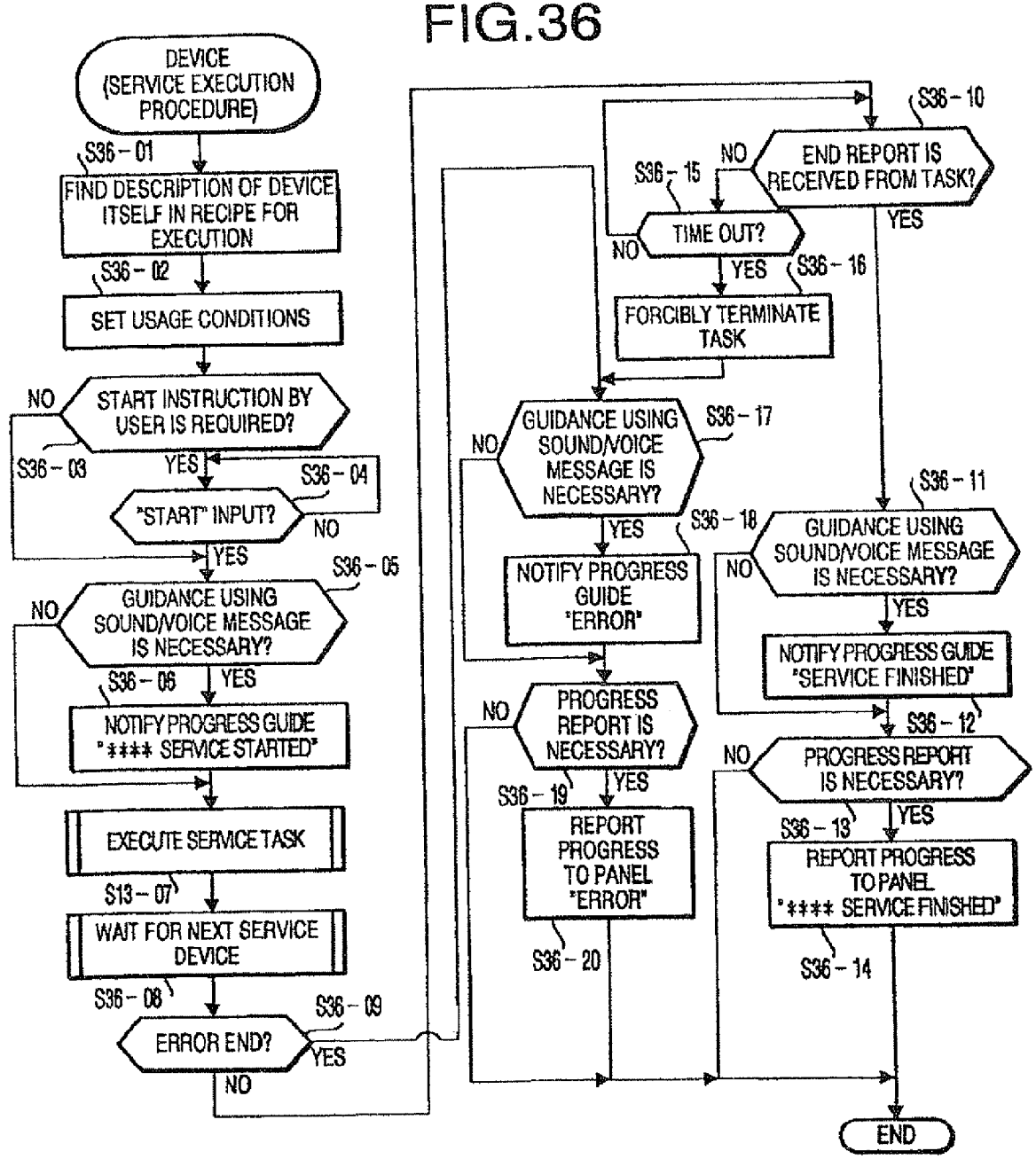
FIG. 36 shows a service procedure executed by the device according to the third embodiment.

FIG. 36 shows a service execution procedure executed by the device according to the third embodiment.

In S36-01 through S36-04, a procedure similar to the procedure in S16-01 through S16-04 is executed. It should be noted that a step corresponding to S16-05 of FIG. 16 is not included in FIG. 36.

In S36-05 through S36-07, a procedure similar to the procedure in S16-07 through S16-09 is executed.

In S36-08, process waits until the device providing the next service broadcasts the user ID and device description, then, determines the device that provides the next service. Thereafter, by transmitting the execution recipe, process continues the composite service.

In S36-09, process determines whether an error has occurred in the procedure for awaiting the device providing the next service. When the error has occurred (S36-09: YES), process proceeds to S36-01. When the error has not occurred (S36-09: NO) process proceeds to S36-10.

In S36-10 through S36-20, a procedure similar to the procedure in S16-10 through S16-20 is executed.

The next service device waiting procedure (S36-08 of FIG. 36) will be described in detail.

Figure 37:
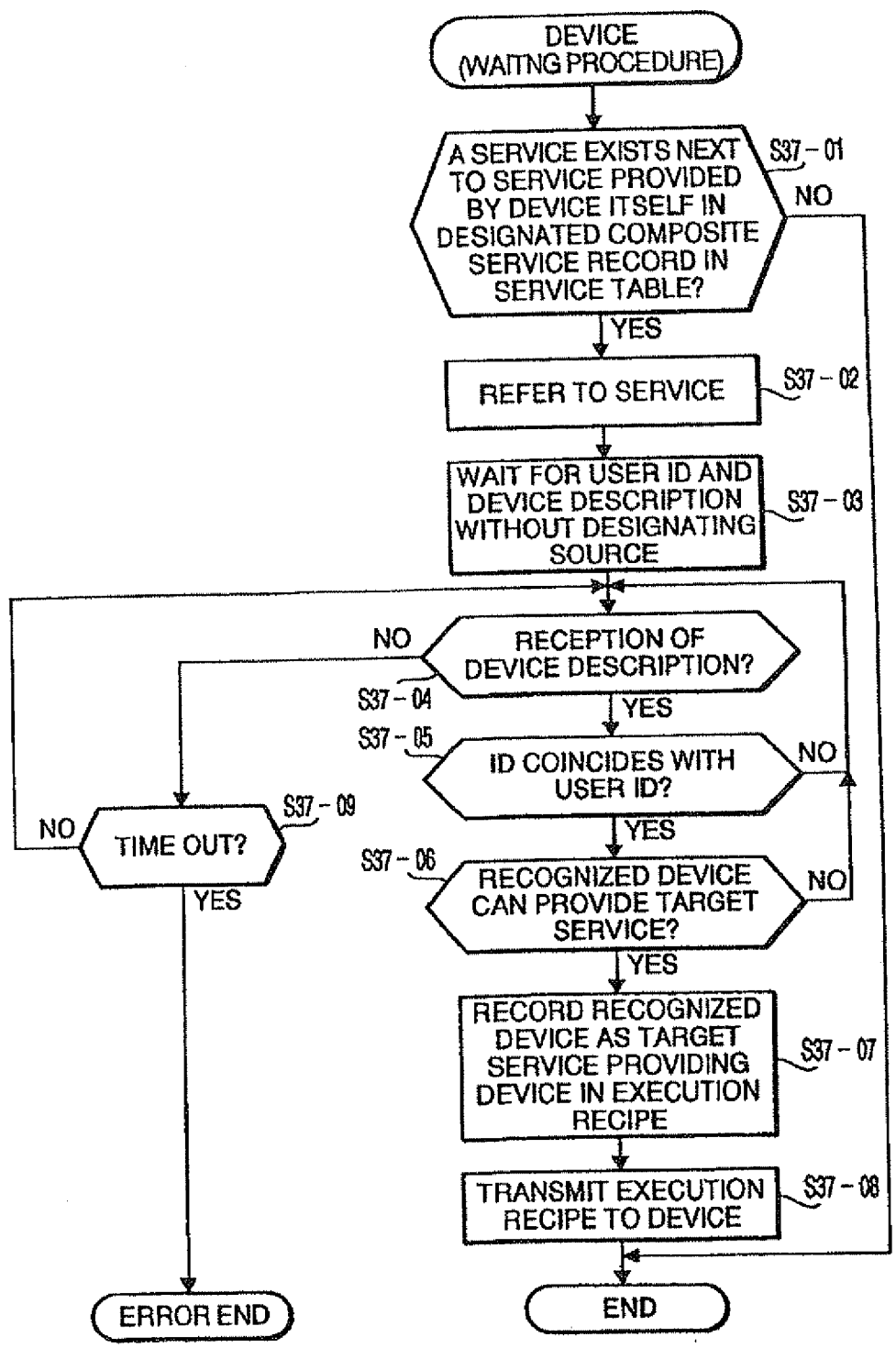
FIG. 37 shows a flowchart illustrating a next device waiting procedure according to the third embodiment.

FIG. 37 shows a flowchart illustrating the next service device waiting procedure according to the third embodiment.

In S37-01, process determines whether there is a service following the service the device is providing in the record related to the designated composite service in the service table. When there is not a next service (S37-01: NO), process terminates the procedure of FIG. 37 since all the individual services constituting the designated composite service have been finished. When there is a next service (S37-01: YES), process proceeds to S37-02, where process refers to the next service.

In S37-03, process sets a waiting status for the user ID and device description without designating the source. In S37-04, process determines whether the user ID and device description as shown in FIG. 20 has been received from other devices providing services.

When process has not received the user ID and device description (S37-04: NO), process proceeds to S37-09. When process has received the user ID and device description (S37-04: YES), process proceeds to S37-05.

In S37-05, process determines whether the received user ID coincides with the user ID the present device itself has. When the user IDs do not coincide (S37-05: NO), process proceeds to S37-04. When the user IDs coincide (S37-05: YES), process proceeds to S37-06.

In S37-06, process determines whether the recognized device can provide the target service. When the recognized device cannot provide the target service (S37-06: NO), process proceeds to S37-04. When the recognized device can provide the target service (S37-06: YES), control proceeds to S37-07. In S37-04 through S37-06, it is determined that the user who instructed the execution of the composite service approaches a device which the user intends to provide the next service.

In S37-07, process records the recognized device as the device that can provide the target service in the execution recipe.

In S37-08, process transmits the execution recipe to the recognized device, and terminates the procedure of FIG. 37.

In S37-04, when the user ID and device description have not been received from other devices providing the services (S37-04: NO), process proceeds to S37-09.

In S37-09, process determines whether a predetermined waiting time for receiving the user ID and device description has expired. When the waiting time has not expired (S37-09: NO), process proceeds to S37-04. When the waiting time has expired (S37-09: YES), process terminates the procedure with error.

As aforementioned, the procedure for starting the service task will be described later, after all the embodiments are described.

Fourth Embodiment

Next, a composite service providing system according to the fourth embodiment will be described. The fourth embodiment is different from the first embodiment in that the recipe is not relayed among the devices, but the execution recipe is directly transmitted from the remote terminal 4 to respective determined devices.

The hardware configuration of the composite service providing system according to the fourth embodiment is similar to that of the first embodiment as shown in FIGS. 1 and 2. The fourth embodiment will be described with reference to FIGS. 40 through 41, 5 through 14, 16 through 20 and 24. Among the drawings above, FIGS. 5 through 7, 11 through 13, 17 through 20 and 24 have been described in connection with the first embodiment, and therefore similar description thereof will not be repeated, and only different portions will be described hereinafter.

Figure 40:
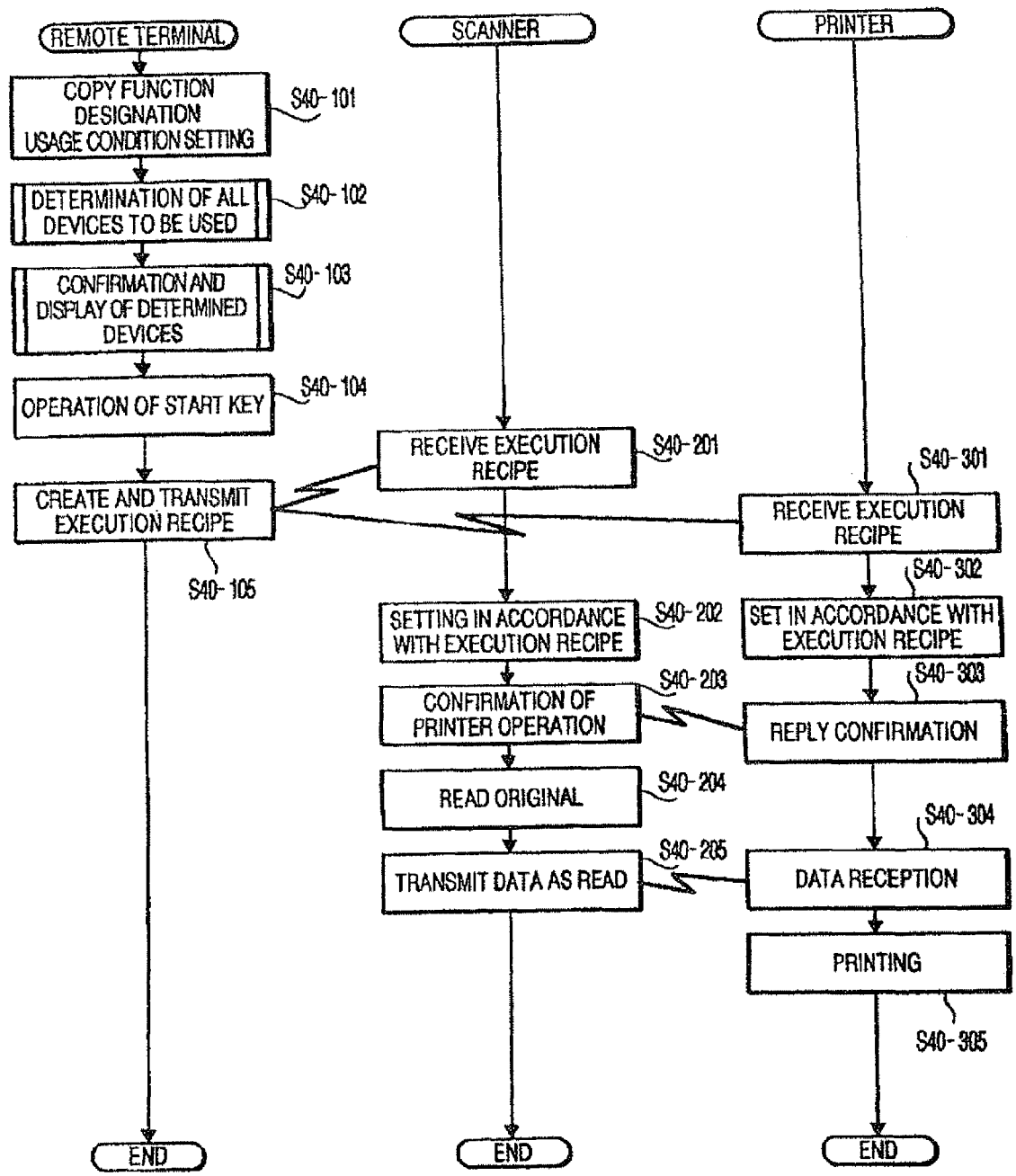
FIG. 40 shows schematic flowcharts illustrating operations of remote terminal, scanner and printer of a composite service providing system according to the fourth embodiment of the invention.

FIG. 40 shows flowcharts illustrating operations of remote terminal, scanner and printer of the composite service providing system according to the fourth embodiment of the invention. In this example, as the composite service, the copy service is designated.

Steps S40-101 through S40-104 are similar to steps S3-101 through S3-104.

In S40-105, process creates the execution recipe and transmits the execution recipe to all the devices that provide the services necessary for achieving the composite service.

For example, the execution recipe is transmitted to the scanner 1 and the printer 3 simultaneously. This feature is different from the first embodiment. By transmitting the execution recipe to the scanner 1 and the printer 3 at the same time, it is highly likely that the printer 3 becomes ready to receive data before the scanner 1 transmits the image data.

In S40-201, the scanner 1, which is one of the determined devices, receives the execution recipe from the remote terminal 4. In S40-202, the scanner 1 sets operation conditions for providing the scan service based on the execution recipe. In S40-203, the scanner 1 transmits a request for an operation confirmation to the printer 3 which is to provide the next service.

In S40-204, the scanner 1 scans an original, and in S40-205, the scanner 1 transmits the scanned data to the printer 3 which is to provide the next service, and terminates the procedure.

In S40-301, the printer 3 receives the execution recipe from the remote terminal 4. In S40-302, process sets the operational conditions for providing the print service based on the execution recipe. In S40-303, process replies to the request for operation confirmation received from the printer 3.

In S40-304, the printer 3 receives the data the scanner 1 scanned and output. Then, in S40-305, the printer prints out the received data and terminates the procedure.

The operation confirmation procedure for confirming the operation of the determined device executed by the remote terminal 4 is similar to that of the first embodiment shown in FIG. 8 except that the confirmation recipe is transmitted to all the determined devices in the recipe transmitting procedure in S8-02.

The designated composite service execution instructing procedure is similar to that of the first embodiment shown in FIG. 9 except that the execution recipe it transmitted to all the determined devices in the recipe transmitting procedure in S9-03.

The recipe creating procedure is similar to that of the first embodiment shown in FIG. 10 except that process writes, in the recipe, that the recipe is to be transmitted from the remote terminal 4 to all the determined devices in the designation of transmission type of the execution recipe in S10-03.

FIGS. 41A and 41B show an example of the recipe according to the fourth embodiment. The recipe shown in FIGS. 41A and 41B is similar to that of the first embodiment except that the transmission type of the recipe is designated such that the recipe is transmitted from the remote terminal 4 to all the determined device. When the composite service is the remote fax service or the image storing service, the difference with respect to the first embodiment is the transmission type of the recipe.

The confirming procedure at the device according to the fourth embodiment is similar to that of the first embodiment shown in FIG. 14 except that the relaying of the recipe among the devices in S14-04 is not executed, and procedure proceeds to S14-06.

The service execution procedure of the device is similar to that of the first embodiment shown in FIG. 16 except that the relying of the recipe among the devices in S16-05 is not executed, and process proceeds S16-07.

As aforementioned, the procedure for starting the service task will be described later.

Fifth Embodiment

A composite service providing system according to the fifth embodiment will be described. According to the fifth embodiment, the recipe is reversely relayed among the devices.

A hardware configuration of the composite service providing system according to the fifth embodiment is the same as that of the first embodiment shown in FIGS. 1 and 2.

The operation of the fifth embodiment will be described with reference to FIGS. 42, 43, 5 through 16, 18 through 20, 24 and 38. Among them, FIGS. 5 through 7, 11 through 13, 18 through 20 and 24 are the same as in the first embodiment, and the description thereof will not be repeated, and only different portions will be described.

A service table referred to in the fifth embodiment is similar to that of the third embodiment, and is shown in FIG. 38.

Figure 42:
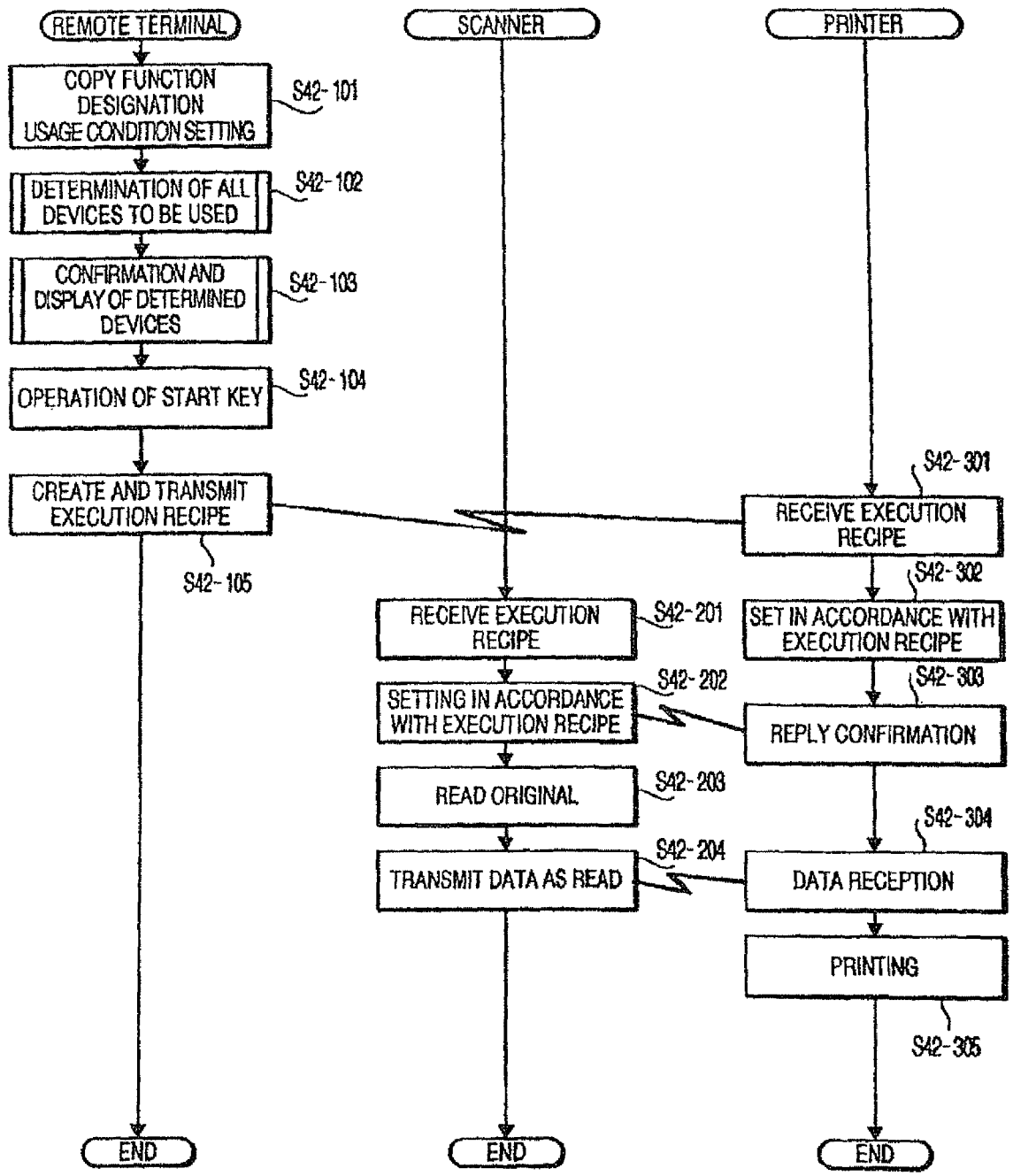
FIG. 42 shows schematic flowcharts illustrating operations of remote terminal, scanner and printer of a composite service providing system according to the fifth embodiment of the invention.

FIG. 42 shows flowcharts illustrating operations of remote terminal, scanner and printer of a composite service providing system according to the fifth embodiment of the invention. In this example, the copy service is designated as the composite service.

S42-101 through S42-104 are similar to S3-101 through S3-104 of the first embodiment.

In S42-105, process creates an execution recipe, and transmits the execution recipe to a device that provides a service finally. For example, the execution recipe is transmitted to the printer 3, firstly. Thus, the printer 3 is ready to receive data without fail, before the scanner 1 transmits the image data.

In S42-301, the printer 3, which is one of the determined devices, receives the execution recipe. Then, in S42-302, the printer 3 sets operational conditions for providing the print service in accordance with the execution recipe.

In S42-303, the printer 3 transmits the execution recipe to a service which is followed by the print service. That is, the printer 3 transmits the execution recipe to the scanner 1, which provides the scan service that is executed before the print service and is followed by the print service provided by the printer 3.

In S42-201, the scanner 1 receives the execution recipe from the printer 3. In S42-202, the scanner set operational conditions for providing the scan service in accordance with the execution recipe.

In S42-203, the scanner scans an original, and in S42-204, the scanner transmits the scanned data to the printer 3, which provides the next service. Thereafter, process terminated the procedure.

In S42-304, the printer 3 receives the data transmitted from the scanner 1. In S42-305, the printer 3 prints out the data, and terminates the procedure.

The operation confirming procedure of the determined device executed in the remote terminal 4, according to the fifth embodiment, is shown in FIG. 8. The fifth embodiment is different from the first embodiment, in that process transmits the confirming recipe to the determined device providing the last service in the recipe transmitting procedure in S8-02.

The designated composite service execution instruction procedure is similar to that of the first embodiment shown in FIG. 9 except that the execution recipe is transmitted to the determined device that provides the last service in the recipe transmitting procedure in S9-03.

The recipe creating procedure according to the fifth embodiment is similar to the recipe creating procedure according to the first embodiment shown in FIG. 10 except that, in the fifth embodiment, process designates the transmission type of the recipe in S10-03 by writing, in the recipe, that the recipe is reversely relayed among the devices. That is, process designates that the recipe is transmitted from the determined device providing a succeeding service to a device providing a preceding service.

FIGS. 43A and 43B show an example of a recipe according to the fifth embodiment.

In this example, at the item of the transmission type of the recipe, it is indicated that the recipe should be reversely relayed among the device. Further, in the recipe, no destination of the data is designated, and the source of the data is designated. The other portions are similar to the recipe used in the first embodiment, and description thereof is omitted.

The recipes for the composite services of remote fax service and image storing service, the difference of the recipe between the fifth embodiment and the first embodiment are similar to the above. The other operations are similar, and description thereof will not be provided.

The confirming procedure executed in the device according to the fifth embodiment is similar to that of the first embodiment shown in FIG. 14 except that the execution recipe is transmitted to the determined device that provides a previous service in the recipe transmitting procedure in S16-05. The other operations are similar, and description thereof will not be provided.

FIG. 15 shows a flowchart illustrating the recipe transmitting procedure. In S15-01, process determines whether the transmission type of the recipe is "reverse relay among devices". When the reverse relay of the recipe is not required (S15-01: NO), process proceeds to S15-02. This corresponds to the first and second embodiments. When the reverse relay of the recipe is required (S15-01: YES), process proceeds to S15-08. This corresponds to the fifth embodiment.

In S15-08, process determines whether there is a service to be provided before the service provided by the device itself in the record related to the designated composite service in the service table.

When there is not such a service (S15-08: NO), process terminates the procedure since it is unnecessary to transmit the recipe. When there is such a service (S15-08: YES), process proceeds to S15-09.

In S15-09, process transmits the recipe to the device which provides the previous service recorded in the recipe, and terminates the procedure.

Next, a service task start-up procedure executed, for example, in S16-09 or S36-07 will be described in detail.

Figure 44:
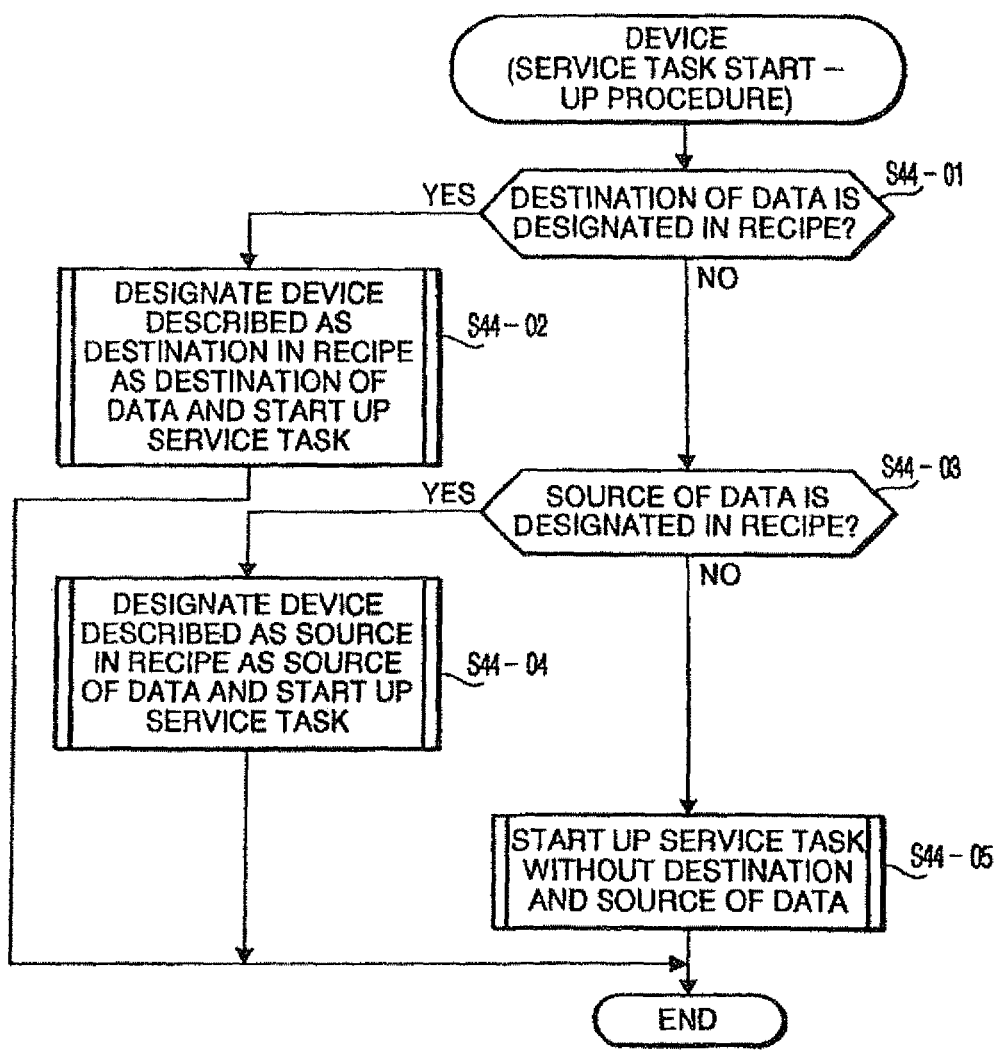
FIG. 44 shows a flowchart illustrating a service task start-up procedure executed by the device according to the invention.

FIG. 44 shows a flowchart illustrating a service task start-up procedure executed by the device according to anyone of first through fifth embodiments.

In S44-01, process determines whether the destination is written in the recipe. When the destination is designated (S44-01: YES), process proceeds to S44-02. The process following S44-02 corresponds to a device providing the service 1 (i.e., scanner 1) in the first, second or fourth embodiment. The device providing the service 1 designates a device designated as the destination of data transmission in the recipe in S44-02, and starts up respective service tasks.

When the destination of the data transmission is not designated in the recipe (S44-01: NO), process proceeds to S44-03.

In S44-03, process determines whether the source of data is designated in the recipe. When the destination is not designated (S44-03: NO), process proceeds to S44-05. This corresponds the device providing the service 2 (i.e., printer 3, fax, storage) in the first, second or fourth embodiment, or the device providing the service 1 (i.e., scanner 1) of the third or fifth embodiment.

In S44-05, the service task of the device providing the service 2 is started up without the designated destination and designated source of the data.

When the data source is indicated in the recipe (S44-03: YES), process proceeds to S44-04. This procedure corresponds the device providing the service 2 (i.e., printer 3, fax or storage) of the third or fifth embodiment.

In S44-04, process designates the device, which is indicates as the data source in the recipe, as the data source, executes respective service tasks, and terminates the procedure.

Next, an execution procedure of each service task started in the start-up procedure will be described in detail.

Figure 45:
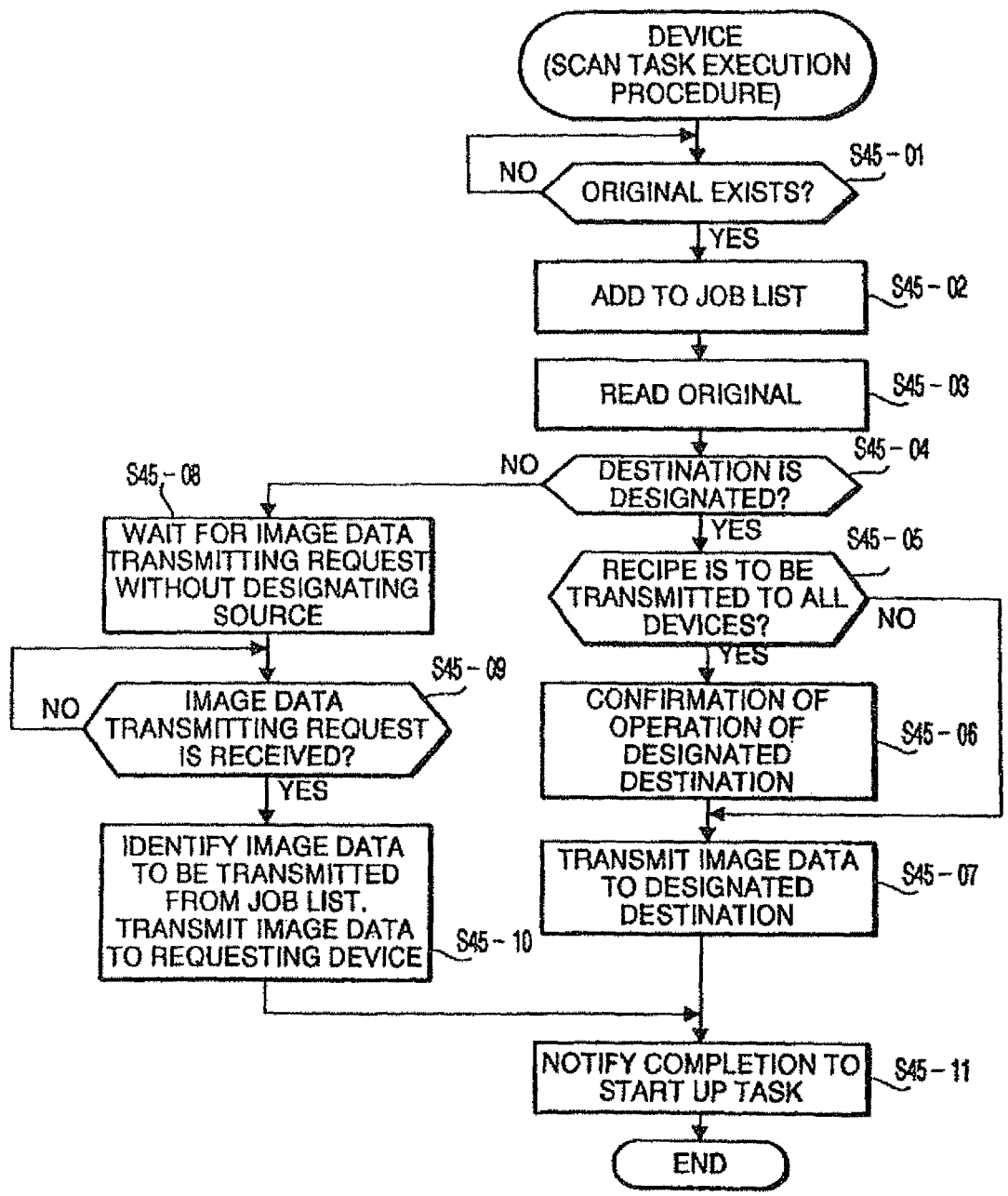
FIG. 45 shows a flowchart illustrating a scan task execution procedure executed by the device according to the invention.

FIG. 45 shows a flowchart illustrating a scan task execution procedure executed by the device.

The scanner 1 that provides the scan service has a job list as shown in FIG. 32. The job list contains Index (i.e., job index number), JOB ID (i.e., job ID number), user ID (Owner or User ID), Status (i.e., progress status) and other information.

In S45-01 of FIG. 45, process determines whether an original is set to the scanner 1. When the original is not set (S45-01: NO), process repeats the determination in S45-01. When the original is set (S45-01: YES), process proceeds to S45-02.

In S45-02, process adds a job regarding the original set to the scanner 1 to the job list.

In S45-03, the scanner 1 scans the original. Then, in S45-01, the scanner 1 determines whether a destination of the scanned data is designated, that is, whether the service task has been started in S44-02.

When the destination has not been set (S45-03: NO), process proceeds to S45-08. This procedure corresponds to the third and fifth embodiments. When the destination has been set (S45-03: YES), process proceeds to S45-05. This process corresponds to the first, second and fourth embodiments.

In S45-05, the scanner 1 determines whether the recipe transmission type is set to transmit from the remote terminal 4 to all the devices. When the transmission type is not the transmission from the remote terminal 4 to all the devices (S45-05: NO), and when the scanner 1 has transmitted the execution recipe to the device providing the next service (e.g., the printer 3) and it is confirmed that the printer 3 is operable, process proceeds to S45-07. This procedure corresponds to the first and second embodiments. When the transmission type is the transmission from the remote terminal to all the devices (S45-05: YES), process proceeds to S45-06.

In S45-06, process confirms the operation of the determined device that is the destination of the scanned data and provides the next service. For example, process transmits an echo request packet of ICMP (Internet Control Message Protocol) designating the IP address of the determined device that provides the next service, and confirms whether the device is operable depending on whether the ICMP echo packet is returned. When it is confirmed that the device is operable, process proceeds to S45-07.

In S45-07, process transmits the scanned image data to the designated destination, and proceeds to S45-11.

In S45-04, when the destination of the scanned data is not designated (S45-04: NO), process proceeds to S45-08. This procedure corresponds to the third and fifth embodiments.

In S45-08, process set the data waiting status flag indicative of that the device is waiting for an image data transmitting request without designating the data source.

In S45-09, process determines whether the image data transmitting request is received. When the image data transmitting request has not been received (S45-09: NO), process repeated the decision in S45-09. When the image data transmitting request has been received (S45-09: YES), process proceeds to S45-10.

In S45-10, based on the user ID attached to the transmission request, process identifies the image data to be transmitted from the job list, and transmits the image data to the requesting device. Then, process proceeds to S45-11.

In S45-11, process notifies the end of the scan task to the start-up task, and terminates the procedure.

Figure 46:
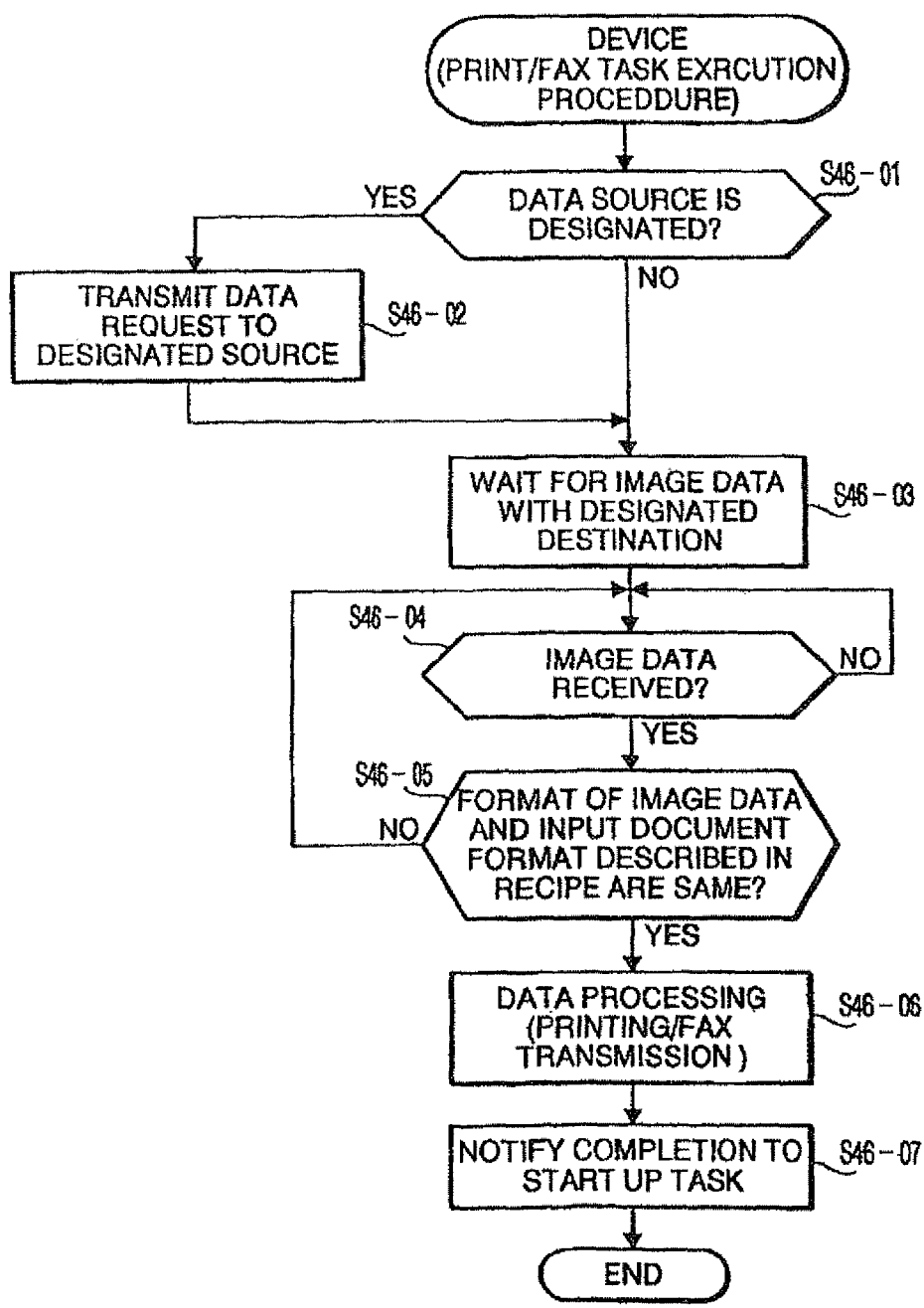
FIG. 46 shows a flowchart illustrating a print/fax task execution procedure executed by the device according to the invention.

FIG. 46 shows a flowchart illustrating a print/fax task execution procedure executed by the device.

In S46-01, process determines whether a data source is designated in the execution recipe. When there is no data source designation (S46-01: NO), process proceeds to S46-03. This procedure corresponds to the first, second and fourth embodiments. When there is a data source designation (S46-01: YES), procedure proceeds to S46-02. This procedure corresponds to the third and fifth embodiments.

In S46-02, process transmits a data request attached with the user ID to the designated data source, and proceeds to S46-03.

In S46-03, process sets status information to indicate that the device is waiting for image data designating the printer 3 or fax modem 2 as its destination.

In S46-04, process determines whether image data has been received, that is, whether data is received in S13-03. When the image data has not been received (S46-04: NO), process repeats the decision in S46-04. When process has received the image data (S46-04: YES), process proceeds to S46-05.

In S46-05, process determines whether the format of the received image data and the input document format described in the recipe are the same. When the formats are different (S46-05: NO), process determines that the received data is not the data to be processed for providing the service, and returns to S46-04. When the formats coincide, process determines that the received data is the data to be processed for providing the service, and proceeds to S46-06.

In S46-06, process executes printing or fax transmission. In S46-07, process notifies the end of the print task or fax task to the start-up task, and terminates the procedure.

Figure 47:
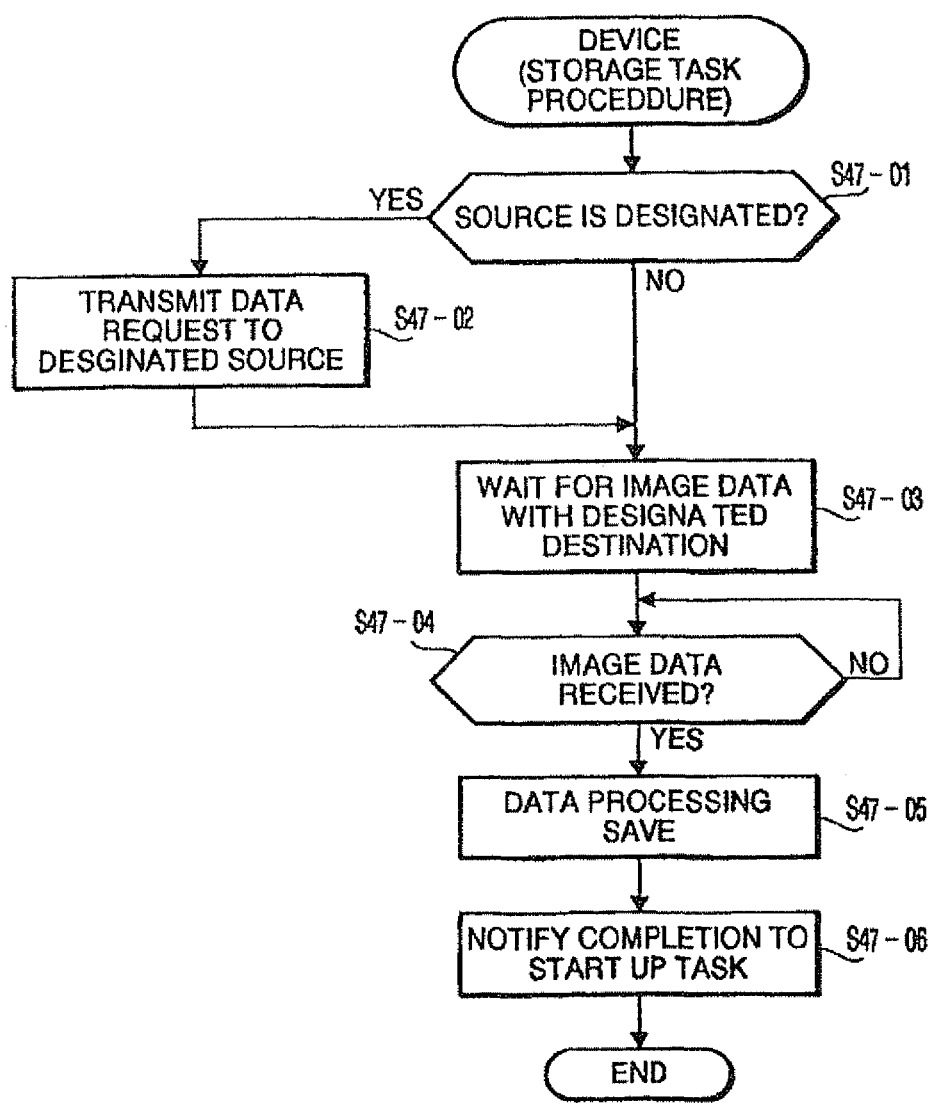
FIG. 47 shows a flowchart illustrating a storage task execution procedure executed by the device according to the invention.

FIG. 47 shows a flowchart illustrating a storage task execution procedure executed by the device.

The procedure shown in FIG. 47 is similar to the procedure shown in FIG. 46 except that a procedure for comparing the format of the image data with the format described in the recipe (S46-05) is not included, and as data processing, the image data is stored in S47-05.

Various exemplary embodiments are described above. In each embodiment, when the progress of the service is notified to the user, only one of the display unit (1c, 2c, 3c, or 4b) and notifying unit (1d, 2d, 3d or 4c) or both of them may be used.

When the user intends to reset the entire system including the scanner 1, printers 3 and fax modem 2, each device may be reset individually. Alternatively, by use of the GID described above, the scanner 1, printers 3 and fax modem 2 can be reset simultaneously. For example, when a composite service is provided as a plurality of devices having the same GID cooperate with each other, with a single triggering signal, the devices having the same GID can be reset. It should be noted that not only a resetting of the devices, but also sleeping of the devices can be done, when the devices have the same GID.

A network system is typically configured such that electronic devices (e.g., printer, scanner, fax mode, etc.) are placed at different locations. In such a case, according to the conventional composite service providing system, it may be difficult for the user to identify a device to be operated in order to execute the intended composite service. Further, it is difficult for the user, in such a conventional system, to recognize a progress of the composite service particularly when respective devices are located at different positions. According to the embodiments described above, the problems mentioned above can be solved. That is, the user can recognize the device to be operated and progress of the composite service easily.

In the conventional composite service system, when the user intends to receive a copy service, after scanning an image using a scanner, the user is required to find a printer and designate the printer to which the scanned data is transmitted. In a case of a fax service, the user is required to designate a fax modem to which the scanned image data is transmitted. If the user knows the name or address of the printer or fax modem, the user can easily designate the printer or fax modem. However, it is relatively bothersome for the user to remember the names/addresses of respective devices. According to the embodiments described above, the user is not required to perform troublesome operations, and can use the entire composite service system as an all-in-one MFP (multifunction peripheral).

The present disclosure relates to the subject matters contained in Japanese Patent Applications Nos. P2003-153266 and P2003-153267, both filed on May 29, 2003, which are expressly incorporated herein by reference in their entireties.

The invention claimed is:

1. A composite service providing system including:
   a plurality of electronic devices which are communicatively interconnected, the plurality of electronic devices being independent of each other and including a first electronic device and a second electronic device, each of the first electronic device and the second electronic device being provided with a first processor and a first memory operatively coupled to the first processor, wherein the first memory includes instructions which, when executed by the first processor, cause the first processor to perform as an independent service execution system which is configured to execute at least one independent service from among a print service to print image data, a scan service to obtain image data by scanning an original, a storage service to store image data, and an image data transmission/reception service to transmit image data to a remote image data receiving device and to obtain image data by receiving the image data from a remote image data transmission device; and
   a terminal device which is communicatively connected with the plurality of electronic devices, the terminal device including a second processor and a second memory operatively coupled to the second processor,
   wherein the second memory includes instructions which, when executed by the second processor, cause the second processor to perform as, or the first memory includes instructions which, when executed by the first processor, further cause the first processor to perform as:
   a composite service designating system configured to acquire a first user input designating one of a plurality of composite services which include a copy service, an image data storage service and an image data transfer service,
      the copy service being performed as (i) the first electronic device obtains the image data using the independent service execution system, (ii) the second electronic device obtains the image data from the first electronic device, and (iii) the second electronic device executes the print service with respect to the image data using the independent service execution system,
      the image data storage service being performed as (a) the first electronic device obtains the image data using the independent service execution system, (b) the second electronic device obtains the image data from the first electronic device, and (c) the second electronic device executes the storage service with respect to the image data using the independent service execution system,
      the image data transfer service being performed as (1) the first electronic device obtains the image data using the independent service execution system, (2) the second electronic device obtains the image data from the first electronic device, and (3) the second electronic device executes the image data transmission/reception service with respect to the image data using the independent service execution system;
   a usage condition designating system configured to acquire a second user input designating a usage condition of the composite service which is designated by the first user input acquired by the composite service designating system;
   an electronic device determining system configured to determine the first electronic device and the second electronic device, each of the first electronic device and the second electronic device being provided with the independent service execution system necessary for providing the composite services designated by the first user input acquired by the composite service designating system;
   an operational condition data generating system configured to generate an operational condition data representing an operational condition, the independent service execution system provided to each of the plurality of electronic devices determined by the electronic device determining system operating with the operational condition so that the composite service designated by the first user input acquired by the composite service designating system is provided in accordance with the usage condition designated by the second user input acquired by the usage condition designating system; and
   a setting system configured to execute setting of the operational conditions for the service providing systems of the plurality electronic devices respectively determined by the electronic device determining system in accordance with the operational condition data generated by the operational condition data generating system, wherein the independent service execution system provided to the first electronic device determined by the electronic device determining system obtains the image data necessary for providing the composite service designated by the first user input acquired by the composite service designating system under the operational condition set by the setting system, and wherein the independent service execution system provided to the second electronic device determined by the electronic device determining system obtains the image data which is necessary for providing the composite service designated by the first user input acquired by the composite service designating system and obtained by the independent service execution system provided to the first electronic device determined by the electronic device determining system, and executes the independent service with respect to the obtained image data under the operational condition set by the setting system.

2. The composite service providing system according to claim 1, wherein, each of the plurality of electronic devices is assigned with an identifier, one of the plurality of the electronic devices uses or utilizes the composite service designating system, and the electronic device determining system determines the first electronic device and the second electronic device, from among the electronic devices, which are assigned with the identifier same as the identifier assigned to the electronic device provided with the composite service designating system which acquires the first user input.

3. The composite service providing system according to claim 1, wherein, the second memory includes instructions which, when executed by the second processor, cause the second processor to perform as, or the first memory of the electronic device includes instructions which, when executed by the first processor, further cause the first processor to perform as a user identification information obtaining system configured to obtain user identification information to identify a user, the composite service designated by the first user input being provided to the user, the first user input being acquired by the composite service designating system, and wherein the electronic device determining system determines the first electronic device and the second electronic device, from among the electronic devices, in accordance with the user identification information obtained by the user identification information obtaining system.

4. The composite service providing system according to claim 1, wherein, the first memory of one of the plurality of the electronic devices includes instructions which, when executed by the first processor, further cause the first processor to perform as the composite service designating system, and the electronic device determining system determines the first electronic device and the second electronic device from among the electronic devices, the electronic device determining system determining:
(i) the electronic device including the first processor performed as the composite service designating system which acquires the first user input as the first electronic device and (ii) the second electronic device from among the other electronic devices, or
(a) the electronic device including the first processor performed as the composite service designating system which acquires the first user input as the second electronic device and (b) the first electronic device from among the other electronic devices.

5. The composite service providing system according to claim 1, wherein the electronic device determining system determines the first electronic device and the second electronic device, from among the electronic devices, which are capable of operating in the operational condition for providing the composite service designated by the first user input in the usage condition designated by the second user input, the first user input and the second user input being acquired by the composite service designating system and the usage condition designating system, respectively.

6. The composite service providing system according to claim 1, wherein, the second memory includes instructions which, when executed by the second processor, cause the second processor to perform as, or the first memory of the electronic device includes instructions which, when executed by the first processor, further cause the first processor to perform as a location obtaining system configured to obtain locations of the electronic devices, and wherein the electronic device determining system determines the first electronic device and the second electronic device, from among the electronic devices, in accordance with a result obtained by the location obtaining system.

7. The composite service providing system according to claim 1, wherein, the second memory includes instructions which, when executed by the second processor, cause the second processor to perform as, or the first memory of the electronic device includes instructions which, when executed by the first processor, further cause the first processor to perform as a usage order notifying system configured to notify a predetermined order of execution of the independent services performed by the first electronic device and the second electronic device, which use the respective independent service execution system.

8. The composite service providing system according to claim 1, wherein, the second memory includes instructions which, when executed by the second processor, cause the second processor to perform as, or the first memory of the electronic device includes instructions which, when executed by the first processor, further cause the first processor to perform as:
a location obtaining system configured to obtain location information of the first electronic device and the second electronic device, the first electronic device and the second electronic device being determined by the electronic device determining system; and
a location information notifying system configured to notify the locations of the first electronic device and the second electronic device obtained by the location obtaining system.

9. The composite service providing system according to claim 1, wherein, the second memory includes instructions which, when executed by the second processor, cause the second processor to perform as, or the first memory of the electronic device includes instructions which, when executed by the first processor, further cause the first processor to perform as a progress notifying system configured to notify a progress in providing the composite service designated by the first user input acquired by the composite service designating system, and wherein the first memory of each of the first electronic device and the second electronic device determined by the electronic device determining system includes instructions which, when executed by the first processor, further cause the first processor to perform as an execution status information transmitting system configured to transmit execution status information representing an execution status of the service being executed to the progress notifying system when each independent service execution system executes the independent service, and wherein the progress notifying system notifies the progress of the composite service in accordance with the execution status information transmitted from the execution status transmitting system provided to each of the first electronic device and the second electronic device determined by the electronic device determining system.

10. An electronic device comprising a first processor and a first memory operatively coupled to the first processor, wherein the first memory includes instructions which, when executed by the first processor, cause the first processor to perform as an independent service execution system which is configured to execute at least one independent service from among a print service to print image data, a scan service to obtain image data by scanning an original, a storage service to store image data, and an image data transmission/reception service to transmit image data to a remote image data receiving device and obtain image data by receiving the image data from a remote image data transmission device, the electronic device being used as a first electronic device or a second electronic device in a composite service providing system, wherein the composite service providing system comprising:

a plurality of electronic devices which are communicatively interconnected, the plurality of electronic devices being independent of each other and including the first electronic device and the second electronic device, and a terminal device which is communicatively connected with the plurality of electronic devices, the terminal device including a second processor and a second memory operatively coupled to the second processor, wherein the second memory includes instructions which, when executed by the second processor, cause the second processor to perform as, or the first memory includes instructions which, when executed by the first processor, further cause the first processor to perform as:

a composite service designating system configured to acquire a first user input designating one of a plurality of composite services which include a copy service, an image data storage service and an image data transfer service, the copy service being performed as (i) the first electronic device obtains the image data using the independent service execution system, (ii) the second electronic device obtains the image data from the first electronic device, and (iii) the second electronic device executes the print service with respect to the image data using the independent service execution system, the image data storage service being performed as (a) the first electronic device obtains the image data using the independent service execution system, (b) the second electronic device obtains the image data from the first electronic device, and (c) the second electronic device executes the storage service with respect to the image data using the independent service execution system, the image data transfer service being performed as (1) the first electronic device obtains the image data using the independent service execution system, (2) the second electronic device obtains the image data from the first electronic device, and (3) the second electronic device executes the image data transmission/reception service with respect to the image data using the independent service execution system;

a usage condition designating system configured to acquire a second user input designating a usage condition of the composite service which is designated by the first user input acquired by the composite service designating system;

an electronic device determining system configured to determine the first electronic device and the second electronic device, each of the first electronic device and the second electronic device being provided with the independent service execution system necessary for providing the composite services designated by the first user input acquired by the composite service designating system;

an operational condition data generating system configured to generate an operational condition data representing an operational condition, the independent service execution system provided to each of the plurality of electronic devices determined by the electronic device determining system operating with the operational condition so that the composite service designated by the first user input acquired by the composite service designating system is provided in accordance with the usage condition designated by the second user input acquired by the usage condition designating system; and a setting system configured to execute setting of the operational conditions for the service providing systems of the plurality electronic devices respectively determined by the electronic device determining system in accordance with the operational condition data generated by the operational condition data generating system, wherein the independent service execution system provided to the first electronic device determined by the electronic device determining system obtains the image data necessary for providing the composite service designated by the first user input acquired by the composite service designating system under the operational condition set by the setting system, and wherein the independent service execution system provided to the second electronic device determined by the electronic device determining system obtains the image data which is necessary for providing the composite service designated by the first user input acquired by the composite service designating system and obtained by the independent service execution system provided to the first electronic device determined by the electronic device determining system, and executes the independent service with respect to the obtained image data under the operational condition set by the setting system.

11. The electronic device according to claim 10, wherein, each of the plurality of electronic devices included in the composite service providing system is assigned with an identifier, and the electronic device determining system determines the electronic device itself as the first electronic device and determines the second electronic device, from among the electronic devices, which is assigned with the identifier same as the identifier assigned to the electronic device itself, or determines the electronic device itself as the second electronic device and determines the first electronic device, from among the electronic devices, which is assigned with the identifier same as the identifier assigned to the electronic device itself.

12. The electronic device according to claim 10, wherein, the second memory includes instructions which, when executed by the second processor, cause the second processor to perform as, or the first memory of the electronic device includes instructions which, when executed by the first processor, further cause the first processor to perform as a user identification information obtaining system configured to obtain user identification information to identify a user, the composite service designated by the first user input being provided to the user, the first user input being acquired by the composite service designating system, and wherein the electronic device determining system determines the first electronic device and the second electronic device, from among the electronic devices, in accordance with the user identification information obtained by the user identification information obtaining system.

13. The electronic device according to claim 10, wherein the electronic device determining system determines the first electronic device and the second electronic device from among the electronic devices, the electronic device determining system determining:

(i) the electronic device including the first processor performed as the composite service designating system which acquires the first user input as the first electronic device and (ii) the second electronic device from among the other electronic devices, or (a) the electronic device including the first processor performed as the composite service designating system which acquires the first user input as the second electronic device and (b) the first electronic device from among the other electronic devices.

14. The electronic device according to claim 10, wherein the electronic device determining system determines the first electronic device and the second electronic device among the electronic devices which are capable of operating in the operational condition for providing the composite service designated by the first user input in the usage condition designated by the second user input, the first user input and the second user input being acquired by the composite service designating system and the usage condition designating system, respectively.

15. The electronic device according to claim 10, wherein, the second memory includes instructions which, when executed by the second processor, cause the second processor to perform as, or the first memory of the electronic device includes instructions which, when executed by the first processor, further cause the first processor to perform as a location obtaining system configured to obtain locations of the electronic devices included in the composite service providing system and the electronic device determining system, and wherein the electronic device determining system determines the first electronic device and the second electronic device, from among the electronic devices, in accordance with a result obtained by the location obtaining system.

16. The electronic device according to claim 10, wherein, the second memory includes instructions which, when executed by the second processor, cause the second processor to perform as, or the first memory of the electronic device includes instructions which, when executed by the first processor, further cause the first processor to perform as a usage order notifying system configured to notify a predetermined order of execution of the independent services performed by the first electronic device and the second electronic device, which use the respective independent service execution system.

17. The electronic device according to claim 10, wherein, the second memory includes instructions which, when executed by the second processor, cause the second processor to perform as, or the first memory of the electronic device includes instructions which, when executed by the first processor, further cause the first processor to perform as:

a location obtaining system configured to obtain location information of the first electronic device and the second electronic device, the first electronic device and the second electronic device being determined by the electronic device determining system; and a location information notifying system configured to notify a location of the first electronic device and the second electronic device obtained by the location obtaining system.

18. The electronic device according to claim 10, wherein, the second memory includes instructions which, when executed by the second processor, cause the second processor to perform as, or the first memory of the electronic device includes instructions which, when executed by the first processor, further cause the first processor to perform as:

a progress notifying system configured to notify a progress in providing the composite service designated by the first user input acquired by the composite service designating system, and wherein the first memory of each of the first electronic device and the second electronic device determined by the electronic device determining system includes instructions which, when executed by the first processor, further cause the first processor to perform as an execution status information transmitting system configured to transmit execution status information representing an execution status of the service being executed to the progress notifying system when each independent service execution system executes the independent service, and wherein the progress notifying system notifies, when the electronic device determining system determines the electronic device itself as the first electronic device, a progress in providing the composite service designated by the first user input acquired by the composite service designating system in accordance with an execution status of the independent service by the independent service execution system provided to the electronic device itself, and execution status information transmitted by the second electronic device and representing an execution status of the service by the independent service execution system provided to the second electronic device, and when the electronic device determining system determines the electronic device itself as the second electronic device, a progress in providing the composite service designated by the first user input acquired by the composite service designating system in accordance with an execution status of the independent service by the independent service execution system provided to the electronic device itself, and execution status information transmitted by the first electronic device and representing an execution status of the service by the independent service execution system provided to the first electronic device.

19. A composite service providing method in a composite service providing system including a plurality of electronic devices which are communicatively interconnected, the plurality of electronic devices being independent of each other and including a first electronic device and a second electronic device, each of the first electronic device and the second electronic device being provided with an independent service execution system which is configured to execute at least one independent service from among a print service to print image data, a scan service to obtain image data by scanning an original, a storage service to store image data, and an image data transmission/reception service to transmit image data to a remote image data receiving device and to obtain image data by receiving the image data from a remote image data transmission device, the method including steps of:

acquiring a first user input designating one of a plurality of composite services which include a copy service, an image data storage service and an image data transfer service, the copy service being performed as (i) the first electronic device obtains the image data using the independent service execution system, (ii) the second electronic device obtains the image data from the first electronic device, and (iii) the second electronic device executes the print service with respect to the image data using the independent service execution system, the image data storage service being performed as (a) the first electronic device obtains the image data using the independent service execution system, (b) the second electronic device obtains the image data from the first electronic device, and (c) the second electronic device executes the storage service with respect to the image data using the independent service execution system, the image data transfer service being performed as (1) the first electronic device obtains the image data using the independent service execution system, (2) the second electronic device obtains the image data from the first electronic device, and (3) the second electronic device executes the image data transmission/reception service with respect to the image data using the independent service execution system;

acquiring a second user input designating a usage condition of the composite service which is designated by the first user input;

determining the first electronic device and the second electronic, device, each of the first electronic device and the second electronic device being provided with the independent service execution system necessary for providing the composite services designated by the first user input;

generating an operational condition data representing an operational condition, the independent service execution system provided to each of the plurality of electronic devices determined by the determining step operating with the operational condition so that the composite service designated by the first user input is provided in accordance with the usage condition designated by the second user input; and executing setting of the operational conditions for the service providing systems of the plurality electronic devices respectively determined by the determining step in accordance with the operational condition data generated by the generating step, wherein the independent service execution system provided to the first electronic device determined by the determining step obtains the image data necessary for providing the composite service designated by the first user input under the operational condition set by the setting step, and wherein the independent service execution system provided to the second electronic device determined by the determining step obtains the image data which is necessary for providing the composite service designated by the first user input and obtained by the first electronic device determined by the determining step, and executes the independent service with respect to the obtained image data under the operational condition set by the setting step.

20. A non-transitory computer readable medium to store computer readable instructions to cause an electronic device, which is provided with an independent service execution system which is configured to execute at least one independent service from among a print service to print image data, a scan service to obtain image data by scanning an original, a storage service to store image data, and an image data transmission/reception service to transmit image data to a remote image data receiving device and to obtain image data by receive the image data from a remote image data transmission device, and is used as a first electronic device or a second electronic device in a composite service providing system including a plurality of electronic devices which are communicatively interconnected and independent of each other, to execute steps of:

acquiring a first user input designating one of a plurality of composite services which include a copy service, an image data storage service and an image data transfer service, the copy service being performed as (i) the first electronic device obtains the image data using the independent service execution system, (ii) the second electronic device obtains the image data from the first electronic device, and (iii) the second electronic device executes the print service with respect to the image data using the independent service execution system, the image data storage service being performed as (a) the first electronic device obtains the image data using the independent service execution system, (b) the second electronic device obtains the image data from the first electronic device, and (c) the second electronic device executes the storage service with respect to the image data using the independent service execution system, the image data transfer service being performed as (1) the first electronic device obtains the image data using the independent service execution system, (2) the second electronic device obtains the image data from the first electronic device, and (3) the second electronic device executes the image data transmission/reception service with respect to the image data using the independent service execution system;

acquiring a second user input designating a usage condition of the composite service which is designated by the first user input;

determining the first electronic device and the second electronic device, each of the first electronic device and the second electronic device being provided with the independent service execution system necessary for providing the composite services designated by the first user input;

generating an operational condition data representing an operational condition, the independent service execution system provided to each of the plurality of electronic devices determined by the determining step operating with the operational condition so that the composite service designated by the first user input is provided in accordance with the usage condition designated by the second user input; and executing setting of the operational conditions for the service providing systems of the plurality electronic devices respectively determined by the determining step in accordance with the operational condition data generated by the generating step, wherein the first electronic device determined by the determining step obtains the image data necessary for providing the composite service designated by the first user input under the operational condition set by the setting step, and wherein the second electronic device determined by the determining step obtains the image data which is necessary for providing the composite service designated by the first user input and obtained by the first electronic device determined by the determining step, and executes the independent service with respect to the obtained image data under the operational condition set by the setting step.

21. A composite service providing system including:

a plurality of electronic devices which are communicatively interconnected, the plurality of electronic devices being independent of each other and including a first electronic device and a second electronic device, each of the first electronic device and the second electronic device being provided with a processor and a memory operatively coupled to the processor, wherein the memory includes instructions which, when executed by the processor, cause the processor to perform as an independent service execution system which is configured to execute at least one independent service from among a print service to print image data, a scan service to obtain image data by scanning an original, a storage service to store image data, and an image data transmission/reception service to transmit image data to a remote image data receiving device and to obtain image data by receiving the image data from a remote image data transmission device;

wherein the memory includes instructions which, when executed by the processor, further cause the processor to perform as:

a composite service designating system configured to acquire a first user input designating one of a plurality of composite services which include a copy service, an image data storage service and an image data transfer service, the copy service being performed as (i) the first electronic device obtains the image data using the independent service execution system, (ii) the second electronic device obtains the image data from the first electronic device, and (iii) the second electronic device executes the print service with respect to the image data using the independent service execution system, the image data storage service being performed as (a) the first electronic device obtains the image data using the independent service execution system, (b) the second electronic device obtains the image data from the first electronic device, and (c) the second electronic device executes the storage service with respect to the image data using the independent service execution system, the image data transfer service being performed as (1) the first electronic device obtains the image data using the independent service execution system, (2) the second electronic device obtains the image data from the first electronic device, and (3) the second electronic device executes the image data transmission/reception service with respect to the image data using the independent service execution system;

a usage condition designating system configured to acquire a second user input designating a usage condition of the composite service which is designated by the first user input acquired by the composite service designating system;

an electronic device determining system configured to determine the first electronic device and the second electronic device, each of the first electronic device and the second electronic device being provided with the independent service execution system necessary for providing the composite services designated by the first user input acquired by the composite service designating system;

an operational condition data generating system configured to generate an operational condition data representing an operational condition, the independent service execution system provided to each of the plurality of electronic devices determined by the electronic device determining system operating with the operational condition so that the composite service designated by the first user input acquired by the composite service designating system is provided in accordance with the usage condition designated by the second user input acquired by the usage condition designating system; and a setting system configured to execute setting of the operational conditions for the service providing systems of the plurality electronic devices respectively determined by the electronic device determining system in accordance with the operational condition data generated by the operational condition data generating system, wherein the independent service execution system provided to the first electronic device determined by the electronic device determining system obtains the image data necessary for providing the composite service designated by the first user input acquired by the composite service designating system under the operational condition set by the setting system, and wherein the independent service execution system provided to the second electronic device determined by the electronic device determining system obtains the image data which is necessary for providing the composite service designated by the first user input acquired by the composite service designating system and obtained by the independent service execution system provided to the first electronic device determined by the electronic device determining system, and executes the independent service with respect to the obtained image data under the operational condition set by the setting system.

22. An electronic device comprising a processor and a memory operatively coupled to the processor, wherein the memory includes instructions which, when executed by the processor, cause the processor to perform as an independent service execution system which is configured to execute at least one independent service from among a print service to print image data, a scan service to obtain image data by scanning an original, a storage service to store image data, and an image data transmission/reception service to transmit image data to a remote image data receiving device and obtain image data by receiving the image data from a remote image data transmission device, the electronic device being used as a first electronic device or a second electronic device in a composite service providing system, wherein the composite service providing system comprising:

a plurality of electronic devices which are communicatively interconnected, the plurality of electronic devices being independent of each other and including the first electronic device and the second electronic device, wherein the memory includes instructions which, when executed by the processor, further cause the processor to perform as:

a composite service designating system configured to acquire a first user input designating one of a plurality of composite services which include a copy service, an image data storage service and an image data transfer service, the copy service being performed as (i) the first electronic device obtains the image data using the independent service execution system, (ii) the second electronic device obtains the image data from the first electronic device, and (iii) the second electronic device executes the print service with respect to the image data using the independent service execution system, the image data storage service being performed as (a) the first electronic device obtains the image data using the independent service execution system, (b) the second electronic device obtains the image data from the first electronic device, and (c) the second electronic device executes the storage service with respect to the image data using the independent service execution system, the image data transfer service being performed as (1) the first electronic device obtains the image data using the independent service execution system, (2) the second electronic device obtains the image data from the first electronic device, and (3) the second electronic device executes the image data transmission/reception service with respect to the image data using the independent service execution system;

a usage condition designating system configured to acquire a second user input designating a usage condition of the composite service which is designated by the first user input acquired by the composite service designating system;

an electronic device determining system configured to determine the first electronic device and the second electronic device, each of the first electronic device and the second electronic device being provided with the independent service execution system necessary for providing the composite services designated by the first user input acquired by the composite service designating system;

an operational condition data generating system configured to generate an operational condition data representing an operational condition, the independent service execution system provided to each of the plurality of electronic devices determined by the electronic device determining system operating with the operational condition so that the composite service designated by the first user input acquired by the composite service designating system is provided in accordance with the usage condition designated by the second user input acquired by the usage condition designating system; and a setting system configured to execute setting of the operational conditions for the service providing systems of the plurality electronic devices respectively determined by the electronic device determining system in accordance with the operational condition data generated by the operational condition data generating system, wherein the independent service execution system provided to the first electronic device determined by the electronic device determining system obtains the image data necessary for providing the composite service designated by the first user input acquired by the composite service designating system under the operational condition set by the setting system, and wherein the independent service execution system provided to the second electronic device determined by the electronic device determining system obtains the image data which is necessary for providing the composite service designated by the first user input acquired by the composite service designating system and obtained by the independent service execution system provided to the first electronic device determined by the electronic device determining system, and executes the independent service with respect to the obtained image data under the operational condition set by the setting system.

* * * * *